US010764580B2

(12) United States Patent
Yamazaki et al.

(10) Patent No.: US 10,764,580 B2
(45) Date of Patent: *Sep. 1, 2020

(54) OFFSET DECODING DEVICE, OFFSET CODING DEVICE, IMAGE FILTERING DEVICE

(71) Applicant: HUAWEI TECHNOLOGIES CO., LTD., Shenzhen, Guangdong (CN)

(72) Inventors: Takanori Yamazaki, Osaka (JP); Tomohiro Ikai, Osaka (JP); Tomoyuki Yamamoto, Osaka (JP); Yukinobu Yasugi, Osaka (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,735

(22) Filed: Jul. 24, 2019

(65) Prior Publication Data

US 2019/0349583 A1    Nov. 14, 2019

Related U.S. Application Data

(63) Continuation of application No. 15/820,903, filed on Nov. 22, 2017, now Pat. No. 10,390,012, which is a (Continued)

(30) Foreign Application Priority Data

Jun. 23, 2011  (JP) .................................. 2011-139961
Sep. 29, 2011  (JP) .................................. 2011-215476

(51) Int. Cl.
*H04N 19/117*  (2014.01)
*H04N 19/14*   (2014.01)
(Continued)

(52) U.S. Cl.
CPC .......... *H04N 19/117* (2014.11); *H04N 19/14* (2014.11); *H04N 19/182* (2014.11);
(Continued)

(58) Field of Classification Search
CPC .... H04N 19/114; H04N 19/14; H04N 19/182; H04N 19/184; H04N 19/44; H04N 19/463; H04N 19/70; H04N 19/82; H04N 19/96
(Continued)

(56) References Cited

U.S. PATENT DOCUMENTS

2006/0093039 A1   5/2006  Yasuda et al.
2009/0003718 A1   1/2009  Liu et al.
(Continued)

FOREIGN PATENT DOCUMENTS

CN   101442674 A    5/2009
CN   101589625 A   11/2009
(Continued)

OTHER PUBLICATIONS

Takanori Yamazaki et al, Improvement of Sample Adaptive Offset with modified bit accuracy and restricted offsets. Joint Collaborative Team on Video Coding (JCT-VC)of ITU-T SG16 WP3 and ISO/IEC JTC1/SC29/WG11 6th Meeting: Torino, IT, Jul. 14-22, 2011, JCTVC-F396r2, 6 pages.

(Continued)

*Primary Examiner* — Matthew K Kwan
(74) *Attorney, Agent, or Firm* — James Anderson Harrison

(57) ABSTRACT

An adaptive offset filter (60) adds an offset to the pixel value of each pixel forming an input image. The adaptive offset filter (60) refers to offset-type specifying information, sets offset attributes for a subject unit area of the input image, decodes an offset having a bit width corresponding to an (Continued)

offset value range included in the set offset attributes, and adds the offset to the pixel value of each pixel forming the input image.

12 Claims, 41 Drawing Sheets

Related U.S. Application Data continuation of application No. 15/293,078, filed on Oct. 13, 2016, now Pat. No. 9,866,833, which is a continuation of application No. 14/127,889, filed as application No. PCT/JP2012/066082 on Jun. 22, 2012, now Pat. No. 9,497,455.

(51) Int. Cl.
*H04N 19/70* (2014.01)
*H04N 19/44* (2014.01)
*H04N 19/96* (2014.01)
*H04N 19/182* (2014.01)
*H04N 19/82* (2014.01)
*H04N 19/463* (2014.01)
*H04N 19/184* (2014.01)

(52) U.S. Cl.
CPC ........... *H04N 19/184* (2014.11); *H04N 19/44* (2014.11); *H04N 19/463* (2014.11); *H04N 19/70* (2014.11); *H04N 19/82* (2014.11); *H04N 19/96* (2014.11)

(58) Field of Classification Search
USPC .................................................... 375/240.25
See application file for complete search history.

(56) References Cited

U.S. PATENT DOCUMENTS

| | | | |
|---|---|---|---|
| 2009/0087111 A1 | 4/2009 | Noda et al. |
| 2009/0097561 A1 | 4/2009 | Chiu et al. |
| 2009/0129466 A1 | 5/2009 | Cho et al. |
| 2010/0020866 A1 | 1/2010 | Marpe et al. |
| 2012/0177107 A1 | 7/2012 | Fu et al. |
| 2012/0251012 A1 | 10/2012 | Ikai et al. |
| 2012/0287988 A1 | 11/2012 | Chong et al. |
| 2012/0321206 A1 | 12/2012 | Sato |
| 2013/0259118 A1 | 10/2013 | Fu et al. |
| 2018/0063523 A1 | 3/2018 | Marpe et al. |
| 2019/0349583 A1 | 11/2019 | Yamazaki et al. |

FOREIGN PATENT DOCUMENTS

| | | |
|---|---|---|
| CN | 101924938 A | 12/2010 |
| CN | 103636210 B | 12/2016 |
| CN | 106851318 B | 1/2019 |
| WO | 2010039492 A2 | 4/2010 |
| WO | 2011074357 A1 | 6/2011 |

OTHER PUBLICATIONS

Chih-Ming Fu et al, CE13: Sample Adaptive Offset with LCU-Independent Decoding. Joint Collaborative Team on Video Coding (JCT-VC) of ITU-T SG16 WP3 and ISO/IEC JTC1/SC29/WG11 5th Meeting: Geneva, CH, Mar. 16-23, 2011, JCTVC-E049, 6 pages.

Chih-Ming Fu et al, CE8 Subset3: Picture Quadtree Adaptive Offset. Joint Collaborative Team on Video Coding (JCT-VC) of ITU-T SG16 WP3 and ISO/IEC JTC1/SC29/WG11 4th Meeting: Daegu, KR, Jan. 20-28, 2011, JCTVC-D122, 10 pages.

Ken McCann et al, Samsung's Response to the Call for Proposals on Video Compression Technology. Joint Collaborative Team on Video Coding (JCT-VC)of ITU-T SG16 WP3 and ISO/IEC JTC1/SC29/WG11 1st Meeting: Dresden, DE, Apr. 15-23, 2010, JCTVC-A124, 42 pages.

Yu-Wen Huang et al, In-Loop Adaptive Restoration. Joint Collaborative Team on Video Coding (JCT-VC) of ITU-T SG16 WP3 and ISO/IEC JTC1/SC29/WG11 2nd Meeting: Geneva, CH, Jul. 21-28, 2010, JCTVC-B077, 11 pages.

Chih-Ming Fu et al, TE10 Subtest 3: Quadtree-based Adaptive Offset. Joint Collaborative Team on Video Coding (JCT-VC) of ITU-T SG16 WP3 and ISO/IEC JTC1/SC29/WG11 3rd Meeting: Guangzhou, CN, Oct. 7-15, 2010, JCTVC-C147, 6 pages.

Takanori Yamazaki et al. Joint Collaborative Team on Video Coding (JCT-VC) of ITU-T SG16 WP3 and ISO/IEC JTC1/SC29/WG11, Improvement of Sample Adaptive Offset with modified bit accuracy and restricted offsets, SHARP Corporation. Jul. 14-22, 2011. JCTVC-F396. total 4 pages.

Geng Qiang, Multimedia Digital Video Technology. Electronic Industry Press, 2005, 2 pages, with English abstract.

[Figure showing a grid partitioned into regions labeled QAOU0, QAOU1, QAOU2, QAOU3, QAOU4, QAOU5, QAOU6, QAOU7, QAOU8, QAOU9 with values 0, 1, 2, 3, 4, 5, 6, 7, 8, 9 in cells]

(b)

| QAOU INDEX | OFFSET TYPE | OFFSET 1 | ... | OFFSET 16 |
|---|---|---|---|---|
| 0 | BO_1 | xxx | | xxx |
| 1 | BO_2 | xxx | | xxx |
| ... | | | | |
| 9 | EO_1 | xxx | | xxx |

| PIXEL BIT DEPTH PIC_DEPTH | OFFSET BIT DEPTH SAO_DEPTH | SHIFT VALUE (PIC_DEPTH-SAO_DEPTH) |
|---|---|---|
| 14 | 14 | 0 |
| 13 | 13 | 0 |
| 12 | 12 | 0 |
| 11 | 11 | 0 |
| 10 | 10 | 0 |
| 9 | 9 | 0 |
| 8 | 8 | 0 |

(b)

| PIXEL BIT DEPTH PIC_DEPTH | OFFSET BIT DEPTH SAO_DEPTH | SHIFT VALUE (PIC_DEPTH-SAO_DEPTH) |
|---|---|---|
| 14 | 10 | 4 |
| 13 | 10 | 3 |
| 12 | 10 | 2 |
| 11 | 10 | 1 |
| 10 | 10 | 0 |
| 9 | 9 | 0 |
| 8 | 8 | 0 |

(c)

| PIXEL BIT DEPTH PIC_DEPTH | OFFSET BIT DEPTH SAO_DEPTH | SHIFT VALUE (PIC_DEPTH-SAO_DEPTH) |
|---|---|---|
| 14 | 8 | 6 |
| 13 | 9 | 4 |
| 12 | 9 | 3 |
| 11 | 9 | 2 |
| 10 | 9 | 1 |
| 9 | 9 | 0 |
| 8 | 8 | 0 |

(d)

| PIXEL BIT DEPTH PIC_DEPTH | OFFSET BIT DEPTH SAO_DEPTH | SHIFT VALUE (PIC_DEPTH-SAO_DEPTH) |
|---|---|---|
| 14 | 10+floor((PIC_BIT-10)/STEP) | PIC_BIT-10-floor((PIC_BIT-10)/STEP) |
| 13 | 10+floor((PIC_BIT-10)/STEP) | PIC_BIT-10-floor((PIC_BIT-10)/STEP) |
| 12 | 10+floor((PIC_BIT-10)/STEP) | PIC_BIT-10-floor((PIC_BIT-10)/STEP) |
| 11 | 10+floor((PIC_BIT-10)/STEP) | PIC_BIT-10-floor((PIC_BIT-10)/STEP) |
| 10 | 10 | 0 |
| 9 | 9 | 0 |
| 8 | 8 | 0 |

(e)

| PIXEL BIT DEPTH PIC_DEPTH | OFFSET BIT DEPTH SAO_DEPTH | SHIFT VALUE (PIC_DEPTH-SAO_DEPTH) |
|---|---|---|
| 14 | 12 | 2 |
| 13 | 11 | 2 |
| 12 | 11 | 1 |
| 11 | 10 | 1 |
| 10 | 10 | 0 |
| 9 | 9 | 0 |
| 8 | 8 | 0 |

FIG. 13

| pic/8 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| BoTbl[BO_1][pic/8] | C | C | 0 | 0 | 0 | 0 | 0 | 0 | 1 | 2 | 3 | 4 | 5 | 6 | 7 | 8 | 9 | 10 | 11 | 12 | 13 | 14 | 15 | 16 | 0 | 0 | 0 | 0 | 0 | 0 | C | C |
| BoTbl[BO_2][pic/8] | C | C | 1 | 2 | 3 | 4 | 5 | 6 | 7 | 8 | 0 | 0 | 0 | 0 | 0 | 0 | 0 | 0 | 0 | 0 | 9 | 10 | 11 | 12 | 13 | 14 | 15 | 16 | 0 | 0 | C | C |

| sao_type_idx | merge_tbl [sao_type_idx] |
|---|---|
| 0 | NA |
| 1 | 0 |
| 2 | 1 |
| 3 | 2 |
| 4 | 3 |
| 5 | 4 |
| 6 | 5 |

(b)

| sao_type_idx | merge_tbl [sao_type_idx] |
|---|---|
| 0 | NA |
| 1 | 0 |
| 2 | 0 |
| 3 | 0 |
| 4 | 0 |
| 5 | 1 |
| 6 | 2 |

| CODE | TYPE (sao_type_idx) | TYPE (sao_type_idx) |
|---|---|---|
| 0 | (NO OFFSET) (0) | (NO OFFSET) (0) |
| 1 | EO_0 (1) | EO_0 (1) |
| 2 | EO_1 (2) | BO_0 (5) |
| 3 | EO_2 (3) | BO_1 (6) |
| 4 | EO_3 (4) | |
| 5 | BO_0 (5) | |
| 6 | BO_1 (6) | |

801A     801B (b)

| CODE | TYPE (sao_type_idx) | TYPE (sao_type_idx) | TYPE (sao_type_idx) | TYPE (sao_type_idx) |
|---|---|---|---|---|
| 0 | (NO OFFSET) (0) | (NO OFFSET) (0) | (NO OFFSET) (0) | (NO OFFSET) (0) |
| 1 | EO_0 (1) | BO_0 (5) | BO_0 (5) | BO_0 (5) |
| 2 | EO_1 (2) | BO_1 (6) | | BO_1 (6) |
| 3 | EO_2 (3) | | | EO_0 (1) |
| 4 | EO_3 (4) | | | |
| 5 | | | | |
| 6 | | | | |

OFFSET DECODING DEVICE, OFFSET CODING DEVICE, IMAGE FILTERING DEVICE

CROSS-REFERENCE TO RELATED APPLICATIONS

This application is a continuation of U.S. patent application Ser. No. 15/820,903, filed on Nov. 22, 2017, which is a continuation of U.S. patent application Ser. No. 15/293,078, filed on Oct. 13, 2016, now U.S. Pat. No. 9,866,833, which is a continuation U.S. patent application Ser. No. 14/127,889, filed on Jan. 31, 2014, now U.S. Pat. No. 9,497,455, which is a National Stage of International Application No. PCT/JP2012/066082, filed on Jun. 22, 2012, which claims the priority of Japan patent application No. JP2011-139961, filed on Jun. 23, 2011 and Japan Patent Application No. JP2011-215476, filed on Sep. 29, 2011. All of the aforementioned patent applications are hereby incorporated by reference in their entireties.

TECHNICAL FIELD

The present disclosure relates to an image filtering device which performs filtering on images. The disclosure also relates to an offset decoding device which decodes offsets referred to by an image filter, and an offset coding device which codes offsets referred to by an image filter. The disclosure also relates to a data structure of coded data.

BACKGROUND

A video coding device (coding device) which generates coded data by coding video images in order to transmit or record video images efficiently, and a video decoding device (decoding device) which generates decoded images by decoding the coded data are being used. Specific examples of video coding methods are a method defined in H.264/MPEG-4. AVC, a method used in KTA software, which is a joint development codec in VCEG (Video Coding Expert Group), a method used in TMuC (Test Model under Consideration) software, which is a successor codec to the codec used in KTA software, and a method used in HM (HEVC TestModel) software.

In such coding methods, images (pictures) forming video images are managed in a hierarchical structure which is constituted by slices obtained by dividing an image, largest coding units (LCU: Largest Coding Unit, also called a tree block) obtained by dividing a slice, coding units (CU: Coding Unit, also called a coding node) obtained by dividing a largest coding unit, and blocks and partitions obtained by dividing a coding unit. In many cases, images are coded by using blocks as the smallest coding unit.

Additionally, in such coding methods, normally, a prediction image is generated on the basis of a locally decoded image obtained by coding and decoding an input image, and difference data indicating a difference between the prediction image and the input image is coded. As a generation method for prediction images, inter-frame prediction (inter prediction) and intra-frame prediction (intra prediction) are known.

In intra prediction, on the basis of a locally decoded image within the same frame, prediction images in this frame are sequentially generated. More specifically, in intra prediction, normally, for each unit of prediction (for example, a block), one of prediction directions (prediction modes) included in a predetermined prediction direction group is selected, and also, the pixel value of a reference pixel in a locally decoded image is extrapolated to the selected prediction direction, thereby generating a prediction pixel value in a subject area to be predicted. On the other hand, in inter prediction, by applying motion compensation using motion vectors to a reference image within an entirely decoded reference frame (decoded image), a prediction image within a frame to be predicted is generated for each unit of prediction (for example, a block).

NPL 1 and NPL 2 disclose an adaptive offset filter disposed at a stage subsequent to a deblocking filter which reduces block distortion of a decoded image and at a stage prior to an adaptive loop filter (also referred to as an "adaptive filer") which performs filtering processing using an adaptively determined filter coefficient. This adaptive offset filter adds an adaptively set offset to the pixel value of each pixel of an image output from the deblocking filter.

By providing such an adaptive offset filter, it is possible to suppress block distortion more effectively.

CITATION LIST

Non Patent Literature

NPL 1: "JCTVC-D122", Joint Collaborative Team on Video Coding (JCT-VC) of ITU-T SG16 WP3 and ISO/IEC JTC1/SC29/WG11, 4th Meeting: Daegu, KR, 01/2011
NPL 2: "JCTVC-E049", Joint Collaborative Team on Video Coding (JCT-VC) of ITU-T SG16 WP3 and ISO/IEC JTC1/SC29/WG11, 5th Meeting: Geneva, CH, 03/2011

SUMMARY OF INVENTION

Technical Problem

However, the range of values of an offset used in a known adaptive offset filter is not set, and thus, the number of bits of an offset is large, which requires a large memory size for storing an offset.

The present disclosure has been made in view of the above-described problem. It is an object of the present invention to realize an image filtering device which is capable of reducing block distortion while suppressing an increase in the memory size.

In order to solve the above-described problem, an image filtering device according to the present disclosure is an image filtering device for adding an offset to a pixel value of each pixel forming an input image which is constituted by a plurality of unit areas. The image filtering device includes: offset attribute setting means for setting an offset value range by referring to coded data; offset decoding means for decoding an offset which is restricted to the set offset value range; and filtering means for adding the offset to the pixel value of each pixel forming the input image.

With the image filtering device configured as described above, the offset attribute setting means sets an offset value range, and the offset decoding means decodes an offset having a bit width corresponding to an offset value range included in the set offset value range. It is thus possible to effectively reduce the memory size of a memory for storing offsets.

Accordingly, with the above-described configuration, it is possible to perform appropriate offset filtering processing while the memory size of a memory for storing offsets is reduced.

An offset decoding device according to the present invention is an offset decoding device for decoding each offset which is referred to by an image filter for adding an offset to a pixel value of each pixel forming an input image. The offset decoding device includes: offset residual decoding means for decoding each offset residual from coded data; prediction value determining means for determining a prediction value of each offset from a decoded offset; and offset calculating means for calculating each offset from a prediction value determined by the prediction value determining means and an offset residual decoded by the offset residual decoding means.

In the offset decoding device configured as described above, there are provided the offset residual decoding means for decoding each offset residual from coded data, the prediction value determining means for determining a prediction value of each offset from a decoded offset, and the offset calculating means for calculating each offset from a prediction value determined by the prediction value determining means and an offset residual decoded by the offset residual decoding means. Accordingly, an offset can be appropriately decoded from coded data having a smaller amount of data, compared with a case in which each offset itself is coded.

An image filtering device according to the present invention is an image filtering device which operates on an input image. The image filtering device includes: calculating means for calculating a difference value between a pixel value of a subject pixel forming an input image and a pixel value of a pixel around the subject pixel; bit shift means for performing bitwise right shift on a pixel value referred to by the calculating means or the difference value calculated by the calculating means by an amount equal to a predetermined shift value; classifying means for classifying the subject pixel as one of a plurality of offset classes in accordance with a magnitude relation between the difference value subjected to bitwise right shift by the bit shift means and 0; and offset means for adding an offset associated with the offset class of the subject pixel classified by the classifying means to the pixel value of the subject pixel.

In the image filtering device configured as described above, the subject pixel is classified as one of a plurality of offset classes in accordance with a magnitude relation between the difference value subjected to bitwise right shift by the bit shift means and 0, and an offset associated with the offset class of the subject pixel classified by the classifying means is added to the pixel value of the subject pixel. Thus, the classifying processing is less vulnerable to the influence of noise, thereby making it possible to improve the coding efficiency.

An image filtering device according to the present invention is an image filtering device which operates on an input image. The image filtering device includes: calculating means for calculating a difference value between a pixel value of a subject pixel forming an input image and a pixel value of a pixel around the subject pixel; classifying means for classifying the subject pixel as one of a plurality of offset classes in accordance with a magnitude relation between the difference value calculated by the calculating means and each of predetermined first and second thresholds; and offset means for adding an offset associated with the offset class of the subject pixel classified by the classifying means to the pixel value of the subject pixel.

In the image filtering device configured as described above, the subject pixel is classified as one of a plurality of offset classes in accordance with a magnitude relation between the difference value calculated by the calculating means and each of the predetermined first and second thresholds, and an offset associated with the offset class of the subject pixel classified by the classifying means is added to the pixel value of the subject pixel. Thus, the classifying processing is less vulnerable to the influence of noise, thereby making it possible to improve the coding efficiency.

An image filtering device according to the present invention is an image filtering device which operates on an input image constituted by a plurality of unit areas. The image filtering device includes: determining means for determining, among first and second offset types, an offset type to which a subject unit area including a subject pixel forming the input image belongs; classifying means for classifying the subject pixel as one of an offset class in which an offset is not added and a plurality of offset classes in which an offset is added in accordance with the offset type to which the subject unit area belongs and a pixel value of the subject pixel; and offset means for adding an offset associated with the offset type to which the subject unit area belongs and the offset class of the subject pixel classified by the classifying means to the pixel value of the subject pixel. In a case in which the pixel value of the subject pixel is within a predetermined range, the classifying means classifies the subject pixel as an offset class in which an offset is added, regardless of whether the offset type to which the unit area including the subject pixel belongs is the first offset type or the second offset type.

In the image filtering device configured as described above, in a case in which the pixel value of the subject pixel is within a predetermined range, the subject pixel is classified as an offset class in which an offset is added, regardless of whether the offset type to which the unit area including the subject pixel belongs is the first offset type or the second offset type, thereby making it possible to effectively eliminate block noise. Accordingly, with the above-described configuration, the coding efficiency can be improved.

An image filtering device according to the present invention is an image filtering device for adding an offset to a pixel value of each pixel forming an input image which is constituted by a plurality of unit areas. The image filtering device includes: determining means for determining an offset type to which a subject unit area belongs among a plurality of offset types; offset coding means for determining an offset having a bit width which differs depending on the offset type and for coding the offset; and filtering means for adding the determined offset to the pixel value of each pixel forming the input image.

In the image filtering device configured as described above, among a plurality of offset types, the offset type to which a subject unit area belongs is determined, an offset having a bit width which differs depending on the determined offset type is determined, and the determined offset is added to the pixel value of each pixel forming the input image. The determined offset is also coded.

Accordingly, with the above-described configuration, it is possible to perform appropriate offset filtering processing while the memory size of a memory for storing offsets is reduced. With the above-described configuration, since the amount of data required to code data is reduced, the coding efficiency is improved.

An offset coding device according to the present invention is an offset coding device for coding each offset which is referred to by an image filter for adding an offset to a pixel value of each pixel forming an input image. The offset coding device includes: prediction value determining means for determining a prediction value of each offset from a coded offset; offset residual calculating means for calculating an offset residual from each offset and a prediction value determined by the prediction value determining means; and offset residual coding means for coding an offset residual calculated by the offset residual calculating means.

In the offset coding device configured as described above, there are provided the prediction value determining means for determining a prediction value of each offset from a coded offset, the offset residual calculating means for calculating an offset residual from each offset and a prediction value determined by the prediction value determining means, and the offset residual coding means for coding an offset residual calculated by the offset residual calculating means. It is thus possible to reduce the amount of data required to code data can be reduced.

A data structure of coded data according to the present invention is a data structure of coded data which is referred to by an image filter for adding an offset to a pixel value of each pixel forming an input image which is constituted by a plurality of unit areas. The data structure includes: offset-type specifying information which specifies an offset type to which each unit area belongs; and an offset having a bit width which differs depending on the offset type. The image filter refers to the offset-type specifying information included in the coded data, and determines an offset type to which a subject unit area belongs and also decodes an offset having a bit width which differs depending on the determined offset type.

The coded data configured as describe above includes an offset having a bit width which differs depending on the offset type, thereby reducing the amount of data required to code data. The image filter which decodes the coded data refers to the offset-type specifying information, and determines the offset type to which a subject unit area belongs and also decodes an offset having a bit width which differs depending on the determined offset type. It is thus possible to perform appropriate offset filtering processing while the memory size of a memory for storing offsets is reduced.

The offset-type specifying information may be determined for each of the input images or for each of the unit areas. Alternatively, the offset-type specifying information may be determined for each predetermined set of the input images or for each predetermined set of the unit areas.

Advantageous Effects of Invention

As described above, an image filtering device according to the present invention is an image filtering device for adding an offset to a pixel value of each pixel forming an input image which is constituted by a plurality of unit areas. The image filtering device includes: offset attribute setting means for setting an offset value range by referring to coded data; offset decoding means for decoding an offset which is restricted to the set offset value range; and filtering means for adding the offset to the pixel value of each pixel forming the input image.

An image filtering device according to the present invention is an image filtering device for adding an offset to a pixel value of each pixel forming an input image which is constituted by a plurality of unit areas. The image filtering device includes: determining means for determining an offset type to which a subject unit area belongs among a plurality of offset types; offset coding means for determining an offset having a bit width which differs depending on the offset type and for coding the offset; and filtering means for adding the determined offset to the pixel value of each pixel forming the input image.

A data structure of coded data according to the present invention is a data structure of coded data which is referred to by an image filter for adding an offset to a pixel value of each pixel forming an input image which is constituted by a plurality of unit areas. The data structure includes: offset-type specifying information which specifies an offset type to which each unit area belongs; and an offset having a bit width which differs depending on the offset type. The image filter refers to the offset-type specifying information included in the coded data, and determines an offset type to which a subject unit area belongs and also decodes an offset having a bit width which differs depending on the determined offset type.

With the above-described configuration, it is possible to cause an image filter to perform appropriate offset filtering processing while the memory size of a memory for storing offsets is reduced.

BRIEF DESCRIPTION OF DRAWINGS

FIG. 3 illustrates each syntax included in offset information OI concerning coded data according to the first embodiment of the present invention.

FIG. 4 shows split modes of offset units according to the first embodiment of the present invention: part (a) shows a split mode when sao_curr_depth=0; part (b) shows a split mode when sao_curr_depth=1; part (c) shows a split mode when sao_curr_depth=2; part (d) shows a split mode when sao_curr_depth=3; and part (e) shows a split mode when sao_curr_depth=4.

FIG. 6 illustrates the first embodiment of the present invention: part (a) shows QAOMUs having a split depth of three and forming a subject unit of processing and QAOU indexes assigned to QAOMUs; and part (b) shows offset types associated with QAOU indexes 0 to 9 and offsets with respect to individual classes that can be selected for each offset type.

FIG. 9 illustrates, together with pixel bit depths, examples of offset bit depths and shift values set by an offset attribute setting section included in an adaptive filter according to the first embodiment of the present invention: parts (a) through (d) respectively show examples associated with patterns S1 through S4; and part (e) shows a case in which STEP=2 in part (d).

FIG. 13 illustrates offset processing performed by the adaptive offset filter according to the first embodiment of the present invention and shows a table indicating another example of classifying performed when a band offset is specified.

FIG. 20 illustrates the adaptive offset filter according to the second embodiment of the present invention: part (a) illustrates a first specific example of a function merge_tbl [sao_type_idx]; and part (b) illustrates a second specific example of the function merge_tbl[sao_type_idx].

FIG. 23 illustrates syntax of offset information OI of coded data according to the third embodiment.

FIG. 25 illustrates transform tables used by the offset information decoding section according to the third embodiment.

FIG. 29 illustrates an example of classifying performed when a band offset is specified: part (a) shows an example of classifying performed when the hierarchical depth of a subject QAOU is smaller than a threshold; and part (b) shows an example of classifying performed when the hierarchical depth of a subject QAOU is equal to or greater than the threshold.

FIG. 37 illustrates a case in which classifying is performed in accordance with the chrominance in the sixth embodiment; part (a) shows classifying performed by considering the pixel value of an achromatic color, part (b) shows classifying in which two value ranges are asymmetrically positioned with respect to the pixel values of an achromatic color, parts (c) and (d) show a case in which classifying is performed differently in accordance with the chrominance channel (Cr or Cb); and part (e) shows a case in which classifying is performed by using only one BO type.

FIG. 44 illustrates syntax of offset information and syntax of QAOU information according to the third embodiment: part (a) illustrates syntax of offset information; part (b) illustrates syntax of QAOU information; and part (c) illustrates the entire syntax of an adaptive offset filter which calls syntax of part (a) and syntax of part (b).

DESCRIPTION OF EMBODIMENTS

First Embodiment (Coded Data #1)

Prior to a detailed description of a video coding device 2 and a video decoding device 1 according to a first embodiment, the data structure of coded data #1 to be generated by the video coding device 2 and to be decoded by the video decoding device 1 will be discussed below.

Figure 2:
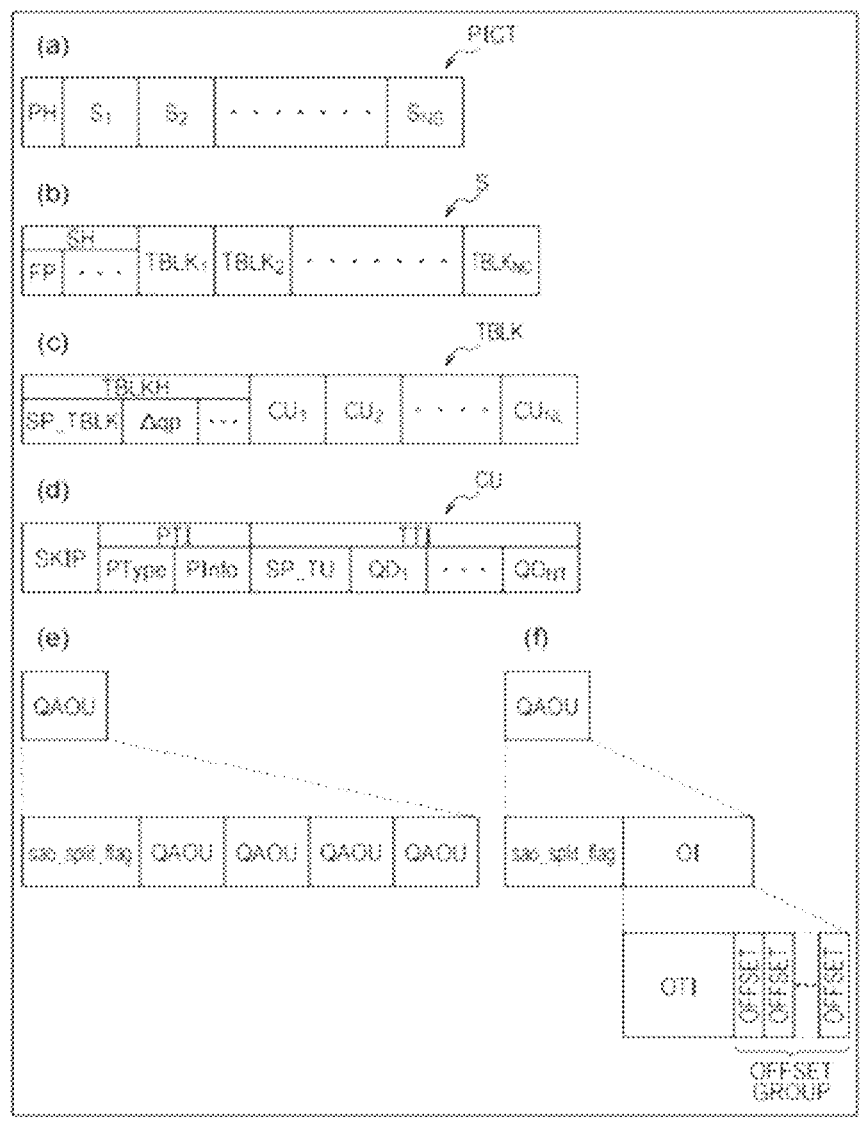
FIG. 2 illustrates a data structure of coded data generated by a video coding device according to the first embodiment of the present invention and decoded by a video decoding device according to the first embodiment of the present invention: parts (a) through (d) respectively illustrate a picture layer, a slice layer, a tree block layer, and a CU layer, part (e) illustrates the configuration of QAOU information concerning a QAOU which is not a leaf; and part (f) illustrates the configuration of QAOU information concerning a QAOU which is a leaf.

FIG. 2 illustrates the data structure of the coded data #1. The coded data #1 includes a sequence and a plurality of pictures forming the sequence by way of example.

The structures of hierarchical levels of a picture layer or lower layers of the coded data #1 are shown in FIG. 2. Parts (a) through (d) of FIG. 2 respectively illustrate a picture layer which defines a picture PICT, a slice layer which defines a slice S, a tree block layer which defines a tree block (Tree block) TBLK, and a CU layer which defines a coding unit (Coding Unit; CU) included in the tree block TBLK.

(Picture Layer)

In the picture layer, a set of data items to be referred to by the video decoding device 1 in order to decode a picture PICT to be processed (hereinafter also referred to as a "subject picture") are defined. The picture PICT includes, as shown in part (a) of FIG. 2, a picture header PH and slices $S_1$ through $S_{NS}$ (NS is the total number of slices included in the picture PICT).

If it is not necessary to distinguish the individual slices $S_1$ through $S_{NS}$ from each other, the subscripts of the reference numerals may be omitted. Other items of data provided with subscripts included in the coded data #1 described below are handled in a similar manner.

The picture header PH includes a coding parameter set to be referred to by the video decoding device 1 in order to determine a decoding method for a subject picture. For example, coding mode information (entropy_coding_mode_flag) which indicates the variable-length coding mode used when the video coding device 2 has performed coding is an example of coding parameters included in the picture header PH.

If entropy_coding_mode_flag is 0, the picture PICT has been coded by CAVLC (Context-based Adaptive Variable Length Coding). If entropy_coding_mode_flag is 1, the picture PICT has been coded by CABAC (Context-based Adaptive Binary Arithmetic Coding).

The picture header PH is also referred to as a "picture parameter set (PPS: Picture Parameter Set).

(Slice Layer)

In the slice layer, a set of data items to be referred to by the video decoding device 1 in order to decode a slice S to be processed (hereinafter also referred to as a "subject slice") are defined. The slice S includes, as shown in part (b) of FIG. 2, a slice header SH and a sequence of tree blocks $TBLK_1$ through $TBLK_{NC}$ (NC is the total number of tree blocks included in the slice S).

The slice header SH includes a coding parameter set to be referred to by the video decoding device 1 in order to determine a decoding method for a subject slice. Slice-type specifying information (slice_type) which specifies a slice type is an example of coding parameters included in the slice header SH.

Examples of slice types that can be specified by the slice-type specifying information are (1) I slice which uses only intra prediction when coding is performed, (2) P slice which uses unidirectional prediction or intra prediction when coding is performed, and (3) B slice which uses unidirectional prediction, bidirectional prediction, or intra prediction when coding is performed.

The slice header SH also includes a filter parameter FP to be referred to by an adaptive filter provided in the video decoding device 1. The filter parameter FP may be included in the picture header PH.

(Tree Block Layer)

In the tree block layer, a set of data items to be referred to by the video decoding device 1 in order to decode a tree block TBLK to be processed (hereinafter also referred to as a "subject tree block") are defined. The tree block may also be referred to as a largest coding unit (LCU: Largest Coding Unit).

The tree block TBLK includes a tree block header TBLKH and items of coding unit information $CU_1$ through $CU_{NL}$ (NL is the total number of items of coding unit information included in the tree block TBLK). The relationship between the tree block TBLK and the coding unit information CU will first be discussed below.

The tree block TBLK is split into partitions for specifying the block size which is used for each of processing operations, such as intra prediction, inter prediction, and transform.

The partitions of the tree block TBLK are obtained by recursive quadtree splitting. Hereinafter, the tree structure obtained by this recursive quadtree splitting will be referred to as a "coding tree".

Hereinafter, a partition corresponding to a leaf, which is an end node of a coding tree, will be referred to as a coding node. The coding node is a basic unit of coding processing, and thus, it will also be referred to as a "coding unit (CU)".

That is, each of the items of coding unit information $CU_1$ through $CU_{NL}$ (hereinafter referred to as "CU information") is information corresponding to each coding node (coding unit) obtained by performing recursive quadtree splitting on the tree block TBLK.

The root of the coding tree is associated with the tree block TBLK. In other words, the tree block TBLK is associated with the highest node of a quadtree splitting tree structure in which a plurality of coding nodes are included in a recursive manner.

The vertical and horizontal sizes of each coding node are half the vertical and horizontal sizes of a higher coding node to which the coding node directly belongs (that is, a partition of a node one level higher than the coding node).

The possible sizes of each coding node are dependent on size specifying information and maximum hierarchical depth of the coding node included in a sequence parameter set SPS of the coded data #1. For example, if the size of a tree block TBLK is 64×64 pixels and the maximum hierarchical depth is three, each of the coding nodes of the tree block TBLK and lower levels may take one of the three sizes, that is, 64×64 pixels, 32×32 pixels, and 16×16 pixels.

(Tree Block Header)

In the tree block header TBLKH, coding parameters referred to by the video decoding device 1 in order to determine a decoding method for a subject tree block are included. More specifically, as shown in part (c) of FIG. 2, tree block split information SP_TBLK which specifies a split pattern for splitting a subject tree block into CUs and a quantization parameter difference Δqp (qp_delta) which specifies the quantization step size are included.

The tree block split information SP_TBLK is information indicating a coding tree for splitting a tree block, and more specifically, the configuration and the size of each of the CUs included in the subject tree block and the position of each CU within the subject tree block.

The tree block split information SP_TBLK does not have to explicitly include the configuration and the size of each CU. For example, the tree block split information SP_TBLK may be a set of flags (split_coding_unit_flag) indicating whether or not the entire subject tree block or sub-regions of the tree block will be subjected to quadtree splitting. In this case, the configuration and the size of the tree block are utilized together with the set of flags, thereby making it possible to specify the configuration and the size of each CU.

The quantization parameter difference Δqp is a difference qp-qp' between the quantization parameter qp used in the subject tree block and the quantization parameter qp' used in a tree block which has been coded immediately before the subject tree block.

(CU Layer)

In the CU layer, a set of data items referred to by the video decoding device 1 for decoding a CU to be processed (hereinafter also referred to as a "subject CU") are defined.

Prior to a specific description of data items included in CU information CU, the tree structure of data items included in a CU will be discussed below. The coding node is a node of a root of a prediction tree (PT) or a node of a root of a transform tree (TT). The prediction tree and the transform tree will be discussed as follows.

In the prediction tree, a coding node is split into one or a plurality of prediction blocks, and the position and the size of each prediction block are defined. In other words, one prediction block or the prediction blocks are one or a plurality of non-overlapping regions forming a coding node. The prediction tree includes one or a plurality of prediction blocks obtained by the above-described splitting.

Prediction processing is performed on each prediction block. The prediction block, which is a unit of prediction, will also be referred to as a "prediction unit (PU)".

Broadly speaking, split methods used in a prediction tree are divided into two types, that is, one type using intra prediction and the other type using inter prediction.

In the type of intra prediction, the split method includes split patterns of 2N×2N (the same size as that of a coding node) and N×N.

In the type of inter prediction, the split method includes split patterns of 2N×2N (the same size as that of the coding node), 2N×N, N×2N, and N×N.

In the transform tree, a coding node is split into one or a plurality of transform blocks, and the position and the size of each transform block are defined. In other words, one transform block or the transform blocks are one or a plurality of non-overlapping regions forming a coding node. The transform tree includes one or a plurality of transform blocks obtained by the above-described splitting.

Split methods used in the transform tree are divided into the following types: assigning a region having the same size as that of a coding node as the transform block; and assigning regions obtained by performing recursive quadtree splitting, as in the splitting of the above-described tree block, as transform blocks.

Transform processing is performed on each transform block. The transform block, which is a unit of transform, will also be referred to as a "transform unit (TU)".

(Data Structure of CU Information)

Data included in the CU information CU will now be specifically discussed below with reference to part (d) of FIG. 2. Specifically, the CU information CU includes, as shown in part (d) of FIG. 2, a skip flag SKIP, PT information PTI, and TT information TTI.

The skip flag SKIP is a flag indicating whether or not a skip mode is applied to a subject PU. If the value of the skip flag SKIP is 1, that is, if the skip mode is applied to a subject CU, the PT information PTI and the TT information TTI of this CU information CU are omitted. The skip flag SKIP is omitted in I slices.

The PT information PTI is information concerning a PT included in the CU. In other words, the PT information PTI is a set of information items concerning one or a plurality of PUs included in the PT and is referred to by the video decoding device 1 when generating prediction images. The PT information PTI includes, as shown in part (d) of FIG. 2, prediction type information PType and prediction information PInfo.

The prediction type information PType is information which specifies whether intra prediction or inter prediction will be used as the prediction-image generating method for the subject PU.

The prediction information PInfo is constituted by intra-prediction information or inter-prediction information, depending on whether the prediction type information PType specifies intra prediction or inter prediction. Hereinafter, a PU to which intra prediction is applied may also be referred to as an "intra PU", and a PU to which inter prediction is applied may also be referred to as an "inter PU".

The prediction information PInfo also includes information which specifies the configuration, size, and position of the subject PU. As stated above, the generation of a prediction image is performed by using a PU as a unit. Details of the prediction information PInfo will be discussed later.

The TT information TTI is information concerning a TT included in the CU. In other words, the TT information TTI is a set of information items concerning one or a plurality of TUs included in the TT and is referred to by the video decoding device 1 when decoding residual data. Hereinafter, a TU may also be referred to as a "block".

The TT information TTI includes, as shown in part (d) of FIG. 2, TT split information SP_TT which specifies a split pattern used for splitting the subject CU into transform blocks and quantized prediction residuals $QD_1$ through $QD_{NT}$ (NT is the total number of blocks included in the subject CU).

The TT split information SP_TT is information for determining the configuration and the size of each TU included in the subject CU and the position of each TU within the subject CU. For example, the TT split information SP_TT may be implemented by information (split_transform_unit_flag) indicating whether or not a subject node will be split and information (trafoDepth) indicating the depth of the splitting.

If the size of a CU is 64×64, the size of each of TUs obtained by splitting the CU may be in a range of 32×32 pixels to 2×2 pixels.

Each quantized prediction residual QD is coded data generated as a result of the video coding device 2 executing the following Processing 1 through Processing 3 on a subject block, which is a block to be processed.

Processing 1: performing DCT transform (Discrete Cosine Transform) on a prediction residual obtained by subtracting a prediction image from an image to be coded;

Processing 2: quantizing a transform coefficient obtained in Processing 1; and

Processing 3: performing variable-length coding on the transform coefficient quantized in Processing 2.

The above-described quantization parameter qp represents a quantization step size QP ($QP=2^{qp/6}$) used when the video coding device 2 quantizes the transform coefficient.

(Prediction Information PInfo)

As stated above, the prediction information PInfo has two types, that is, inter-prediction information and intra-prediction information.

The inter-prediction information includes coding parameters referred to by the video decoding device 1 when generating an inter-prediction image by using inter prediction. More specifically, the inter-prediction information includes inter PU split information which specifies a split pattern used for splitting a subject CU into inter PUs and inter-prediction parameters concerning individual inter PUs.

The inter-prediction parameters include a reference image index, an estimation motion-vector index, and a motion-vector residual.

The intra-prediction information includes coding parameters referred to by the video decoding device 1 when generating an intra-prediction image by using intra prediction. More specifically, the intra-prediction information includes intra PU split information which specifies a split pattern used for splitting a subject CU into intra PUs and intra-prediction parameters concerning individual intra PUs. The intra-prediction parameter is a parameter for specifying an intra-prediction method (prediction mode) for each intra PU.

(Offset Unit)

In this embodiment, each picture or each slice is recursively split into a plurality of offset units (may also be referred to as "QAOU: Quad Adaptive Offset Unit") in accordance with a quadtree structure. The QAOU is a processing unit of offset filtering processing performed by an adaptive offset filter of this embodiment.

As shown in parts (e) and (f) of FIG. 2, QAOU information, which is information concerning each QAOU, includes sao_split_flag indicating whether or not the QAOU will be further split. More specifically, sao_split_flag is specified by arguments (sao_curr_depth, ys, xs), which will be discussed later, and is also represented by sao_split_flag[sao_curr_depth][ys][xs].

If sao_split_flag included in a QAOU indicates that the QAOU will be further split (that is, if the QAOU is not a leaf), the QAOU information concerning the QAOU includes, as shown in part (e) of FIG. 2, items of QAOU information concerning a plurality of QAOUs included in the QAOU.

On the other hand, if sao_split_flag included in a QAOU indicates that the QAOU will not be further split (that is, if the QAOU is a leaf), the QAOU information concerning the QAOU includes, as shown in part (f) of FIG. 2, offset information OI concerning the QAOU. The offset information OI includes, as shown in part (f) of FIG. 2, offset-type specifying information OTI which specifies an offset type and an offset group which is determined in accordance with the offset type. As shown in part (f) of FIG. 2, the offset group includes a plurality of offsets.

An offset included in coded data is a quantized value. An offset included in coded data may be a prediction residual obtained by using a certain prediction, for example, a linear prediction. If the pixel bit depth, which will be discussed later, is variably set for each unit area, the pixel bit depth for an area to be processed may be included in the offset-type specifying information OTI, since the offset bit depth, the offset value range, and the shift value are changed in accordance with the pixel bit depth in this embodiment.

The offset information OI will be discussed below by changing drawings for reference.

Figures 3, 4:
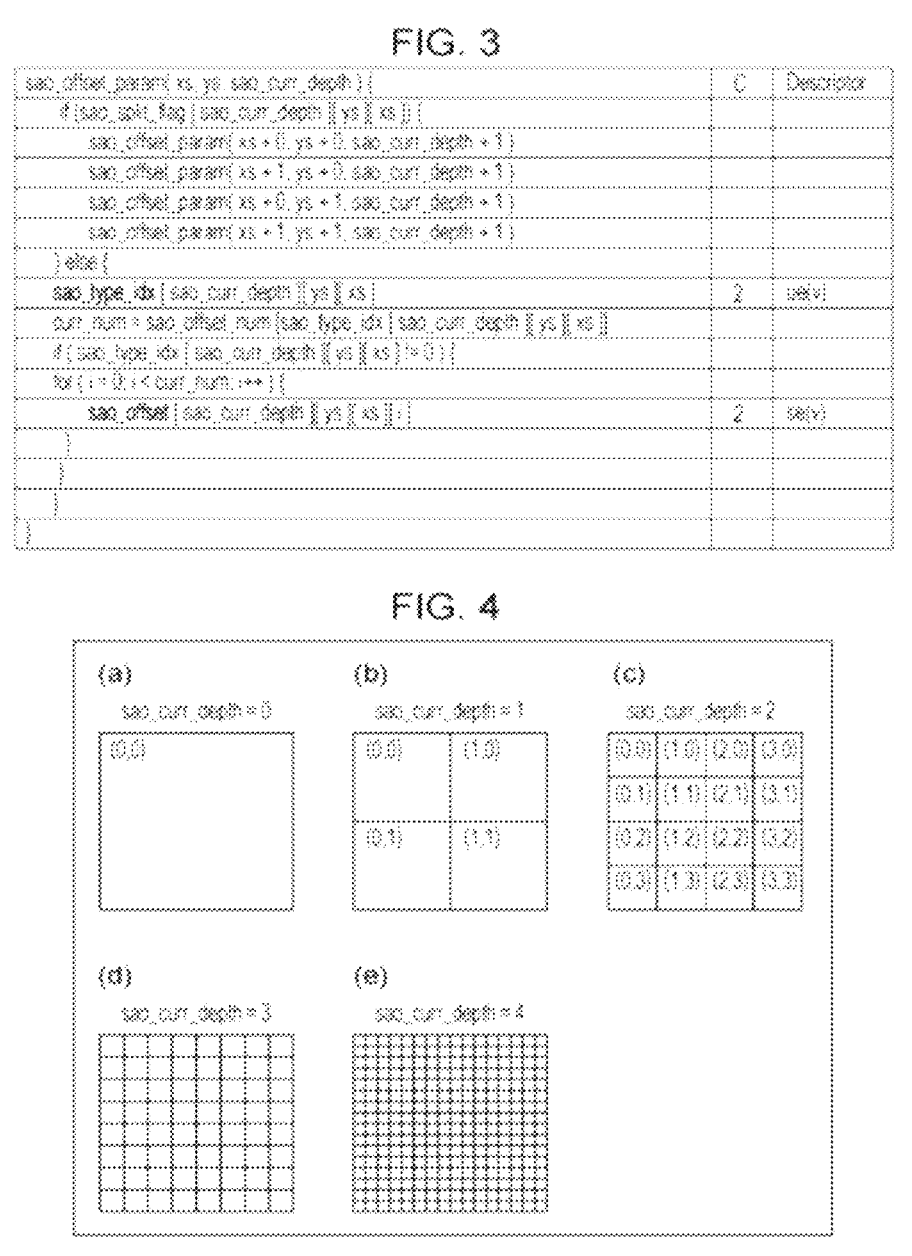

FIG. 3 illustrates each syntax included in the offset information OI (indicated by sao_offset_param( ) in FIG. 3).

As shown in FIG. 3, the offset information OI includes a syntax sao_type_idx[sao_curr_depth][ys][xs]. If sao_type_idx[sao_curr_depth][ys][xs] is not 0, sao_offset [sao_curr_depth][ys][xs][i] is included in the offset information OI.

(sao_curr_depth, ys, xs)

An argument sao_curr_depth, which is an argument of sao_type idx and sao_offset, is an index indicating the split depth of a QAOU, and ys and xs are indexes respectively indicating the position in the y direction and the position in the x direction of a QAOU (or a QAOMU, which will be discussed later).

Parts (a) through (e) of FIG. 4 show split modes of a QAOU in accordance with the values of sao_curr_depth: part (a) shows a split mode when sao_curr_depth=0, part (b) shows a split mode when sao_curr_depth=1, part (c) shows a split mode when sao_curr_depth=2, part (d) shows a split mode when sao_curr_depth=3, and part (e) shows a split mode when sao_curr_depth=4. As shown in parts (a) through (e) of FIG. 4, each QAOU is specified by sao_curr_depth and (xs, ys).

As shown in part (a) of FIG. 4, when sao_curr_depth=0, xs and ys are both 0. As shown in part (b) of FIG. 4, when sao_curr_depth=1, xs and ys take 0 or 1. As shown in part (c) of FIG. 4, when sao_curr_depth=2, xs and ys take one of 0, 1, 2, and 3. Generally, in response to a given value of sao_curr_depth, xs and ys take values of 0 to $2^{sao\_curr\_depth}-1$.

(sao_type_idx)

Syntax sao_type_idx[sao_curr_depth][ys][xs] corresponds to the above-described offset-type specifying information OTI, and is syntax for specifying the offset type of each QAOU. Hereinafter, sao_type_idx may be simply referred to as an "offset type".

In this embodiment, sao_type_idx[sao_curr_depth][ys] [xs] takes integers from 0 to 6. When sao_type_idx [sao_curr_depth][ys][xs]=0, it indicates that offset filtering processing is not performed on an image which has not been yet subjected to offset filtering (for example, a deblocked decoded image P_DB, which will be discussed later) in a subject QAOU. When sao_type_idx[sao_curr_depth][ys] [xs]=1 to 4, it indicates that edge offset processing is performed on an image which has not been yet subjected to offset filtering in a subject QAOU. When sao_type_idx [sao_curr_depth][ys][xs]=5 or 6, it indicates that band offset processing is performed on an image which has not been yet subjected to offset filtering in a subject QAOU. The edge offset processing and band offset processing will be discussed later specifically.

(sao_offset)

Syntax sao_offset[sao_curr_depth][ys][xs][i] is syntax which represents a specific value of an offset to be added to each pixel included in a subject QAOU in offset filtering processing using an adaptive offset filter of this embodiment. In this embodiment, sao_offset may also be simply referred to as an "offset".

Syntax sao_offset[sao_curr_depth][ys][xs][i] is specified by the index i as well as the arguments sao_curr_depth, ys, and xs. The index i is an index for specifying a class, and is also indicated by class_idx. The index i takes one of integers 0 to 4 when the value of sao_type_idx[sao_curr_depth][ys] [xs] is one of 1 to 4 (that is, in the case of an edge offset). The index i takes one of integers 0 to 16 when the value of sao_type_idx[sao_curr_depth][ys][xs] is 5 or 6 (that is, in the case of a band offset). In whichever case, when i is 0, it indicates that an offset is not added, which will be discussed later.

The adaptive offset filter of this embodiment classifies a subject pixel included in a subject QAOU as one of the above-described plurality of classes, and adds an offset Offset associated with the class of the subject pixel to the subject pixel. This will be discussed later.

Descriptor ue(v) shown in FIG. 3 indicates that syntax associated with this descriptor is an unsigned numeric value and that variable-length coding will be performed on the numeric value. Descriptor se(v) shown in FIG. 3 indicates that syntax associated with this descriptor is a signed numeric value and that variable-length coding will be performed on a sign and an absolute value forming the numeric value.

(Video Decoding Device 1)

The video decoding device 1 of this embodiment will be described below with reference to FIGS. 1 and 5 through 13. The video decoding device 1 partially includes a method defined in H. 264/MPEG-4. AVC, a method used in KTA software, which is a joint development codec in VCEG (Video Coding Expert Group), a method used in TMuC (Test Model under Consideration) software, which is a successor codec to the codec used in KTA software, and a technology used in HM (HEVC TestModel) software.

Figure 5:
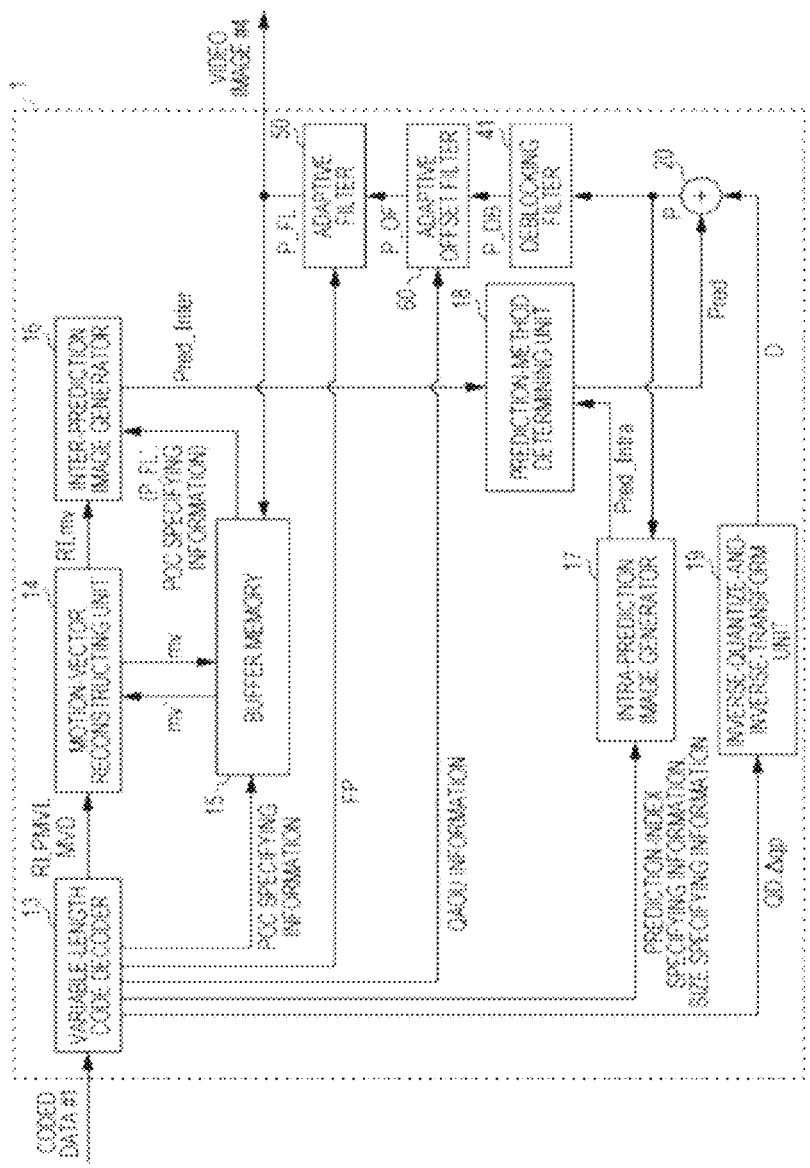
FIG. 5 is a block diagram illustrating the configuration of the video decoding device according to the first embodiment of the present invention.

FIG. 5 is a block diagram illustrating the configuration of the video decoding device 1. The video decoding device 1 includes, as shown in FIG. 5, a variable-length code decoder 13, a motion-vector reconstructing unit 14, a buffer memory 15, an inter-prediction image generator 16, an intra-prediction image generator 17, a prediction-method determining unit 18, an inverse-quantize-and-inverse-transform unit 19, an adder 20, a deblocking filter 41, an adaptive filter 50, and an adaptive offset filter 60. The video decoding device 1 is a device for generating a video image #4 by decoding coded data #1.

The variable-length code decoder 13 decodes a prediction parameter PP concerning each partition from the coded data #1. That is, concerning an inter-prediction partition, the variable-length code decoder 13 decodes a reference image index RI, an estimation motion-vector index PMVI, and a motion-vector residual MVD from the coded data #1, and supplies them to the motion-vector reconstructing unit 14. On the other hand, concerning an intra-prediction partition, the variable-length code decoder 13 decodes (1) size specifying information which specifies the size of the partition and (2) prediction-index specifying information which specifies a prediction index from the coded data #1, and supplies them to the intra-prediction image generator 17. The variable-length code decoder 13 also decodes CU information from the coded data and supplies it to the prediction-method determining unit 18 (the flow of CU information is not shown). The variable-length code decoder 13 also decodes a quantized prediction residual QD concerning each block and a quantization parameter difference Δqp concerning a tree block including this block from the coded data #1 and supplies them to the inverse-quantize-and-inverse-transform unit 19. The variable-length code decoder 13 also extracts QAOU information from the coded data #1 and supplies the extracted QAOU information to the adaptive offset filter 60.

The motion-vector reconstructing unit 14 reconstructs a motion vector my concerning each inter-prediction partition from the motion-vector residual MVD concerning this partition and from a reconstructed motion vector mv' concerning another partition. More specifically, the motion-vector reconstructing unit 14 (1) determines an estimation motion vector pmv from the reconstructed motion vector mv' in accordance with an estimation method specified by the estimation motion vector index PMVI, and (2) obtains the motion vector my by adding the motion-vector residual MVD to the estimation motion vector pmv. The reconstructed motion vector mv' concerning another partition may be read from the buffer memory 15. The motion-vector reconstructing unit 14 supplies the reconstructed motion vector my to the inter-prediction image generator 16, together with the associated reference image index RI. In the case of an inter-prediction partition on which bidirectional prediction (weighted prediction) will be performed, the motion-vector reconstructing unit 14 supplies two reconstructed motion vectors mv1 and mv2 to the inter-prediction image generator 16, together with associated reference image indexes RI1 and RI2.

The inter-prediction image generator 16 generates a motion-compensated image me concerning each inter-prediction partition. More specifically, the inter-prediction image generator 16 generates a motion-compensated image me from a filtered decoded image P_FL' specified by the reference image index RI supplied from the motion-vector reconstructing unit 14 by using the motion vector my supplied from the motion-vector reconstructing unit 14. The filtered decoded image P_FL' is an image obtained by performing deblocking processing by using the deblocking filter 41, offset filtering processing by using the adaptive offset filter 60, and adaptive filtering processing by using the adaptive filter 50 on a decoded image P. The inter-prediction image generator 16 may read pixel values of individual pixels forming the filtered decoded image P_FL' from the buffer memory 15. The motion-compensated image me generated by the inter-prediction image generator 16 is supplied to the prediction-method determining unit 18 as an inter-prediction image Pred_Inter. In the case of an inter-prediction partition on which bidirectional prediction (weighted prediction) will be performed, the inter-prediction image generator 16 performs: (1) generating a motion-compensated image mc1 from a filtered decoded image P_FL1' specified by the reference image index RI1 by using a motion vector mv1; (2) generating a motion-compensated image mc2 from a filtered decoded image P_FL2' specified by the reference image index RI2 by using a motion vector mv2; and (3) generating an inter-prediction image Pred_Inter by adding an offset value to a weighted average of the motion-compensated image mc1 and the motion-compensated image mc2.

The intra-prediction image generator 17 generates a prediction image Pred_Intra concerning each intra-prediction partition. More specifically, the intra-prediction image generator 17 refers to a prediction mode decoded from the coded data #1 and assigns the prediction mode to a subject partition, for example, in a raster scanning order. Then, the intra-prediction image generator 17 generates a prediction image Pred_Intra from the decoded image P in accordance with the prediction method represented by the prediction mode. The intra-prediction image Pred_Intra generated by the intra-prediction image generator 17 is supplied to the prediction-method determining unit 18.

The intra-prediction image generator 17 also supplies the size of the subject partition and intra-coding mode information IEM, which is information indicating the prediction mode assigned to the subject partition, to the adaptive filter 50.

The prediction-method determining unit 18 determines, on the basis of the CU information, whether each partition is an inter-prediction partition to be subjected to inter prediction or an intra-prediction partition to be subjected to intra prediction. If the subject partition is an inter-prediction partition, the prediction-method determining unit 18 supplies the inter-prediction image Pred_Inter generated by the inter-prediction image generator 16 to the adder 20 as the prediction image Pred. If the subject partition is an intra-prediction partition, the prediction-method determining unit 18 supplies the intra-prediction image Pred_Intra generated by the intra-prediction image generator 17 to the adder 20 as the prediction image Pred.

The inverse-quantize-and-inverse-transform unit 19 performs: (1) inverse-quantizing the quantized prediction residual QD; (2) inverse-DCT (Discrete Cosine Transform) transform on a DCT coefficient obtained by performing inverse quantization; and (3) supplying a prediction residual D obtained by performing inverse DCT transform to the adder 20. When performing inverse quantization on the quantized prediction residual QD, the inverse-quantize-and-inverse-transform unit 19 determines a quantization step QP from the quantization parameter difference $\Delta qp$ supplied from the variable-length code decoder 13. The quantization parameter qp can be determined by adding the quantization parameter difference $\Delta qp$ to a quantization parameter qp' concerning a tree block which has been subjected to inverse-quantization and inverse-DCT transform immediately before the subject tree block, and the quantization step QP can be determined by calculating $QP=2^{pq/6}$ from the quantization step qp. The generation of a prediction residual D by the inverse-quantize-and-inverse-transform unit 19 is performed by using a block (transform unit) as a unit.

The adder 20 generates a decoded image P by adding the prediction residual D supplied from the inverse-quantize-and-inverse-transform unit 19 to the prediction image Pred supplied from the prediction-method determining unit 18.

When the difference between the pixel values of pixels adjacent to each other with a block boundary or a CU boundary therebetween in the decoded image P is smaller than a predetermined threshold, the deblocking filter 41 performs deblocking processing on the block boundary or the CU boundary in the decoded image P, thereby smoothing an image in the vicinity of the block boundary or the CU boundary. The image subjected to deblocking processing by the deblocking filter 41 is output to the adaptive offset filter 60 as a deblocked decoded image P_DB.

The adaptive offset filter 60 performs offset filtering processing using an offset decoded from the coded data #1 on the deblocked decoded image P_DB supplied from the deblocking filter 41, by using a QAOU as a unit of processing, thereby generating an offset-filtered decoded image P_OF. The generated offset-filtered decoded image P_OF is supplied to the adaptive filter 50. The specific configuration of the adaptive filter 60 will be discussed later, and thus, an explanation thereof is omitted here.

The adaptive filter 50 performs filtering processing using a filter parameter FP decoded from the coded data #1 on the offset-filtered decoded image P_OF supplied from the adaptive offset filter 60, thereby generating a filtered decoded image P_FL. The image subjected to filtering processing by the adaptive filter 50 is output to the exterior as the filtered decoded image P_FL and is also stored in the buffer memory 15 in association with POC specifying information decoded from the coded data by the variable-length code decoder 13.

(Adaptive Offset Filter 60)

Figure 1:
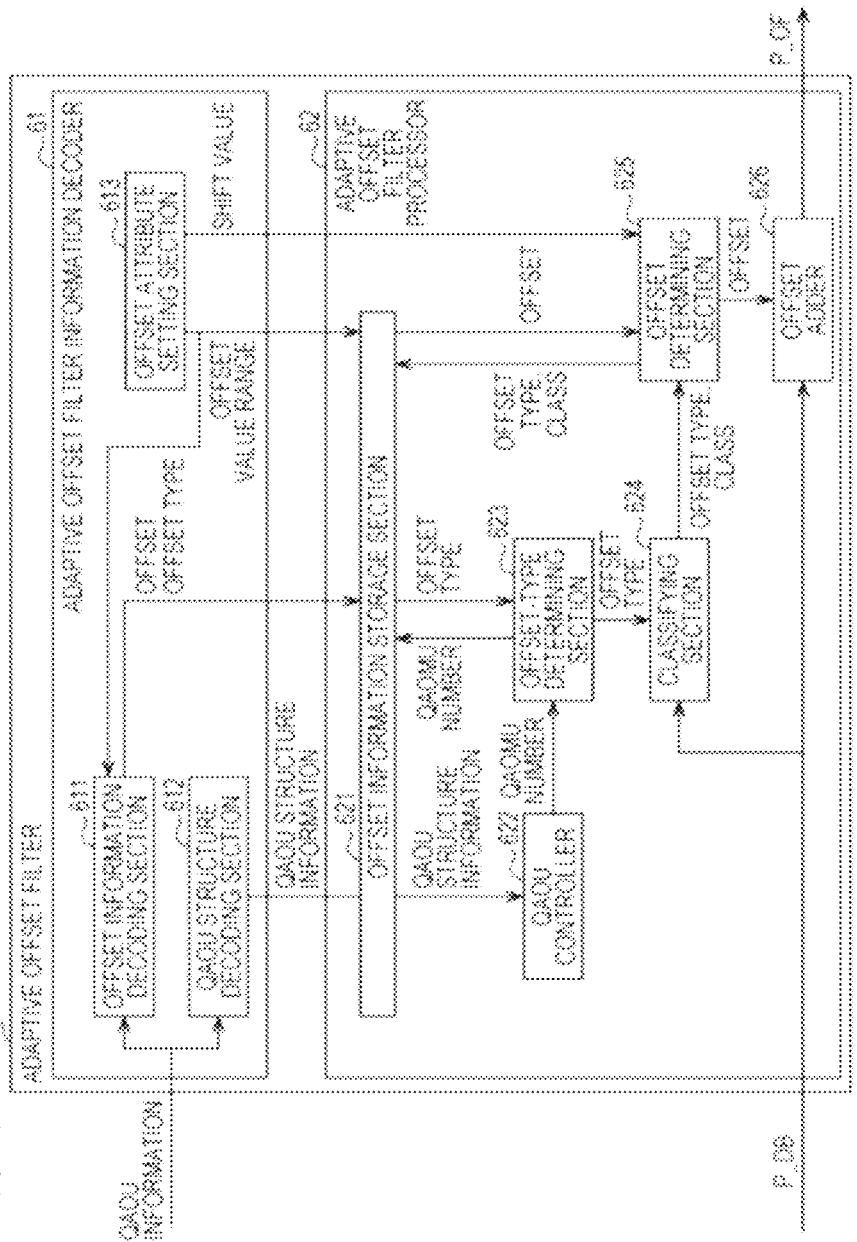
FIG. 1 is a block diagram illustrating the configuration of an adaptive offset filter according to a first embodiment of the present invention.

FIG. 1 is a block diagram illustrating the configuration of the adaptive offset filter 60. The adaptive offset filter 60 includes, as shown in FIG. 1, an adaptive offset filter information decoder 61 and an adaptive offset filter processor 62.

The adaptive offset filter information decoder 61 includes, as shown in FIG. 1, an offset information decoding section 611, a QAOU structure decoding section 612, and an offset attribute setting section 613.

The offset information decoding section 611 refers to QAOU information included in the coded data #1 and decodes offset information OI included in the QAOU information. The values sao_type_idx[sao_curr_depth][ys][xs] and sao_offset[sao_curr_depth][ys][xs][i] obtained by decoding the offset information OI are supplied to an offset information storage section 621 in association with the arguments (sao_curr_depth, ys, xs) and the arguments (sao_curr_depth, ys, xs, i), respectively.

The QAOU structure decoding section 612 determines a QAOU split structure by decoding sao_split_flag [sao_curr_depth][ys][xs] included in the QAOU information, and supplies QAOU structure information indicating the determined QAOU split structure to the offset information storage section 621.

The offset attribute setting section 613 determines the offset bit depth (also referred to as "SAO_DEPTH) and the offset value range. In this case, the offset bit depth is determined from the pixel bit depth (also referred to as "PIC_DEPTH") (not shown) input into the offset attribute setting section 613. The pixel bit depth represents a range of pixel values forming an image input into the adaptive offset filter 60 as the bit width. When the pixel bit depth is N bits, the pixel values take a range of 0 to $2^N-1$. For example, when the pixel bit depth is 8 bits, the pixel values may take range of 0 to 255. If the image input into the adaptive offset filter 60 is a decoded image obtained by the video decoding device 1 or a locally decoded image obtained by the video coding device 2, the bit depth of the decoded image or the locally decoded image is used. The precision of an image input into the adaptive offset filter 60 and the precision of an image output from the adaptive offset filter 60 are represented by the pixel bit depth.

As the pixel bit depth, a value determined by using syntax in the coded data #1 can be decoded and used. For example, in the case of H. 264/AVC, the pixel bit depth can be determined by using bit_depth_luma_minus8 in a sequence parameter set. In another mode, the pixel bit depth may be determined for each unit area to be processed, in which case, the pixel bit depth is decoded from the header of each unit area. The pixel bit depth in each unit area may be included in the parameter information or the header in the coded data #1, which is used for decoding an image input into the adaptive offset filter 60, or may be included as part of the QAOU information. If the pixel bit depth is included in the parameter information or the header, which is used for decoding an input image, it may be included in a picture parameter header, a slice header, an LCU, or a CU. If the pixel bit depth is included in part of the QAOU information, it may be included in a leaf QAOU or in QAOU information of a predetermined level (for example, the highest level QAOU or the first level QAOU). Concerning the coding of the pixel bit depth, it is preferable that it is coded as a difference value from eight bits. If part of the QAOU information is used, instead of using the pixel bit depth, it is also suitable that a shift value itself is coded. In this case, the shift value may be suitably coded only when it exceeds eight bits. The shift value is a bit shift amount which is necessary for performing inverse quantization. As a parameter used for inverse quantization, a step value may be used instead of the shift value. In this case, inverse quantization of an offset is performed by multiplying the offset by a step value, and quantization of an offset is performed by dividing the offset by a step value.

The offset bit depth is a value indicating the precision of an offset coded in the coded data #1. The offset included in the coded data #1 is a quantized value, and this quantized offset is decoded, and is then subjected to inverse quantization and is transformed into the bit depth corresponding to the pixel bit depth by an offset determining unit 625, which will be discussed later. Then, the inverse-quantized offset is added by an offset adder 626, which will be discussed later. The offset bit depth has a value equal to or smaller than the pixel bit depth. If the offset bit depth is smaller than the pixel bit depth by k bits, it means that the value of a coded offset is a value quantized by an offset quantization step of $2^k$. Transformation from the decoded bit depth (offset bit depth) into the pixel bit depth is performed by the offset determining unit 625, which will be discussed later.

The offset attribute setting section 613 sets an offset value range by using the determined offset bit depth. The offset attribute setting section 613 further sets a shift value from the offset pixel bit depth and the offset value range. The set offset value range and the set shift value are supplied to the offset information storage section 621 and the offset information decoding section 611. The determination of the offset bit depth and the setting of the shift value are performed by using one of patterns S1 through S6, which will be discussed later. The setting of the offset value range is performed by using one of patterns C1 and C2, which will be discussed later. The offset value range and the shift value, which are both used as attributes of an offset, are referred to as "offset attributes". The adaptive offset filter processor 62 includes, as shown in FIG. 1, the offset information storage section 621, a QAOU controller 622, an offset-type determining section 623, a classifying section 624, the offset determining section 625, and an offset adder 626.

The offset information storage section 621 manages and stores the offset type specified for each QAOU and specific values of offsets with respect to individual classes that can be selected for the specified offset type, on the basis of the QAOU structure information, sao_type_idx [sao_curr_depth][ys][xs], and sao_offset[sao_curr_depth] [ys][xs][i]. The offset information storage section 621 has a map memory and a list memory.

In the map memory, a QAOU index assigned to each offset minimum unit (also referred to as "QAOMU: Quad Adaptive Offset Minimum Unit"), which is determined by the split depth, is stored. The QAOU index will be discussed later. The map memory will now be described below with reference to part (a) of FIG. 6. Part (a) of FIG. 6 illustrates examples of QAOU indexes stored in the map memory, and shows QAOMUs having a split depth of three and forming the unit of processing (for example, an LCU) and QAOU indexes assigned to QAOMUs. In part (a) of FIG. 6, indexes 0 to 9 specify QAOUs in a simple manner without considering the QAOU split depth. In the example shown in part (a) of FIG. 6, a QAOU specified by QAOU index=1 is indicated by QAOUI. In part (a) of FIG. 6, the thin lines indicate QAOMU boundaries, while the thick lines indicate QAOU boundaries.

As shown in part (a) of FIG. 6, QAOU0 is constituted by four QAOMUs, and 0 is assigned to these four QAOMUs as the QAOU index. QAOU3 is constituted by one QAOMU, and 3 is assigned to this QAOMU as the QAOU index. In this manner, in the map memory, QAOU indexes assigned to the individual QAOMUs are stored.

In the list memory, each QAOU index, the offset type associated with each QAOU index, and specific values of offsets with respect to classes that can be selected for this offset type are stored in association with each other. In the offset information storage section 621, offsets having a restricted range of values set by the offset attribute setting section 613 are stored.

Part (b) of FIG. 6 illustrates an example of information stored in the list memory, and shows an offset type associated with each of the QAOU indexes 0 to 9 and offsets with respect to individual classes that can be selected for each offset type. In part (b) of FIG. 6, "xxx" indicates specific numeric values that may be different from each other.

In part (b) of FIG. 6, "BO_1" indicates an offset type specified by sao_type_idx=5. "EO_1" indicates an offset type specified by sao_type_idx=1. In this manner, edge offsets, which are of an offset type specified by sao_type_idx=1, 2, 3, 4, are also indicated by EO_1, 2, 3, 4, respectively, and band offsets, which are of an offset type specified by sao_type_idx=5, 6, are also indicated by BO_1, 2, respectively.

As shown in part (b) of FIG. 6, when the offset type is a band offset, a total of sixteen offsets, that is, the offset 1 through the offset 16, are stored in the list memory for this offset type. The offset 1 through the offset 16 are values specified by sao_offset[sao_curr_depth][ys][xs][1] through sao_offset[sao_curr_depth][ys][xs][16], respectively, when the value of sao_type_idx[sao_curr_depth][ys][xs] is 5 or 6. On the other hand, when the offset type is an edge offset, a total of four offsets, that is, the offset 1 through the offset 4, are stored in the list memory for this offset type. The offset 1 through the offset 4 are values specified by sao_offset [sao_curr_depth][ys][xs][1] through sao_offset [sao_curr_depth][ys][xs][4], respectively, when the value of sao_type_idx[sao_curr_depth][ys][xs] is one of 1, 2, 3, and 4. No value is stored in the offset 5 through the offset 16.

The memory size of each offset stored in the list memory is determined by the offset value range supplied from the offset attribute setting section 613. When the offset value range is $-2^4$ to $2^4-1$, each offset can be represented by five bits, and thus, a memory size having five bits is required.

A QAOMU number is appended to each QAOMU, and the QAOMUs can be distinguished from each other by the QAOMU numbers. Hereinafter, QAOMU having a QAOMU number NQ will also be referred to as "QAOMU$_Q$".

QAOU indexes are QAOU block numbers which are serially specified when the split depth is 0 to the maximum. If the maximum split depth is four, values of 0 to 340 are specified for all the blocks (1+4+16+64+256=341) of all the split depths by the QAOU indexes, as shown in FIG. 7.

Since it is not necessary to store all the QAOU offsets of all the split depths in the offset information storage section 621 used in the video decoding device 1, there is no need to secure 341 memory areas, and instead, it is sufficient if the same number of memory areas as that of QAOUs which are actually used in the structure specified by the input QAOU information are provided. When the maximum split depth is four, the number of blocks is 256 or smaller, and thus, the provision of 256 map memories and 256 list memories is sufficient. In this case, as the QAOU indexes used in the offset information storage section 621, unique indexes for identifying leaf QAOUs, for example, indexes from 0 to 255 or smaller which are incremented by one every time a leaf QAOU is decoded, are used. It is also possible to store, in the offset information storage section 621, a map list by using QAOU information corresponding to the maximum split depth as a unit. In this case, 0 to 255 are used as the QAOU index numbers used in the offset information storage section 621, and they correspond to QAOMU numbers 85 to 340 in FIG. 7.

Figure 7:
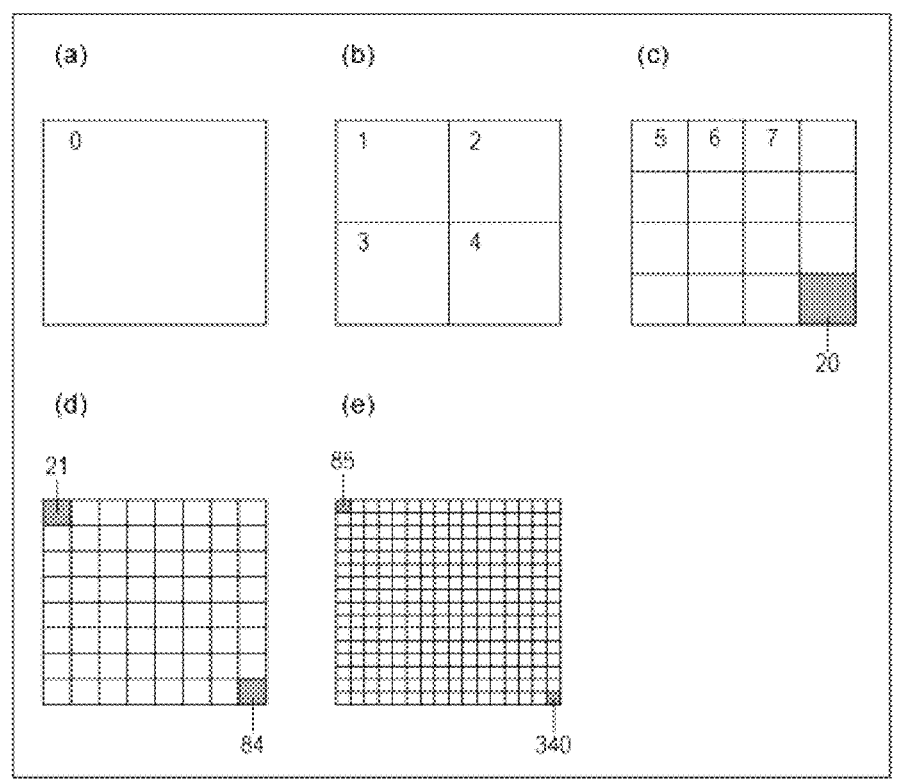
FIG. 7 illustrates examples of QAOMU numbers appended to QAOMUs included in a subject unit of processing: part (a) shows a QAOMU number assigned to a QAOMU having a split depth of 0; part (b) shows QAOMU numbers assigned to QAOMUs having a split depth of one; part (c) shows QAOMU numbers assigned to QAOMUs having a split depth of two; part (d) shows QAOMU numbers assigned to QAOMUs having a split depth of three; and part (e) shows QAOMU numbers assigned to QAOMUs having a split depth of four.

Parts (a) through (e) of FIG. 7 show examples of QAOMU numbers appended to QAOMUs included in the unit of processing (for example, an LCU). Part (a) of FIG. 7 shows a QAOMU number assigned to a QAOMU having a split depth of 0. Part (b) of FIG. 7 shows QAOMU numbers assigned to QAOMUs having a split depth of one. Part (c) of FIG. 7 shows QAOMU numbers assigned to QAOMUs having a split depth of two. Part (d) of FIG. 7 shows QAOMU numbers assigned to QAOMUs having a split depth of three. Part (e) of FIG. 7 shows QAOMU numbers assigned to QAOMUs having a split depth of four.

The QAOU controller 622 controls the individual components included in the adaptive offset filter processor 62. The QAOU controller 622 also refers to the QAOU structure information, and then splits the deblocked decoded image P_DB into one or a plurality of QAOUs and scans the individual QAOUs in a predetermined order. The QAOU controller 622 also supplies a QAOMU number representing a subject QAOMU to the offset-type determining section 623.

The offset-type determining section 623 refers to the map memory and the list memory of the offset information storage section 621 and determines the offset type specified by the QAOMU number supplied from the QAOU controller 622. The offset-type determining section 623 also supplies the determined offset type to the classifying section 624.

The classifying section 624 classifies each pixel included in the subject QAOU as one of the classes that can be selected for the offset type supplied from the offset-type determining section 623. The classifying section 624 also supplies the offset type and the class index indicating the class of each pixel to the offset determining section 625. Specific classifying processing performed by the classifying section 624 will be discussed later, and thus, an explanation thereof is omitted here.

The offset determining section 625 refers to the list memory of the offset information storage section 621, and determines, for each pixel included in the subject QAOU, an offset specified by the offset type and the class index supplied from the classifying section 624. The offset determining section 625 includes an offset reverse shifter (not shown) which performs bitwise left shift on an offset by an amount equal to a shift value set by the offset attribute setting section 613. The offset reverse shifter performs inverse quantization on the offset so that the offset bit depth may match the pixel bit depth. By performing such inverse quantization, in addition processing performed by the offset adder 626, which will be discussed later, the offset can be added to the pixel value by using the same bit depth. The inverse-quantized offset for each pixel is supplied to the offset adder 626.

The offset adder 626 adds the offset supplied from the offset determining section 625 to the associated pixel which forms the subject QAOU of the deblocked decoded image P_DB. The offset adder 626 outputs an image obtained by performing processing on all the QAOUs included in the deblocked decoded image P_DB as an offset-filtered decoded image P_OF.

Figure 8:
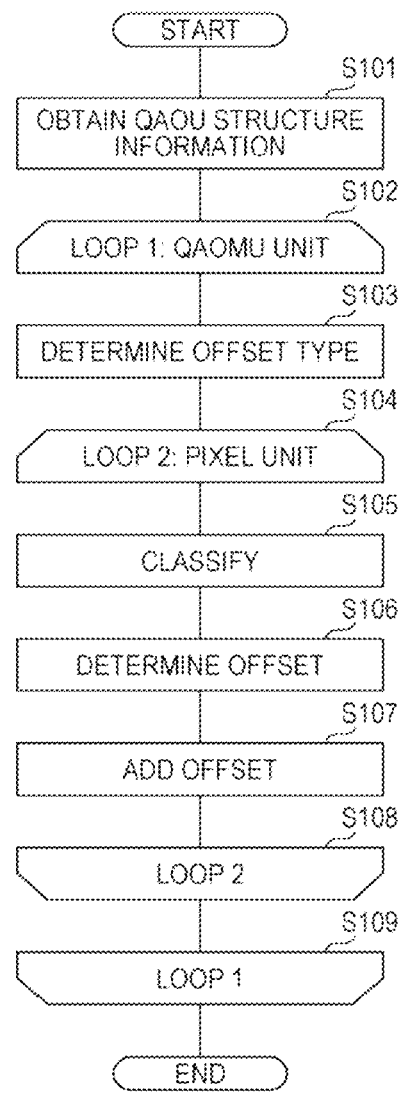
FIG. 8 is a flowchart of a flow of processing performed by an adaptive offset filter processor according to the first embodiment of the present invention.

FIG. 8 is a flowchart of a flow of processing performed by the adaptive offset filter processor 62.

(Step S101)

First, the QAOU controller 622 obtains QAOU structure information from the offset information storage section 621.

(Step S102)

Then, the QAOU controller 622 starts a first loop using the QAOMU number of a subject QAOMU as a loop variable.

(Step S103)

The QAOU controller 622 supplies the QAOMU number to the offset-type determining section 623. Under the control of the QAOU controller 622, the offset-type determining section 623 reads an offset type specified by the QAOMU number supplied from the QAOU controller 622 from the map memory and the list memory of the offset information storage section 621. The offset-type determining section 623 also supplies the read offset type to the classifying section 624.

(Step S104)

Then, the QAOU controller 622 starts a second loop using the pixel number of each pixel included in the subject QAOMU as a loop variable. The pixel numbers are used for distinguishing pixels included in the subject QAOMU from each other, and numbers assigned to pixels included in the subject QAOMU in a predetermined scanning order, for example, may be used. Instead of using the pixel numbers, x and y coordinates of each pixel included in the subject QAOMU may be used as loop variables.

(Step S105)

Then, under the control of the QAOU controller 622, the classifying section 624 classifies the subject pixel as one of a plurality of classes that can be selected for the offset type supplied from the offset-type determining section 623. The classifying section 624 also supplies the offset type and the class index indicating the class of the subject pixel to the offset determining section 625.

(Step S106)

Then, under the control of the QAOU controller 622, the offset determining section 625 reads an offset to be added to the subject pixel from the offset information storage section 621. That is, the offset determining section 625 reads the offset specified by the offset type and the class index supplied from the classifying section 624. The offset determining section 625 also inverse-quantizes the offset by executing bitwise left shift on the offset determined for the subject pixel by an amount equal to a shift value supplied from the offset attribute setting section 613. The offset determining section 625 then supplies the inverse-quantized offset to the offset adder 626.

(Step S107)

Then, under the control of the QAOU controller 622, the offset adder 626 adds the offset supplied from the offset determining section 625 to the pixel value of the subject pixel which forms the deblocked decoded image P_DB.

(Step S108)

This step is the termination of the second loop.

(Step S109)

This step is the termination of the first loop.

If it is found in step S103 that the offset read by the offset-type determining section 623 is 0 (offset type=0), the QAOU controller 622 controls the offset adder 626 so that the offset adder 626 will not add an offset to any of the pixels forming the subject QAOMU.

If it is found in step S105 that the subject pixel is classified as class 0 (class index=0), the QAOU controller 622 controls the offset adder 626 so that the offset adder 626 will not add an offset to the subject pixel.

(The Number of Bits Necessary for Storing Offset)

The number of bits necessary for storing offsets (sao_offset) will now be discussed below. When the pixel bit depth is ten bits and the offset bit depth is nine bits, the offset may take a range of values of $-2^9$ to $2^9-1$, and the number of bits per offset is as large as ten bits. If an offset having such a large number of bits is decoded, it is necessary that the offset information storage section 621 have the following maximum memory size for storing offsets for each picture:

(the total number of *QAOMUs* per picture)×(the number of classes)×(the number of bits per offset)=256×16×10 (bits)=40960 (bits).

Although the total number of QAOMUs per picture is 256 in the decoding device, 341 QAOMUs are used in a coding device, which will be discussed later, and thus, an even larger memory is required. In this manner, if the value range that can be taken with the offset bit depth is used without restricting the offset value range, a large memory size is required for storing offsets since each offset has a large number of bits.

(Relationship Between SAO_DEPTH and Coding Efficiency)

SAO_DEPTH and PIC_DEPTH are closely related to each other in terms of quantization errors. The bit depth of an image output from the adaptive offset filter 60 is represented by the pixel bit depth PIC_DEPTH, and SAO_DEPTH represents the bit depth of an offset to be added to a pixel. Accordingly, even if an offset having a higher precision than that of the pixel bit depth is used, it is discarded in the output process. It is thus preferable that SAO_DEPTH, which indicates the offset precision, is set to be equal to or lower than PIC_DEPTH. On the other hand, if SAO_DEPTH is lower than PIC_DEPTH, an input image is corrected merely with a precision lower than the precision (PIC_DEPTH) with which the input image could be corrected by using a filter, thereby decreasing the filtering effect.

In contrast, if the offset precision SAO_DEPTH is higher, the amount of data required to code offsets increases. Generally, as is seen from the fact that the coding efficiency is optimized by minimizing the rate-distortion cost D+λR represented by using the amount of data (rate) R required for coding, the distortion D of an input image, and the weight λ, the offset precision decreases the distortion D and increases the rate R. Thus, concerning the level of precision, there is a tradeoff between a decrease in the distortion D and an increase in the rate R in which a specific optimal value of the precision is provided.

Further, in this embodiment, by restricting a quantized offset to an offset value range that can be represented by a certain bit width, it is possible to reduce the bit width for storing a quantized offset in the offset information storage section 621. With this arrangement, the effect of reducing the memory size can be obtained, compared with the above-described restriction is not imposed. However, if the offset value range is excessively restricted, the effect of correcting distortion of a decoded image by using an offset is decreased, and it is not possible to remove distortion of a decoded image in offset addition processing, which may decrease the coding efficiency. Thus, it is preferable that the offset value range is set in an optimal range in such a degree as not to decrease the coding efficiency.

In this embodiment, the offset attribute setting section 613 sets the offset bit depth and the offset shift value by using one of the following patterns S1 through S6 and sets the offset value range by using one of the following patterns C1 through C3.

(Pattern S1)

In pattern S1, as shown in part (a) of FIG. 9, the offset bit depth SAO_DEPTH is set to be equal to the pixel bit depth PIC_DEPTH. Since the maximum value of the offset precision is equal to the pixel bit depth, an offset is coded with the maximum precision in the pattern $S_1$.

(Pattern S2)

In pattern S2, as shown in part (b) of FIG. 9, when PIC_DEPTH is ten bits or smaller, SAO_DEPTH is set to be equal to PIC_DEPTH, and when PIC_DEPTH is eleven bits or greater, SAO_DEPTH is set to be ten bits. In pattern S2, the upper limit of the offset bit depth is set to be ten bits. The inventors have found that, when the quantization step QP of a decoded image is small (when the bit rate is high), the coding efficiency becomes higher if the offset bit depth is equal to the pixel bit depth than a case in which the offset bit depth is smaller than the pixel bit depth, and that, conversely, when the quantization step QP is large, the coding efficiency becomes higher if the offset bit depth is smaller than the pixel bit depth than a case in which the offset bit depth is equal to the pixel bit depth. It has been found through the inventors' experiments that, when the quantization parameter qp ranged from 12 to 27, the coding efficiency was improved if the offset bit depths were determined as in pattern S2, compared with a case in which the offset bit depth was eight bits when the pixel bit depth was nine bits or smaller and the offset bit depth was nine bits when the pixel bit depth was ten bits or greater. Accordingly, in pattern S2, by changing the dependency of the offset bit depth on the pixel bit depth in the boundary of ten bits, the amount of data required to code offsets can be decreased, compared with a case in which the offset bit depth is equal to the pixel bit depth, as in pattern $S_1$, thereby achieving a high coding efficiency.

(Pattern S3)

In pattern S3, as shown in part (c) of FIG. 9, when PIC_DEPTH is nine bits or smaller, SAO_DEPTH is set to be equal to PIC_DEPTH, and when PIC_DEPTH is ten bits or greater, SAO_DEPTH is set to be nine bits. In pattern S3, the upper limit of the offset bit depth is set to be nine bits. In pattern S3 as well as in pattern S2, the amount of data required to code offsets can be decreased, thereby achieving a high coding efficiency.

(Pattern S4)

In pattern S4, as shown part (d) of FIG. 9, when PIC_DEPTH is ten bits or smaller, SAO_DEPTH is set to be equal to PIC_DEPTH, and when PIC_DEPTH is eleven bits or greater, SAO_DEPTH is set to be 10-floor ((PIC_DEPTH−10)/STEP). The function floor(x) is a function that provides the largest integer not greater than x. In pattern S4, when the pixel bit depth is eleven bits or greater, every time the pixel bit increase (decreases) by STEP bits, the offset bit depth increases (decreases) by one bit. Part (e) of FIG. 9 shows a case in which STEP is two in pattern S4, and every time the pixel bit depth increases by two bits, the offset bit depth increases by one bit. With this configuration, it is possible to more flexibly respond to the level of the bit rate than in pattern S2 or S3 while also considering the level of the pixel bit depth.

For all of pattern S1 through pattern S4, the shift value is represented by the difference value PIC_DEPTH−SAO_DEPTH between PIC_DEPTH and SAO_DEPTH. By changing the offset bit depth and the shift value as in the above-described pattern S1 through S4, the offset bit depth and the shift value can be set without increasing the memory size or the amount of processing, thereby making it possible to improve the coding efficiency.

(Pattern S5)

In pattern S5, the offset bit depth is explicitly coded. More specifically, the difference between the offset bit depth and a predetermined value is coded. It is suitable that the predetermined value is eight or the pixel bit depth. If the predetermined value is eight, SAO_DEPTH−8 is coded. If the predetermined value is the pixel bit depth, PIC_DEPTH−SAO_DEPTH is coded. The offset bit depth may be safely coded as various items of parameter information or the header of coded data or as part of QAOU information. If the bit depth is coded as part of QAOU information, it may be safely included in a leaf QAOU or in QAOU information of a predetermined level (for example, the highest level QAOU or the first level QAOU). By coding the bit depth as part of coded data, the bit depth can be set to be an optimal value in the decoding device and in the coding device, thereby obtaining the effect of maximizing the coding efficiency. If the bit depth is coded as QAOU information, the bit depth is changed in accordance with the QAOU depth sao_curr_depth, thereby making it possible to reduce the memory size for storing offsets. It is likely that many offsets will appear when sao_curr_depth is large. Accordingly, by setting the bit depth to be small when sao_curr_depth is large and by setting the bit depth to be large when sao_curr_depth is small, it is possible to reduce the required memory size. For example, it is suitable that, when sao_curr_depth=0 to 1, the offset bit depth is set to be equal to the pixel bit depth (pattern S1) and when sao_curr_depth=2 to 4, the upper limit is set for the offset bit depth (pattern S2). The bit width is coded in this manner. It is also suitable that a flag indicating whether the offset bit width will be coded in response to the QAOU depth or only one offset bit depth will be used regardless of the QAOU depth may be coded, thereby switching between a case in which the offset bit depth is coded in response to the QAOU depth and a case in which only one offset bit depth is used regardless of the QAOU depth.

(Pattern S6)

Without coding the bit depth explicitly, the bit depth is determined in accordance with sao_curr_depth. For example, it is suitable that, when sao_curr_depth=0 to 1, the offset bit depth is set to be equal to the pixel bit depth (pattern S1), and when sao_curr_depth=2 to 4, the upper limit is set for the offset bit depth (pattern S2).

(Pattern C1)

In pattern C1, the offset value range is set in accordance with SAO_DEPTH. Hereinafter, the maximum bit length representing the offset value range is indicated by CLIP_BIT. More specifically, by calculating CLIP_BIT=SAO_DEPTH−K, the offset value range is determined to be $-2^{CLIP\_BIT-1}$ to $2^{CLIP\_BIT-1}-1$. It has been found through the inventors' experiments that K=4 is suitable. That is, it has been validated that, in the case of K=4, the coding efficiency was not decreased even if the offset range was restricted by the offset value range. K=4 is suitable when the pixel bit depth is eight, which is most commonly used. When the pixel bit depth is eight, the offset bit depth SAO_DEPTH is also eight, and thus, CLIP_BIT=8−K=4. If one offset can be stored by using four bits, in software, for example, which handles one byte constituted by eight bits as the unit, two offsets can be packed and stored in one byte, thereby easily reducing the memory size.

(Pattern C2)

In pattern C2, the offset value range is set independently of SAO_DEPTH. More specifically, CLIP_BIT is set to be eight, and the offset value range is set to be $-2^7$ to $2^7-1$.

Alternatively, generally, a constant N which is independent of SAO_DEPTH may be used, and CLIP_BIT may be set to be N. When the offset value range is set independently of SAO_DEPTH, it is preferable that the offset value range is set to be smaller than the offset bit depth in order to achieve the effect of reducing the memory size.

(Pattern C3)

In pattern C3, the offset value range is determined in accordance with the QAOU hierarchical depth. It is suitable that, when sao_curr_depth is small (for example, 0 to 1), the offset value range is determined independently of the offset bit depth, and when sao_curr_depth is large (for example, 2 to 4), the offset value range is determined in accordance with the offset bit depth. If the offset value range is determined independently of the offset bit depth, CLIP_BIT may be set to be eight (pattern C2). If the offset value range is determined in accordance with the offset bit depth, CLIP_BIT may be set to be SAO_DEPTH–K bits (pattern C1). If the offset bit length is determined in accordance with the QAOU hierarchical depth, a fixed bit number may be safely used for CLIP_BIT. For example, CLIP_BIT=4 is suitable.

(First Specific Example of the Number of Offset Bits)

A first specific example of the number of bits of an offset (sao_offset) according to this embodiment will be discussed below. In this example, a case in which the pixel bit depth is set to be ten bits, and the shift value is set by using pattern S2 and the offset value range is set by using pattern C1 will be discussed. In pattern S2, the offset bit depth is set to be ten bits, and, in pattern C1, the offset value range is set to be 10–4=6 bits. If the number of bits per offset is six bits, it means that the offset values are restricted to –32 to 31. In this example, as the memory size for storing offsets in the offset information storage section 621, the following maximum size for each picture is sufficient: (the total number of QAOMUs per picture)×(the number of classes)×(the number of bits per offset)=256×16×6 (bits)=24576 (bits).

Thus, with the configuration in which the offset value range is set as in this example, the memory size necessary for the offset information storage section 621 can be reduced to substantially ⅗ of the memory size of an example of the related art.

Since the amount of data required to code offsets included in the coded data #1 can be reduced, it is possible to improve the coding efficiency. Additionally, since excessive offsets are not added, a suitable level of image quality can be guaranteed.

(Second Specific Example of the Number of Offset Bits)

A second specific example of the number of bits of an offset (sao_offset) according to this embodiment will be discussed below. In this example, a case in which the pixel bit depth is set to be ten bits, and the shift value is set by using pattern S2 and the offset value range is set by using pattern C2 will be discussed. In pattern S2, the offset bit depth is set to be ten bits, and, in pattern C2, the offset value range is set to be eight bits. If the number of bits per offset is eight bits, it means that the offset values are restricted to –128 to 127. In this example, as the memory size for storing offsets in the offset information storage section 621, the following maximum size for each picture is sufficient:

(the total number of QAOMUs per picture)×(the number of classes)×(the number of bits per offset)=256×16×8 (bits)=32768 (bits).

Thus, with the configuration in which the number of bits of an offset is set as in this example, the memory size necessary for the offset information storage section 621 can be reduced to substantially ⅘ of the memory size of an example of the related art.

Since the amount of data required to code offsets included in the coded data #1 can be reduced, it is possible to improve the coding efficiency. Additionally, since excessive offsets are not added, a suitable level of image quality can be guaranteed.

If the number of offset bits is restricted, the amount of data required to code offset information included in the coded data #1 can be reduced. However, if the number of offset bits is excessively restricted, the effect of providing an adaptive offset filter is decreased, thereby increasing the amount of data required to code residual data (the pixel value of a residual image) included in the coded data.

(Third Specific Example of the Number of Offset Bits)

A third specific example of the number of bits of an offset (sao_offset) will be discussed below. In any one of the patterns C1 and C2 of this example, the value to be set for the number of bits of an offset is changed depending on whether the offset type is an edge offset (offset type is one of 1 to 4) or a band offset (offset type is 5 or 6). In this example, a method for setting the shift value by using pattern S2 and for setting the offset value range of an edge offset by using pattern C2 and the offset value range of a band offset by using pattern C1 when the pixel bit depth is set to be ten bits will be discussed.

When the pixel bit depth is ten bits, in pattern S2, the offset bit depth is set to be ten bits. The value range of an offset belonging to the edge offset type (hereinafter referred to as an "edge-offset offset") is set to be eight bits in pattern C2. The value range of an offset belonging to the band offset type (hereinafter referred to as a "band-offset offset") is set to be six bits in pattern C1. More generally, when the number of bits of an edge-offset offset is N bits and the number of bits of a band-offset offset is M bits, the numbers of bits of offsets are determined so that the condition N≥M can be satisfied.

The memory size required to be secured in the offset information storage section 621 is the number of bits represented by (the number of classes of an offset type x the number of offset bits) for each QAOU. Accordingly, the number of bits of a band offset, which has a greater number of classes than an edge offset, is set to be smaller, thereby making it possible to effectively utilize the memory area for storing offsets in the offset information storage section 621.

In this manner, by varying the number of bits of an offset in accordance with the offset type, the coding efficiency can be improved without requiring an excessive memory size of the offset information storage section 621. The memory area can also be utilized most effectively.

When the threshold th for restricting values that can be taken as an offset is greater than $2^{m-1}$ but not greater than $2^m$, m-bit fixed-length coding/decoding method may be used as the coding method for coding the offset. The variable-length coding/decoding method, such as Truncated unary coding or Truncated Rice coding having th as the maximum value, may be used. The above-described maximum value th is determined by the offset value range supplied from the offset attribute setting section 613. The video decoding device 1 is capable of decoding offsets which have been coded as described above.

With the above-described configuration, in the offset attribute setting section 613, the offset bit depth, the offset value range, and the shift value are set. In the adaptive offset filter information decoder 61, a quantized offset having a value within the offset value range is decoded and is stored in the offset information storage section 621 in which a storage area having a bit width equal to or larger than the offset value range is secured for each offset. In this embodiment, it is characterized in that the offset value range is determined in accordance with the offset bit depth. The offset bit depth is determined in accordance with the pixel bit depth. Accordingly, in this embodiment, it is also characterized in that the offset bit depth is determined in accordance with the pixel bit depth.

The adaptive offset filter information decoder 61 of the first embodiment may include a storage section for storing decoded offsets therein and an inverse-quantizing section which inverse-quantizes offsets obtained from the storage section. Inverse-quantization processing performed by the offset determining section 625 may be omitted. In this case, it is characterized in that the storage section stores an offset which is restricted to the offset value range set by the offset attribute setting section 613 and in that the inverse-quantizing section performs inverse-quantization processing by performing bitwise left shift on an offset in accordance with the shift value set by the offset attribute setting section 613.

The offset information decoding section 611 decodes, from the coded data #1, each offset to be referred to by the offset adder 626, which adds an offset to the pixel value of each pixel forming an input image constituted by a plurality of unit areas. In other words, the offset information decoding section 611 includes offset decoding means (not shown) for decoding an offset having an offset value range and a shift value which are set in accordance with the pixel bit depth and which is restricted to the offset value range.

The adaptive offset filter 60 of this embodiment is an image filtering device which adds an offset to the pixel value of each pixel forming an input image constituted by a plurality of unit areas. In other words, the adaptive offset filter 60 may be an image filtering device including the offset attribute setting section 613 that refers to offset-type specifying information included in coded data and sets offset attributes in a subject unit area, the offset information decoding section 611 that decodes an offset having a bit width corresponding to an offset value range included in the offset attributes set as described above, and the offset adder 626 that adds the offset to the pixel value of each pixel forming the input image.

In addition to the above-described offset decoding means, the offset information decoding section 611 may include determining means for determining the offset type to which a subject unit area belongs from among a plurality of offset types, and offset decoding means for decoding offsets having different bit widths depending on the offset type determined by the determining means.

The above-described offset-type specifying information includes information concerning the bit depth of pixel values in each unit area of the input image, and the offset information decoding section 611 may decode an offset having a bit width corresponding to the bit depth of the pixel values.

A description will now be given of specific examples of classifying processing performed by the classifying section 624. It is preferable that the classifying section 624 performs, among the following examples of classifying processing, classifying processing corresponding to classifying processing performed by the video coding device that has generated the coded data #1.

(First Example of Classifying Processing of Classifying Section 624)

A first example of classifying processing performed by the classifying section 624 will be described below with reference to parts (a) through (d) of FIG. 10 through FIG. 12.

(When Offset Type is One of 1 to 4 (Edge Offset))

When the offset type supplied from the offset-type determining section 623 is one of 1 to 4, the classifying section 624 determines whether or not there is an edge near a subject pixel and, if there is an edge, determines the type of edge. The classifying section 624 then classifies the subject pixel as one of a plurality of classes in accordance with the determination results.

More specifically, the classifying section 624 first determines the sign of the difference between the pixel value pic[x] of a subject pixel x and each of the pixel values pic[a] and pic[b] of two pixels a and b which are adjacent to the subject pixel or which have the same vertex as the subject pixel. That is, the classifying section 624 calculates:

$Sign(pic[x]-pic[a])$ and $Sign(pic[x]-pic[b])$:

where $Sign(z)$ is a function which takes the following values:

$Sign(z)=+1$ (when $z>0$)

$Sign(z)=0$ (when $z=0$)

$Sign(z)=-1$ (when $z<0$).

Specifically, a determination as to which pixels are used as the pixel a and the pixel b is dependent on the offset type, and is made as follows.

When offset type is 1 (sao_type_idx=1)

Figure 10:
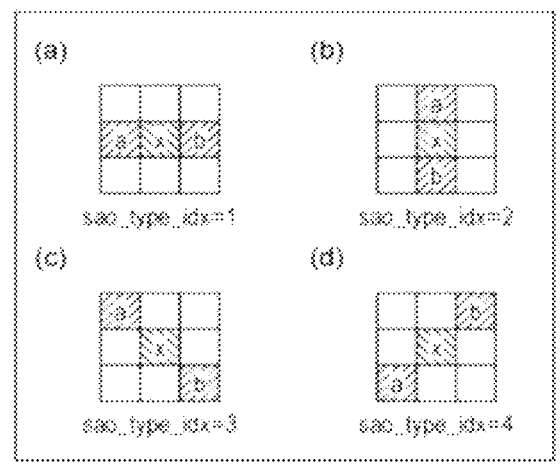
FIG. 10 illustrates offset processing performed by the adaptive offset filter according to the first embodiment of the present invention: parts (a) through (d) show pixels to be referred to when sao_type_idx=1 to 4, respectively.

As shown in part (a) of FIG. 10, the pixel positioned immediately on the left side of the subject pixel x is set to be the pixel a, and the pixel positioned immediately on the right side of the subject pixel x is set to be the pixel b.

When offset type is 2 (sao_type_idx=2)

As shown in part (b) of FIG. 10, the pixel positioned immediately on the top side of the subject pixel x is set to be the pixel a, and the pixel positioned immediately on the bottom side of the subject pixel x is set to be the pixel b.

When offset type is 3 (sao_type_idx=3)

As shown in part (c) of FIG. 10, the pixel having the same vertex as that of the top left side of the subject pixel x is set to be the pixel a, and the pixel having the same vertex as that of the bottom right side of the subject pixel x is set to be the pixel b.

When offset type is 4 (sao_type_idx=4)

As shown in part (d) of FIG. 10, the pixel having the same vertex as that of the bottom left side of the subject pixel x is set to be the pixel a, and the pixel having the same vertex as that of the top right side of the subject pixel x is set to be the pixel b.

Figure 11:
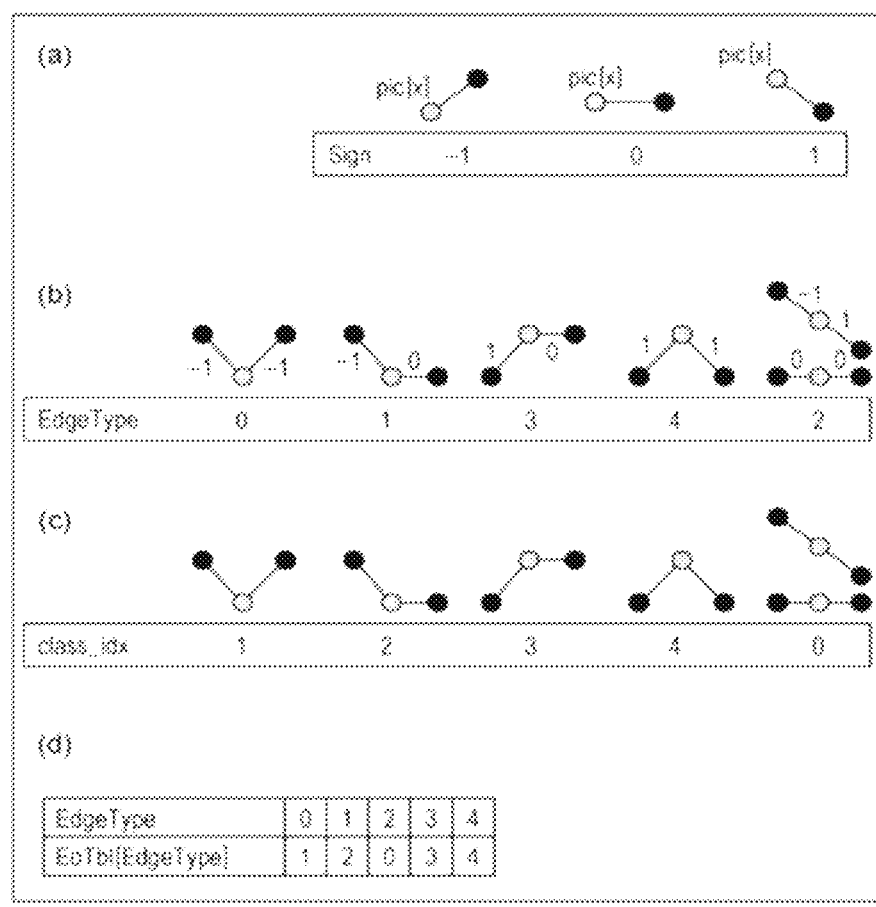
FIG. 11 illustrates offset processing performed by the adaptive offset filter according to the first embodiment of the present invention: part (a) shows graphs indicating the magnitude relations between a pixel value pic[x] of a subject pixel x and the pixel value of a pixel a or b and also shows the values of a function Sign in accordance with the magnitude relation; part (b) shows graphs indicating the magnitude relations between the pixel value of the subject pixel x and each of the pixel values of the pixel a and the pixel b and also shows the values of EdgeType in accordance with the magnitude relation; part (c) shows the association between each graph shown in part (b) and class_idx; and part (d) illustrates a transform table indicating transformation from EdgeType to class_idx.

Part (a) of FIG. 11 shows graphs indicating the magnitude relations between the pixel value pic[x] of the subject pixel x and the pixel value of the pixel a or b and also shows the values of the function Sign in accordance with the magnitude relation. In the graphs shown in part (a) of FIG. 11, the black circle with pic[x] indicates the pixel value of the subject pixel x, and the black circle without pic[x] indicates the pixel value of the subject pixel a or b. The vertical direction in the graphs shown in part (a) of FIG. 11 indicates the magnitude of the pixel value.

Then, the classifying section 624 finds EdgeType according to the following mathematical equation (1-1) on the basis of $Sign(pic[x]-pic[a])$ and $Sign(pic[x]-pic[b])$.

$$EdgeType=Sign(pic[x]-pic[a])+Sign(pic[x]-pic[b])+2 \qquad (1\text{-}1)$$

Part (b) of FIG. 11 shows graphs indicating the magnitude relations between the pixel value of the subject pixel x and each of the pixel values of the pixel a and the pixel b and also shows the values of EdgeType in accordance with the magnitude relation. In part (b) of FIG. 11, the center black circle in each graph indicates the pixel value of the subject pixel x, and the black circles on both sides indicate the pixel values of the pixel a and the pixel b. The vertical direction in the graphs shown in part (b) of FIG. 11 indicates the magnitude of the pixel value.

Then, the classifying section 624 determines as follows, on the basis of the determined EdgeType, the class index (class_idx) of the class to which the subject pixel x belongs.

$$class\_idx = EoTbl[EdgeType]$$

where EoTbl[EdgeType] is a transform table used for determining class_idx from EdgeType. A specific example of the transform table EoTbl is shown in part (d) of FIG. 11.

As shown in part (d) of FIG. 11, when there is no edge in an area constituted by the subject pixel x, the pixel a, and the pixel b (hereinafter, such a case will also be referred to as a case in which an area is flat), the subject pixel x is classified as class 0 (class_idx0). Part (c) of FIG. 11 shows the association between each graph shown in part (b) of FIG. 11 and class_idx.

(When Offset Type is 5 or 6 (Band Offset))

When the offset type supplied from the offset-type determining section 623 is 5 or 6, the classifying section 624 classifies the pixel value of the subject pixel x as one of a plurality of classes in accordance with the pixel value pic[x] of the subject pixel x.

When offset type is 5 (sao_type_idx=5)

When the pixel value pic[x] of the subject pixel x satisfies: $(max \times ¼) \leq pic[x] \leq (max \times ¾)$, the classifying section 624 classifies the subject pixel as a class other than 0. That is, when the pixel value of the subject pixel is contained within a range indicated by the hatched portion in part (a) of FIG. 12, the classifying section 624 classifies the subject pixel as a class other than 0. In the above-described condition, max indicates the maximum value that can be taken by the subject pixel x, and for example, max=255. When max=255, the above-described condition may be represented by $8 \leq pic[x]/8 \leq 23$.

When offset type is 6 (sao_type_idx=6)

When the pixel value pic[x] of the subject pixel x satisfies: $pic[x] \leq (max \times ¼)$ or $(max \times ¾) \leq pic[x]$, the classifying section 624 classifies the subject pixel as a class other than 0. That is, when the pixel value of the subject pixel is contained within a range indicated by the hatched portion in part (b) of FIG. 12, the classifying section 624 classifies the subject pixel as a class other than 0. In the above-described condition, max indicates the maximum value that can be taken by the subject pixel x, and for example, max=255. When max=255, the above-described condition may be represented by $(pic[x]/8) \leq 7$ or $24 \leq (pic[x]/8)$.

The classifying processing performed by the classifying section 624 will be more specifically described below.

When the offset type is 5 or 6, the classifying section 624 determines the class index (class_idx) of the class to which the subject pixel x belongs as follows.

$$class\_idx = EoTbl[sao\_type\_idx][pic[x]/8]$$

where EoTbl[sao_type_idx][pic[x]/8] is a transform table used for determining class_idx from the pixel value pic[x] of the subject pixel x and sao_type_idx. A specific example of the transform table EoTbl is shown in FIG. 12. In part (c) of FIG. 12, "BO_1" indicates that sao_type_index=5, and "BO_2" indicates that sao_type_index=6.

Figure 12:
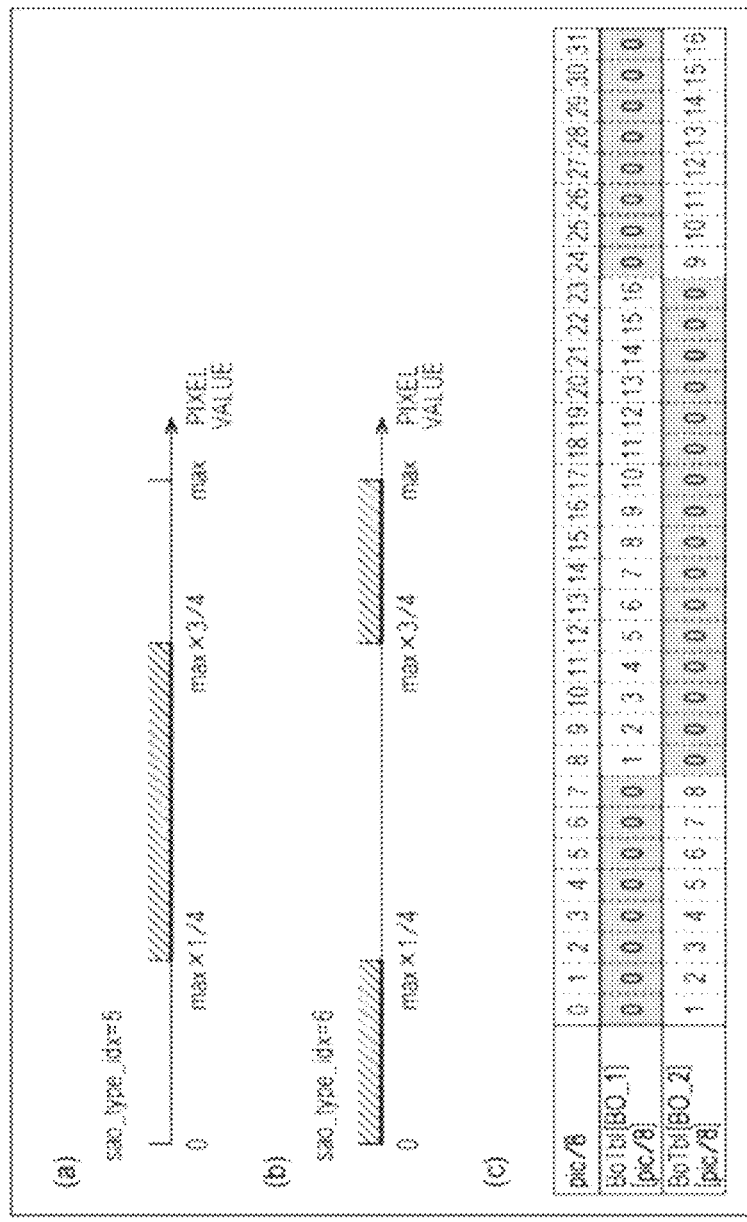
FIG. 12 illustrates offset processing performed by the adaptive offset filter according to the first embodiment of the present invention: part (a) schematically shows classifying performed when sao_type_idx=5; part (b) schematically shows classifying performed when sao_type_idx=6; and part (c) shows a table indicating an example of classifying performed when a band offset is specified.

As shown in part (c) of FIG. 12, when sao_type_index=5, the classifying section 624 classifies the subject pixel x as one of class indexes 1 to 16 in accordance with the magnitude of pic[x] if the pixel value pic[x] of the subject pixel x satisfies the condition $8 \leq (pic[x]/8) \leq 23$.

When sao_type_index=6, the classifying section 624 classifies the subject pixel x as one of class indexes 1 to 16 in accordance with the magnitude of pic[x] if the pixel value pic[x] of the subject pixel x satisfies the condition $(pic[x]/8) \leq 7$ or $24 \leq (pic[x]/8)$.

Generally, when the bit depth of an image is PIC_DEPTH, the maximum value of the subject pixel can be represented by $max = 2^{PIC\_DEPTH} - 1$, and thus, classifying is performed by using $pic/2^{(PIC\_DEPTH-5)}$ instead of pic/8 in part (c) of FIG. 12.

(Second Example of Classifying Processing of Classifying Section 624)

A second example of classifying processing performed by the classifying section 624 will be described below.

In this example of the processing, the classifying section 624 determines EdgeType by using the following mathematical expression (1-2) instead of mathematical expression (1-1). The other features are similar to those of the first example of classifying processing.

$$EdgeType = Sign((pic[x] \gg shift) - (pic[a] \gg shift)) + Sign((pic[x] \gg shift) - (pic[b] \gg shift)) + 2 \quad (1\text{-}2)$$

where ">>" denotes bitwise right shift, and "shift" denotes the magnitude of bit shift. The specific value of "shift" may be determined such that it has a positive correlation with the bit depth of the pixel value.

In the classifying processing of the first example, even when the gradient of the pixel value is very small, if it is not 0, the value of Sign is not 0. Accordingly, in the classifying processing of the first example, the value of EdgeType is vulnerable to the influence of noise.

In this example of the processing, after performing bitwise right shift on the pixel value, the difference between the pixel values is calculated. Thus, the value of EdgeType is less vulnerable to the influence of noise, thereby achieving the effect of improving the coding efficiency.

In this example of the processing, the following mathematical expression (1-3) may be used instead of mathematical expression (1-2).

$$EdgeType = Sign((pic[x] - pic[a]) \gg shift) + Sign((pic[x] - pic[b]) \gg shift) + 2 \quad (1\text{-}3)$$

That is, after the difference between the pixel values is calculated, the bitwise right shift may be performed. By using mathematical expression (1-3), advantages similar to obtained by using mathematical expression (1-2) can be achieved.

(Third Example of Classifying Processing of Classifying Section 624)

A third example of classifying processing performed by the classifying section 624 will be described below.

In this example of the processing, the definition of the function Sign discussed in the first example of the classifying processing calculated by the classifying section 624 is changed as follows.

The other features are similar to those of the first example of the classifying processing.

$Sign(z) = +1$ (when $z > th$)

$Sign(z) = 0$ (when $-th \leq z \leq th$)

$Sign(z) = -1$ (when $z < -th$)

where th denotes a threshold having a predetermined value. The specific value of the threshold th may be determined such that the absolute value of the threshold th has a positive correlation with the bit depth of the pixel value.

In this example of the processing, too, the value of EdgeType is less vulnerable to the influence of noise, thereby achieving a high coding efficiency.

(Fourth Example of Classifying Processing of Classifying Section 624)

A fourth example of classifying processing performed by the classifying section 624 will be described below.

In this example of the processing, the classifying section 624 utilizes EoTbl[sao_type_idx][pic[x]/8] shown in FIG. 13 instead of EoTbl[sao_type_idx][pic[x]/8] shown in part (c) of FIG. 12.

As shown in FIG. 13, in this example of the processing, when the value of pic[x]/8 is 8 or 9, the subject pixel x is classified as a class having a class index other than 0, regardless of whether sao_type_index=5 or sao_type_index=6. Moreover, when the value of pic[x]/8 is 22 or 23, the subject pixel x is classified as a class having a class index other than 0, regardless of whether sao_type_index=5 or sao_type_index=6.

In this example of the processing, when the pixel value of a subject pixel is 15 or smaller (when pic[x]/8 is 0 or 1), the subject pixel is clipped to MIN. Moreover, when the pixel value of a subject pixel is 240 or greater (when pic[x]/8 is 30 or 31), the subject pixel is clipped to MAX. As MIN and MAX, one of the following combinations is preferably used.

MIN=15, MAX=240
MIN=16, MAX=239
MIN=16, MAX=235

In the first example of the classifying processing, a subject pixel which is classified as class 0 when sao_type_index=5 is classified as a class other than 0 when sao_type_index=6. Moreover, a subject pixel which is classified as class 0 when sao_type_index=6 is classified as a class other than 0 when sao_type_index=5.

Accordingly, in the first example of the classifying processing, the pixel value to which an offset is added may be very different depending on whether sao_type_index=5 or sao_type_index=6, which may lead to a problem in that the coding efficiency is not sufficiently improved as expected. Such a problem may be noticeable when pic[x]/8 of the pixel value of an image which has not yet been subjected to offset filtering is 8 or 9 or 22 or 23.

In this example of the processing, when pic[x]/8 is 8 or 9, the subject pixel x is classified as a class other than 0, regardless of whether sao_type_index=5 or sao_type_index=6. Moreover, when pic[x]/8 is 22 or 23, the subject pixel x is classified as a class other than 0, regardless of whether sao_type_index=5 or sao_type_index=6. Accordingly, it is unlikely that the above-described problem will occur. Thus, by performing processing of this example, the coding efficiency can be improved.

In this example of the processing, in a case in which the value of pic[x]/8 is 8 or 9 and in a case in which the value of pic[x]/8 is 22 or 23, the subject pixel x is classified as a class other than 0, regardless of whether sao_type_index=5 or sao_type_index=6. However, this is not a limitation to implement this example of the processing. In short, processing is performed such that, when the value of pic[x]/8 is within a predetermined range, the subject pixel x is classified as a class other than 0, regardless of whether sao_type_index=5 or sao_type_index=6.

Generally, when the pixel bit depth of an image is PIC_DEPTH, the maximum value of the subject pixel can be represented by max=$2^{PIC\_DEPTH}-1$, and thus, classifying is performed by using pic/$2^{(PIC\_DEPTH-5)}$ instead of pic/8 in FIG. 13.

In this manner, when the pixel value of the above-described subject pixel is within a predetermined range, the classifying section 624 of this example may classify the subject pixel as an offset class in which an offset will be added, regardless of whether the offset type of a unit area containing the subject pixel is the above-described first offset type or the above-described second offset type.

(Video Coding Device 2)

A description will now be given below, with reference to FIG. 14 through parts (a) to (d) of FIG. 18, of the video coding device 2 which generates coded data #1 by coding a subject image. The video coding device 2 partially includes a method defined in H. 264/MPEG-4. AVC, a method used in KTA software, which is a joint development codec in VCEG (Video Coding Expert Group), a method used in TMuC (Test Model under Consideration) software, which is a successor codec to the codec used in KTA software, and a technology used in HM (HEVC TestModel) software.

Figure 14:
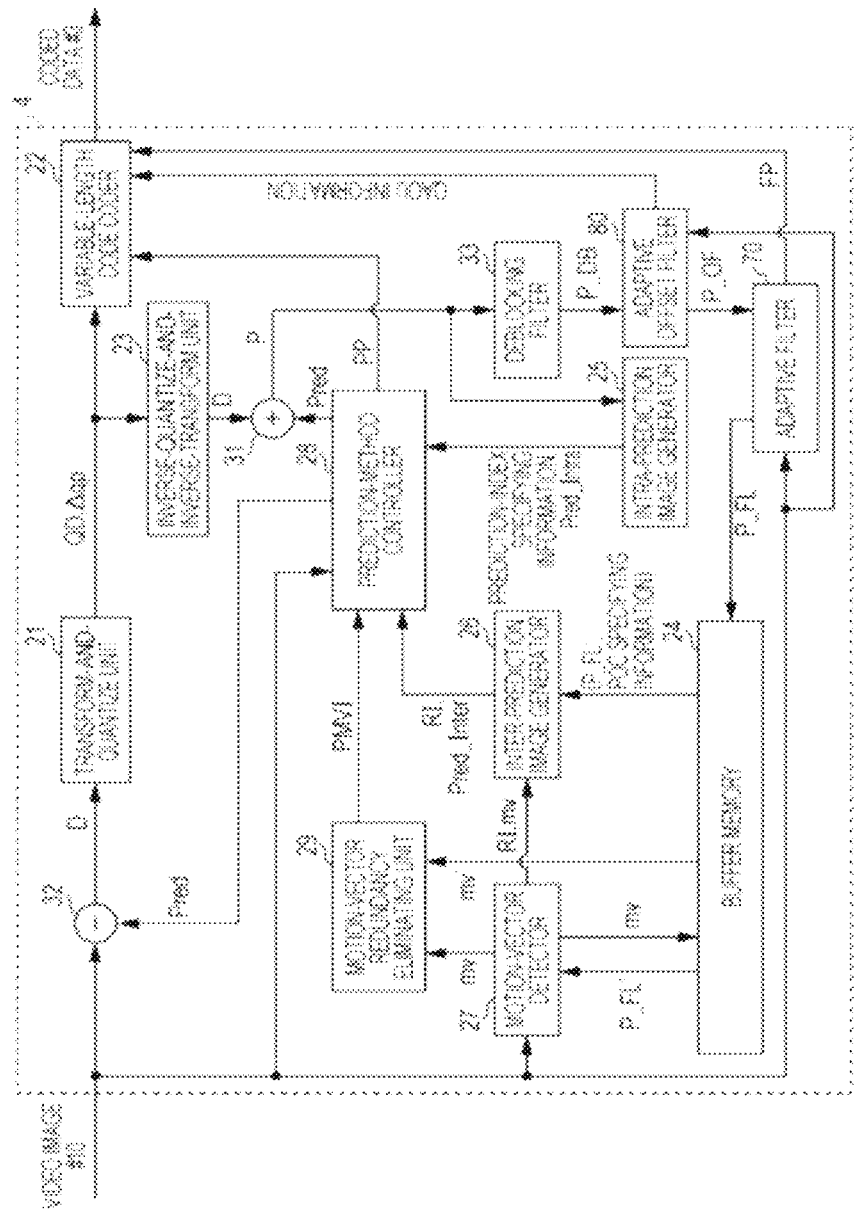
FIG. 14 is a block diagram illustrating the configuration of a video coding device according to the first embodiment of the present invention.

FIG. 14 is a block diagram illustrating the configuration of the video coding device 2 of this embodiment. The video coding device 2 includes, as shown in FIG. 14, a transform-and-quantize unit 21, a variable-length code coder 22, an inverse-quantize-and-inverse-transform unit 23, a buffer memory 24, an intra-prediction image generator 25, an inter-prediction image generator 26, a motion-vector detector 27, a prediction-method controller 28, a motion-vector redundancy eliminating unit 29, an adder 31, a subtractor 32, a deblocking filter 33, an adaptive filter 70, and an adaptive offset filter 80. The video coding device 2 codes a video image #10 (subject image) so as to generate coded data #3.

The transform-and-quantize unit 21 performs: (1) DCT (Discrete Cosine Transform) transform on each block of a prediction residual D obtained by subtracting a prediction image Pred from a subject image, (2) quantizing a DCT coefficient obtained by performing DCT transform, and (3) supplying a quantized prediction residual QD obtained by performing quantization to the variable-length code coder 22 and the inverse-quantize-and-inverse-transform unit 23. The transform-and-quantize unit 21 also performs: (1) selecting a quantization step QP to be used for quantization for each tree block; (2) supplying a quantization parameter difference Δqp representing the level of the selected quantization step QP to the variable-length code coder 22; and (3) supplying the selected quantization step QP to the inverse-quantize-and-inverse-transform unit 23. The quantization parameter difference Δqp is a difference value obtained by subtracting the value of the quantization parameter qp' concerning a tree block which has been subjected to DCT-transform and quantization immediately before a subject tree block from the quantization parameter qp (QP=$2^{pq/6}$) concerning the subject tree block to be subjected to DCT-transform and quantization.

The variable-length code coder 22 generates coded data #1 by performing variable-length coding on: (1) the quantized prediction residual QD and Δqp supplied from the transform-and-quantize unit 21; (2) a prediction parameter PP supplied from the prediction-method controller 28, which will be discussed later, and (3) a filter set number, a filter coefficient group, area specifying information, and ON/OFF information supplied from the adaptive filter 70, which will be discussed later. The variable-length code coder 22 also codes QAOU information supplied from the adaptive offset filter 80 and inserts the coded QAOU information into the coded data #3.

The inverse-quantize-and-inverse-transform unit 23 performs: (1) inverse-quantizing the quantized prediction residual QD, (2) inverse-DCT (Discrete Cosine Transform) on a DCT coefficient obtained by performing inverse quantization, and (3) supplying a prediction residual D obtained by performing inverse DCT to the adder 31. When inverse-quantizing the quantized prediction residual QD, the quantization step QP supplied from the transform-and-quantize unit 21 is utilized. The prediction residual D output from the inverse-quantize-and-inverse-transform unit 23 is the prediction residual D input into the transform-and-quantize unit 21 to which a quantization error is added, however, for a simple description, the same name will be used.

The intra-prediction image generator 25 generates a prediction image Pred_Intra concerning each partition. More specifically, the intra-prediction image generator 25 performs: (1) selecting a prediction mode concerning each partition used for intra prediction; and (2) generating the prediction image Pred_Intra from the decoded image P by using the selected prediction mode. The intra-prediction image generator 25 supplies the generated prediction image Pred_Intra to the prediction-method controller 28.

The intra-prediction image generator 25 also specifies a prediction index PI concerning each partition from a selected prediction mode selected for the partition and from the size of the partition, and then supplied the prediction index PI to the prediction-method controller 28.

The intra-prediction image generator 25 also supplies the size of a subject partition and intra-prediction mode information IEM, which is information indicating a prediction mode assigned to the subject partition, to the adaptive filter 70.

The motion-vector detector 27 detects a motion vector my concerning each partition. More specifically, the motion-vector detector 27 detects a motion vector my concerning a subject partition by: (1) selecting a filtered decoded image P_FL' to be used as a reference image; and (2) by searching for an area which best approximates to the subject partition in the selected filtered decoded image P_FL'. The filtered decoded image P_FL' is an image obtained by performing deblocking processing by using the deblocking filter 33, adaptive offset processing by using the adaptive offset filter 80, and adaptive filtering processing by using the adaptive filter 70 on a decoded image. The motion-vector detector 27 may read pixel values of individual pixels forming the filtered decoded image P_FL' from the buffer memory 24. The motion-vector detector 27 supplies the detected motion vector my to the inter-prediction image generator 26 and the motion-vector redundancy eliminating unit 29, together with a reference image index RI which specifies the filtered decoded image P_FL' utilized as a reference image. Concerning a partition on which bidirectional prediction (weighted prediction) will be performed, the motion-vector detector 27 selects two filtered decoded images P_FL' and P_FL2' as reference images, and supplies motion vectors mv1 and mv2 and reference image indexes RI1 and RI2 associated with the two filtered decoded images P_FL1' and P_FL2' to the inter-prediction image generator 26 and the motion-vector redundancy eliminating unit 29.

The inter-prediction image generator 26 generates a motion-compensated image me concerning each inter-prediction partition. More specifically, the inter-prediction image generator 26 generates a motion-compensated image me from the filtered decoded image P_FL' specified by the reference image index RI supplied from the motion-vector detector 27 by using the motion vector my supplied from the motion-vector detector 27. As in the motion-vector detector 27, the inter-prediction image generator 26 may read pixel values of individual pixels forming the filtered decoded image P_FL' from the buffer memory 24. The inter-prediction image generator 26 supplies the generated motion-compensated image me (inter-prediction image Pred_Inter) to the prediction-method controller 28, together with the reference image index RI supplied from the motion-vector detector 27. Concerning a partition on which bidirectional prediction (weighted prediction) will be performed, the inter-prediction image generator 26 performs: (1) generating a motion-compensated image mc1 from a filtered decoded image P_FL' specified by the reference image index RI1 by using a motion vector mv1; (2) generating a motion-compensated image mc2 from a filtered decoded image P_FL2' specified by the reference image index RI2 by using a motion vector mv2; and (3) generating an inter-prediction image Pred_Inter by adding an offset value to a weighted average of the motion-compensated image mc1 and the motion-compensated image mc2.

The prediction-method controller 28 compares each of the intra-prediction image Pred_Intra and the inter-prediction image Pred_Inter with a subject image to be coded, and determines whether to perform intra prediction or inter prediction. If intra prediction is selected, the prediction-method controller 28 supplies the intra-prediction image Pred_Intra to the adder 31 and the subtractor 32 as the prediction image Pred, and also supplies the prediction index PI supplied from the intra-prediction image generator 25 to the variable-length code coder 22 as the prediction parameter PP. In contrast, if inter prediction is selected, the prediction-method controller 28 supplies the inter-prediction image Pred_Inter to the adder 31 and the subtractor 32 as the prediction image Pred, and also supplies the reference image index RI supplied from the inter-prediction image generator 26 and an estimation motion-vector index PMVI and motion-vector residual MVD supplied from the motion-vector redundancy eliminating unit 29 (discussed later) to the variable-length code coder as the prediction parameters PP.

By subtracting the prediction image Pred selected in the prediction-method controller 28 from the subject image to be coded, a prediction residual D is generated in the subtractor 32. The prediction residual D generated in the subtractor 32 is subjected to DCT-transform and quantization by the transform-and-quantize unit 21, as stated above. Meanwhile, by adding the prediction image Pred selected in the prediction-method controller 28 to the prediction residual D generated in the inverse-quantize-and-inverse-transform unit 23, a locally decoded image P is generated in the adder 31. The locally decoded image P generated in the adder 31 passes through the deblocking filter 33, the adaptive offset filter 80, and the adaptive filter 70. Then, the locally decoded image P is stored in the buffer memory 24 as a filtered decoded image P_FL and is utilized as a reference image for performing inter prediction.

The motion-vector redundancy eliminating unit 29 eliminates a redundancy in a motion vector my detected by the motion-vector detector 27. More specifically, the motion-vector redundancy eliminating unit 29 performs: (1) selecting an estimation method used for estimating the motion vector mv; (2) determining an estimation motion vector pmv in accordance with the selected estimation method; and (3) generating a motion-vector residual MVD by subtracting the estimation motion vector pmv from the motion vector my. The motion-vector redundancy eliminating unit 29 supplies the generated motion-vector residual MVD to the prediction-method controller 28, together with the estimation motion-vector index PMVI indicating the selected estimation method.

When the difference between the pixel values of pixels adjacent to each other with a block boundary or a CU boundary therebetween in the decoded image P is smaller than a predetermined threshold, the deblocking filter 33 performs deblocking processing on the block boundary or the CU boundary in the decoded image P, thereby smoothing an image in the vicinity of the block boundary or the CU boundary. The image subjected to deblocking processing by the deblocking filter 33 is output to the adaptive offset filter 80 as a deblocked decoded image P_DB.

The adaptive offset filter 80 performs adaptive offset filtering processing on the deblocked decoded image P_DB supplied from the deblocking filter 33, thereby generating an offset-filtered decoded image P_OF. The generated offset-filtered decoded image P_OF is supplied to the adaptive filter 70. The specific configuration of the adaptive offset filter 80 will be discussed later, and thus, an explanation thereof is omitted here.

The adaptive filter 70 performs adaptive filtering processing on the offset-filtered decoded image P_OF supplied from the adaptive offset filter 80, thereby generating a filtered decoded image P_FL. The filtered decoded image P_FL subjected to filtering processing by the adaptive filter 70 is stored in the buffer memory 24. A filter coefficient used by the adaptive filter 70 is determined so that the error between the filtered decoded image P_FL and the subject image #10 can be minimized, and the filter coefficient determined in this manner is coded as a filter parameter FP and is transmitted to the video decoding device 1.

(Adaptive Offset Filter 80)

Figure 15:
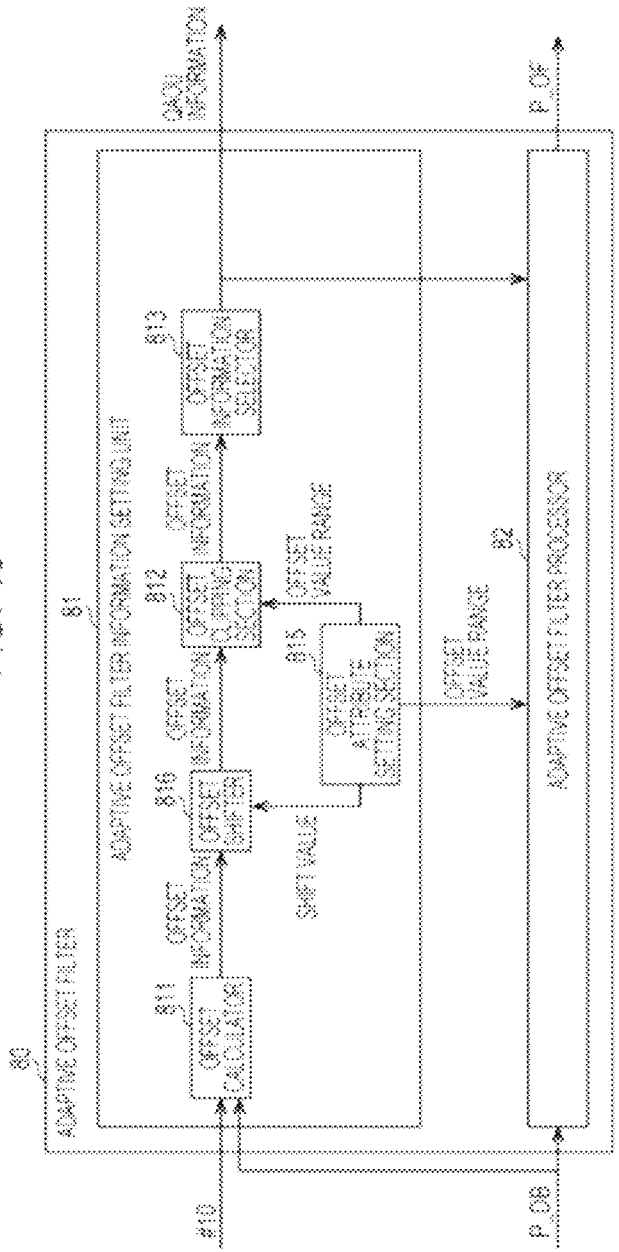
FIG. 15 is a block diagram illustrating the configuration of an adaptive offset filter included in the video coding device according to the first embodiment of the present invention.

FIG. 15 is a block diagram illustrating the configuration of the adaptive offset filter 80. The adaptive offset filter 80 includes, as shown in FIG. 15, an adaptive offset filter information setting unit 81 and an adaptive offset filter processor 82.

The adaptive offset filter information setting unit 81 includes, as shown in FIG. 15, an offset calculator 811, an offset shifter 816, an offset clipping section 812, an offset information selector 813, and an offset attribute setting section 815.

(Offset Calculator 811)

The offset calculator 811 calculates offsets concerning all the offset types and all the classes for all QAOMUs up to a predetermined split depth included in the unit of processing (for example, an LCU). In this case, the offset types and the classes are the same as those discussed in a description of the video decoding device 1.

Figure 16:
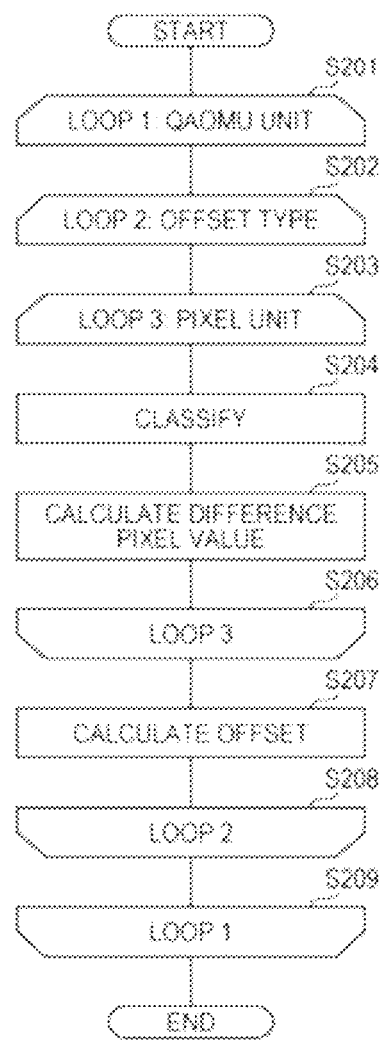
FIG. 16 is a flowchart of a flow of processing performed by an offset calculator of the adaptive offset filter included in the video coding device according to the first embodiment of the present invention.

FIG. 16 is a flowchart of a flow of processing performed by the offset calculator 811.

(Step S201)

First, the offset calculator 811 starts a first loop using the QAOMU number of a subject QAOMU as a loop variable. For example, in the example shown in parts (a) through (e) of FIG. 7, the first loop is a loop from the QAOMU number=0 to the QAOMU number=340.

(Step S202)

Then, the offset calculator 811 starts a second loop using the offset type that can be selected for the subject QAOMU as a loop variable. The second loop is a loop from offset type 1 to offset type 6.

(Step S203)

Then, the offset calculator 811 starts a third loop using a pixel included in the subject QAOMU as a unit.

(Step S204)

Then, the offset calculator 811 classifies a subject pixel under one of a plurality of classes. More specifically, when the offset type, which is the loop variable of the second loop, is one of 1 to 4, the offset calculator 811 classifies the subject pixel under one of class 1 through class 4. The classifying processing in this step is the same processing as the classifying processing in one of the first through fourth examples performed by the classifying section 624 of the adaptive offset filter 60 of the video decoding device 1.

Concerning the subject QAOMU, the offset calculator 811 also calculates the classify number count[part_idx] [sao_type_index][class_idx], which is the number of times pixels are classified for each class. In this classify number, part_idx indicates the QAOMU number.

(Step S205)

Then, the offset calculator 811 calculates a difference pixel value for the subject pixel by calculating the difference between the pixel value of the subject pixel in the deblocked decoded image P_DB and the pixel value of the subject pixel in the subject image #10 to be coded. More specifically, when the position of the subject pixel is represented by (x, y), the offset calculator 811 calculates P_DB(x, y)−Org(x, y). In this expression, P_DB(x, y) denotes the pixel value of the subject pixel in the deblocked decoded image P_DB, and Org(x, y) denotes the pixel value of the subject pixel in the subject image #10.

(Step S206)

This step is the termination of the third loop. At the time point at which this step has been completed, difference pixel values have been calculated for all the pixels included in the subject QAOMU.

(Step S207)

Then, the offset calculator 811 calculates an offset by dividing the sum of the difference pixel values of the pixels included in the subject QAOMU for each class by the above-described classify number concerning this class. More specifically, the offset calculator 811 calculates an offset offset[part_idx][sao_type_idx][class_idx] for the subject QAOMU, the subject offset type, and the subject class by using the following equation.

$$\text{offset}[part\_idx][sao\_type\_idx][class\_idx] = \Sigma(P\_DB(x, y) - Org(x,y))/\text{count}[part\_idx][sao\_type\_idx][class\_idx],$$

where the symbol Σ denotes the sum of the pixels classified as the subject class specified by class_idx in the subject QAOMU specified by part_idx and the subject offset type specified by sao_type_idx.

(Step S208)

This step is the termination of the first loop.

(Step S209)

This step is the termination of the first loop.

By performing the above-described processing, the offset calculator 811 calculates offsets concerning all the offset types and all the classes for all QAOMUs up to a predetermined split depth included in a subject LCU. For example, in the case of the example shown in parts (a) through (e) of FIG. 7, the offset calculator 811 calculates a total of 16368 offsets as represented as follows:

((the total number of *QAOMUs* in the split depth 0)+ . . . +(the total number of *QAOMUs* in the split depth 4))×(the number of *EO* offset types)×(the number of classes of *EO*)+(the number of *BO* offset types)×(the number of classes of *BO*))=(1+4+16+64+256)×((4×4)+(2×16))=16368.

The number of bits of each offset is, for example, ten bits.

The offset calculator 811 supplies offset information indicating offsets calculated by the above-described processing, offset types, classes, and QAOU structure information indicating the QAOU split structure to the offset shifter 816.

In step S204, the video coding device 2 may code a flag indicating which type of classifying processing has been performed, and then, the adaptive offset filter 60 of the video decoding device 1 may refer to this flag and may perform the same classifying processing as that indicated by the flag. Alternatively, without using such a flag, the same classifying processing which has been determined in the video coding device 2 and the video decoding device 1 in advance may be performed.

(Offset Shifter 816)

The offset shifter 816 quantizes each of the offsets included in the offset information supplied from the offset calculator 811. The offset shifter 816 quantizes the offsets by performing bitwise right shift on the offsets so that the precision of the offsets may be transformed from the pixel bit depth to the offset bit depth. The amount by which an offset is shifted in the shifting processing is determined by the shift value supplied from the offset attribute setting section 815, which will be discussed later.

(Offset Clipping Section 812)

In order to restrict the offsets to the offset value range supplied from the offset attribute setting section 815, which will be discussed later, the offset clipping section 812 performs clip processing by using one of the following first clip processing and second clip processing on the offsets supplied from the offset shifter 816.

(First Clip Processing)

The offset clipping section 812 performs clip processing on each of the offsets included in the offset information supplied from the offset shifter 816. The offset clipping section 812 clips each offset supplied from the offset shifter 816 to, for example, values from −8 to 7, thereby expressing each offset by four bits. The clipped offsets are supplied to the offset information selector 813. The bit width used for clipping is set in accordance with the image bit depth and the offset bit depth, as in the video decoding device 1.

By clipping each offset in this manner, the memory size of a memory (not shown) to store each offset can be reduced. The amount of data required to code offsets included in the coded data #1 can also be decreased, thereby making it possible to improve the coding efficiency. Additionally, since excessive offsets are not added, a suitable level of image quality can be guaranteed.

(Second Clip Processing)

The offset clipping section 812 may change the value for the clipping range of an offset supplied from the offset shifter 816 in accordance with the offset type.

For example, if the offset type is an edge offset, the number of bits of an offset is set to be eight bits, and if the offset type is a band offset, the number of bits of an offset is set to be four bits. More generally, when the number of bits of an edge-offset offset is N bits and the number of bits of a band-offset offset is M bits, the numbers of bits of offsets are determined so that the condition N>M can be satisfied.

In this manner, by varying the number of bits of an offset in accordance with the offset type, the coding efficiency can be improved without requiring an excessive memory size of a memory for storing each offset.

When the threshold th for restricting values that can be taken as an offset is greater than $2^{m-1}$ but not greater than $2^m$, m-bit fixed-length coding method can be used as the coding method for coding the offset. More specifically, Truncated unary coding or Truncated Rice coding having th as the maximum value may be used. The above-described maximum value th is determined by the offset value range supplied from the offset attribute setting section 815.

Clip processing performed by a combination of the above-described first clip processing and second clip processing is also included in this embodiment. The adaptive offset filter 80 may not include the offset clipping section 812.

(Offset Information Selector 813)

The offset information selector 813 determines a combination of an offset type, a class, and an offset which minimize the RD cost (Rate-Distortion cost) and the associated QAOU split structure, and supplies QAOU information indicating the determined offset types, classes, and offsets, and the associated QAOM split structure to the variable-length code coder 22. The offset information selector 813 also supplies the determined offsets for each QAOU or each QAOMU to the adaptive offset filter processor 82.

Figure 17:
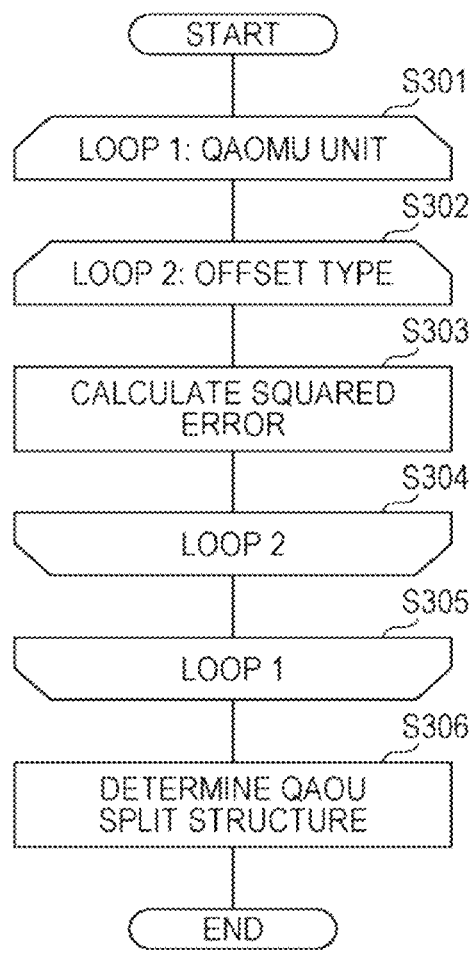
FIG. 17 is a flowchart of a flow of processing performed by an offset information selector of the adaptive offset filter included in the video coding device according to the first embodiment of the present invention.

Processing performed by the offset information selector 813 will be discussed more specifically with reference to FIGS. 17 and 18. FIG. 17 is a flowchart of a flow of processing performed by the offset information selector 813.

(Step S301)

The offset information selector 813 starts a first loop using the QAOMU number of a subject QAOMU as a loop variable.

(Step S302)

Then, the offset information selector 813 starts a second loop using the offset type that can be selected for the subject QAOMU as a loop variable. The second loop is a loop from offset type 1 to offset type 6.

(Step S303)

Then, the offset information selector 813 calculates, for a subject offset type, the squared error between the offset-filtered decoded image P_OF and the subject coded image #10 concerning the subject QAOMU.

(Step S304)

This step is the termination of the second loop.

(Step S305)

This step is the termination of the first loop. At the time point at which the first loop and the second loop have been completed, the squared errors concerning each QAOMU for all the offset types have been calculated.

(Step S306)

Then, the offset information selector 813 determines, among QAOU split structures which may be obtained by dividing the subject unit of processing (for example, an LCU) into QAOUs, the QAOU split structure that minimizes the RD cost.

Specific examples of the processing performed by the offset information selector 813 in this step will be described below with reference to parts (a) through (e) of FIG. 18.

Figure 18:
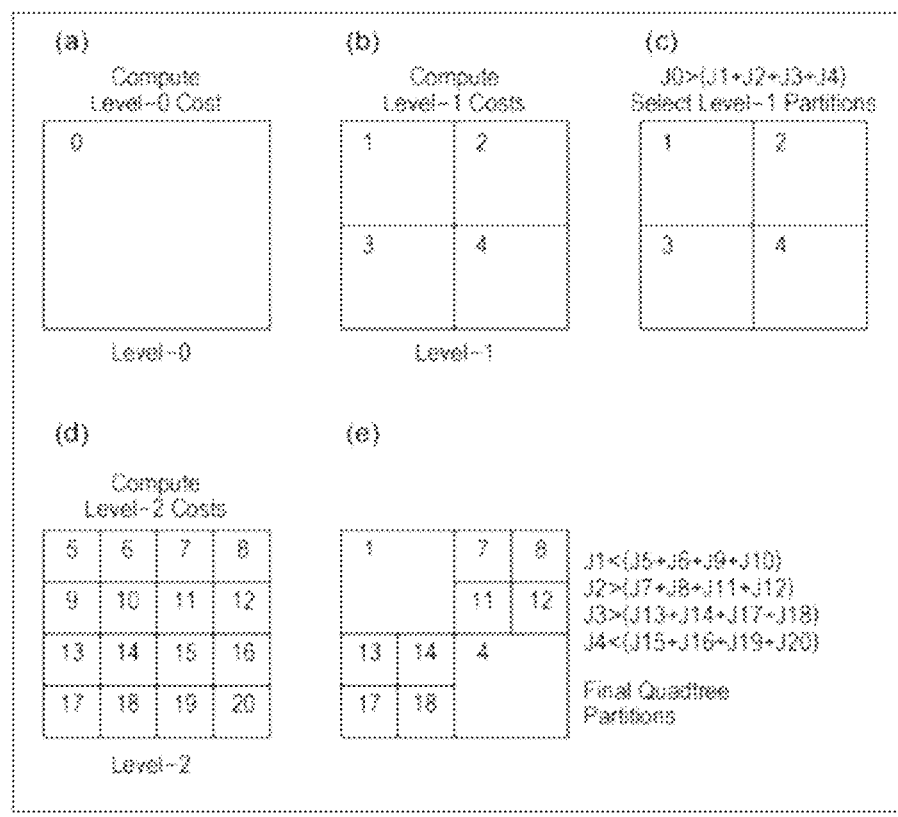
FIG. 18 illustrates processing performed by the offset information selector of the adaptive offset filter included in the video coding device according to the first embodiment of the present invention: part (a) shows a split mode when the split depth is 0 and 1; part (b) shows a split mode when the split depth is 1; part (c) shows a split mode when the split depth is 2; and part (d) shows an example of split mode determined by the offset information selector.

First, the offset information selector 813 calculates the RD cost when the split depth is 0 and the RD cost when the split depth is 1 (part (a) and (b) of FIG. 18). In part (c) of FIG. 18, it is assumed that the RD cost of the split depth 1 is smaller than that of the split depth 0.

Then, the offset information selector 813 calculates the RD cost when the split depth is 2 (part (d) of FIG. 18).

Then, the offset information selector 813 compares the RD cost of a QAOMU of the split depth 1 with that of QAOMUs of the split depth 2 contained in the QAOMU of the split depth 1. If the RD cost of the QAOMUs of the split depth 2 is smaller than that of the QAOMU of the split depth 1, the offset information selector 813 updates the QAOMU of the split depth 1 to the QAOMUs of the split depth 2 (part (e) of FIG. 18). The offset information selector 813 repeats this processing up to the largest split depth. In this manner, the QAOU split structure which minimizes the RD Cost can be determined.
(Offset Attribute Setting Section 815)

The offset attribute setting section 815 receives the pixel bit depth (not shown) and determines the offset bit depth. The offset attribute setting section 815 then sets the offset value range and the shift value by using the determined offset bit depth. The offset value range is supplied to the adaptive offset filter processor 82, and the shift value is supplied to the offset shifter 816. The setting of the offset value range and the shift value are the same processing as that performed by the above-described offset attribute setting section 613, and thus, an explanation thereof is omitted here.
(Adaptive Offset Filter Processor 82)

The adaptive offset filter processor 82 adds an offset supplied from the offset information selector 813 to each pixel of a subject QAOU in the deblocked decoded image P_DB. The adaptive offset filter processor 82 outputs, as an offset-filtered decoded image P_OF, an image obtained by performing processing on all the QAOUs included in the deblocked decoded image P_DB. The configuration of the adaptive offset filter processor 82 is the same as that of the adaptive offset filter processor 62, and thus, an explanation thereof is omitted here. Each offset stored in an offset information storage section (not shown) included in the adaptive offset filter processor 82 is restricted to the offset value range set by the offset attribute setting section 815.

Second Embodiment

In the first embodiment, sao_offset[sao_curr_depth][ys][xs][i] included in the coded data #1 is syntax which represents a specific value of an offset to be added to each pixel included in a subject QAOU in the offset filtering processing performed by using the adaptive offset filter.

Meanwhile, the present inventors have found that the amount of data required for coding data can be further reduced by performing predictive coding on an offset value used for offset filtering processing, that is, by coding an offset residual calculated by using an offset value and a prediction value of the offset value.

In a second embodiment, a description will be given, with reference to FIGS. 19 through 21, of a video decoding device which decodes an offset subjected to predictive coding and which performs offset filtering processing, and of a video coding device which performs predictive coding on an offset used for offset filtering processing. Portions discussed in the first embodiment will not be described.
(Coded Data)

Coded data of this embodiment includes an offset residual sao_offset_residual[sao_curr_depth][ys][xs][i] instead of sao_offset[sao_curr_depth][ys][xs][i] included in the coded data #1 of the first embodiment. The other portions of the configuration of the coded data of this embodiment are similar to those of the coded data #1 of the first embodiment. Hereinafter, the coded data of this embodiment may also be indicated as coded data #3.
(sao_offset_residual)

The offset residual sao_offset residual[sao_curr_depth][ys][xs][i] represents a weighted difference value between an offset value to be added to each pixel included in a QAOU in offset filtering processing performed by an adaptive offset filter of this embodiment and a prediction value of the offset value, and is also indicated by sao_offset_residual[sao_type_idx][class_idx].

If an offset to be added to a subject pixel included in a subject QAOU is indicated by Offset[sao_type_idx][class_idx], the offset residual sao_offset_residual[sao_type_idx][class_idx] is represented as follows:

$$sao\_offset\_residual[sao\_type\_idx][class\_idx] = Offset[sao\_type\_idx][class\_idx] - a*pred\_offset[merge\_tbl[sao\_type\_idx]][class\_idx]$$

where a is a weight coefficient to be multiplied by the prediction value pred_offset and merge_tbl is a function using sao_type_idx as an argument. Specific examples of a and merge_tbl will be discussed later, and thus, an explanation thereof is omitted here.
(Video Decoding Device)

The video decoding device of this embodiment includes an adaptive offset filter 60' instead of the adaptive offset filter 60 of the video decoding device 1 of the first embodiment. The other elements of the configuration of the video decoding device of this embodiment are similar to those of the video decoding device 1 of the first embodiment.

Figure 19:
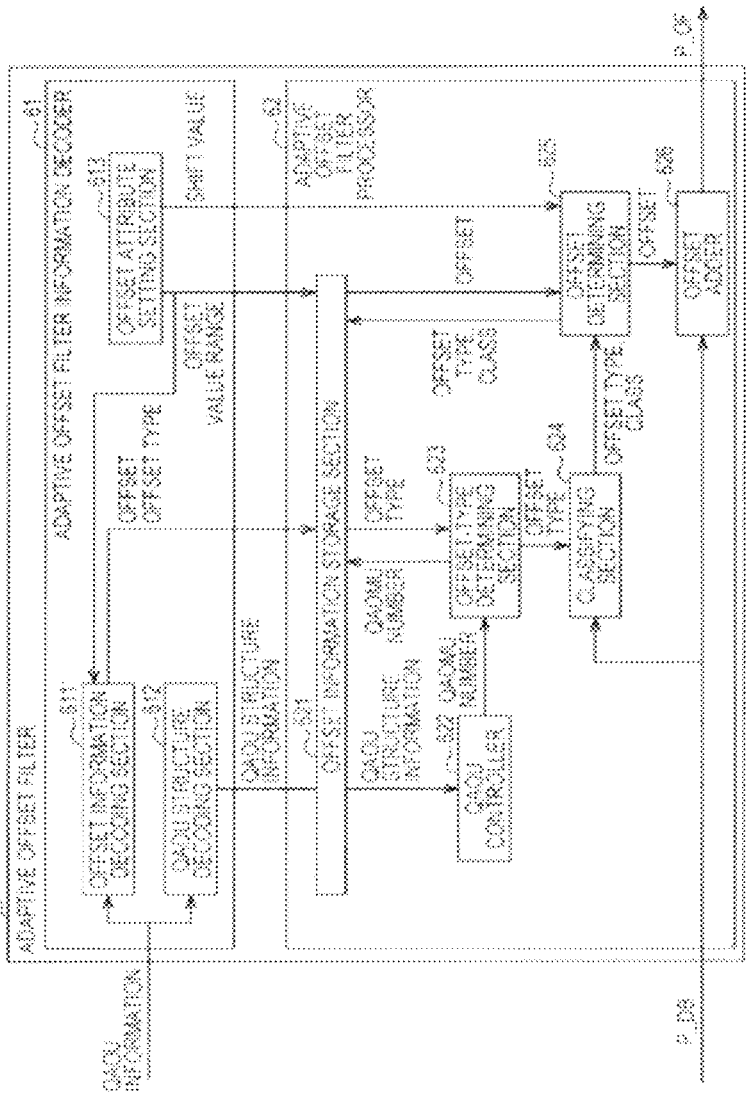
FIG. 19 is a block diagram illustrating the configuration of an adaptive offset filter included in a video decoding device according to a second embodiment of the present invention.

FIG. 19 is a block diagram illustrating the configuration of the adaptive offset filter 60' of this embodiment. As shown in FIG. 19, the adaptive offset filter 60' includes an offset information decoding section 611' instead of the offset information decoding section 611 of the adaptive offset filter 60.
(Offset Information Decoding Section 611)

The offset information decoding section 611' refers to QAOU information included in the coded data #3 and decodes offset information OI included in the QAOU information. By using an offset residual sao_offset_residual[sao_type_idx][class_idx] and a prediction value pred_offset[merge_tbl[sao_type_idx]][class_idx] obtained by decoding the offset information OI, the offset information decoding section 611' calculates an offset Offset[sao_type_idx][class_idx] to be used for adaptive offset filtering processing by the following expression:

$$Offset[sao\_type\_idx][class\_idx] = a*pred\_offset[merge\_tbl[sao\_type\_idx]][class\_idx] + sao\_offset\_residual[sao\_type\_idx][class\_idx].$$

The offset information decoding section 611' then stores the calculated Offset[sao_type_idx][class_idx] in the offset information storage section 621. In the above-described expression, pred_offset[merge_tbl[sao_type_idx]][class_idx] is a prediction value of Offset[sao_type_idx][class_idx], and merge_tbl[sao_type_idx] represents a table for providing an index to sao_type_idx=1 to 6, and one or more items of sao_type_idx may be considered as the same group.
(First Specific Example of pred_offset)

A first specific example of pred_offset[merge_tbl[sao_type_idx]][class_idx] will be discussed below. In this example, the prediction value pred_offset[merge_tbl[sao_type_idx]][class_idx] is determined by:

$$pred\_offset[merge\_tbl[sao\_type\_idx]][class\_idx] = Offset'[sao\_type\_idx][class\_idx]$$

where Offset'[sao_type_idx][class_idx] is a decoded offset, and represents an offset associated with the offset type index sao_type_idx and the class index class_idx.

In this manner, in this example, as the prediction value of Offset[sao_type_idx][class_idx], an offset Offset'[sao_type_idx][class_idx], which is a decoded offset associated with the offset type index sao_type_idx and the class index class_idx is used.

(Second Specific Example of pred_offset)

A second specific example of pred_offset[merge_tbl[sao_type_idx]][class_idx] will be discussed below. In this example, the prediction value pred_offset[merge_tbl[sao_type_idx]][class_idx] is determined by:

$$\text{pred\_offset}[\text{merge}\_tbl[sao\_type\_idx]][class\_idx] = \\ (\text{pred\_offset'}[\text{merge}\_tbl[sao\_type\_idx]] \\ [class\_idx]*W1 + \text{Offset'}[sao\_type\_idx] \\ [class\_idx]*W2 >> \log_2(W1+W2)$$

where pred_offset'[merge_tbl[sao_type_idx]][class_idx] denotes a prediction value used for calculating a decoded offset Offset'[sao_type_idx][class_idx], "*" denotes an operation symbol representing multiplication, and ">>" denotes a bitwise right shift. W1 and W2 denote weight coefficients, and may take values, such as W1=3 and W2=1. Specific values of W1 and W2 may be determined so that the coding efficiency can be increased.

As is seen from the above-described expression, in this example, reference is made to decoded prediction values and offsets recursively, such as reference is made to pred_offset' and Offset' in order to determine pred_offset, reference is made to pred_offset'' and Offset'' in order to determine pred_offset', and so on. Accordingly, a plurality of decoded offsets contribute to pred_offset, thereby suppressing excessive fluctuations in a prediction value. With this arrangement, for example, even if an inappropriate prediction value has been calculated due to the influence of noise, the influence of such an inappropriate prediction value can be suppressed, thereby making it possible to improve the coding efficiency.

(Third Specific Example of pred_offset)

A third specific example of pred_offset[merge_tbl[sao_type_idx]][class_idx] will be discussed below. In this example, the prediction value pred_offset[merge_tbl[sao_type_idx]][class_idx] is determined by:

$$\text{pred\_offset}[\text{merge}\_tbl[sao\_type\_idx]] \\ [class\_idx] = \text{clip3}(-th, th, \text{pred\_offset}[\text{merge}\_tbl \\ [sao\_type\_idx]][class\_idx])$$

where clip3(A, B, C) denotes that the value C is clipped by the lower limit value A and the upper limit value B. The argument pred_offset[merge_tbl[sao_type_idx]] of clip3 is determined, for example, as in the above-described first or second specific example. The threshold th is determined as follows while being dependent on the bit depth bit_depth of the pixel value.

$$th=4 \text{ (bit\_depth=8)}$$

$$th=8 \text{ (bit\_depth>8)}$$

In this manner, in this example, by using a prediction value clipped by the upper limit value and the lower limit value, excessively large prediction values and excessively small prediction values are not generated, thereby making it possible to improve the coding efficiency. The absolute values of the upper limit value and the lower limit value are set such that they become large when the bit of a pixel value is large. Thus, appropriate clip processing is performed in accordance with the bit depth of a pixel value, thereby preventing degradation of the image quality.

(First Specific Example of merge_tbl)

Part (a) of FIG. 20 is a table illustrating a first specific example of the function merge_tbl[sao_type_idx]. As shown in part (a) of FIG. 20, when sao_type_idx=0, merge_tbl[sao_type_idx] of this example does not take any value, and when sao_type_idx=1 to 6, merge_tbl[sao_type_idx] of this example takes 0 to 5, respectively. Accordingly, merge_tbl[sao_type_idx] of this example may also be represented as:

$$\text{merge}\_tbl[sao\_type\_idx] = sao\_type\_idx - 1.$$

By using merge_tbl[sao_type_idx] of this example, the offset information decoding section 611' individually determines a prediction value pred_offset for each sao_type_idx and for each class_idx. It is thus possible to reduce the amount of data required to code offset residuals sao_offset residual.

(Second Specific Example of merge_tbl)

Part (b) of FIG. 20 is a table illustrating a second specific example of the function merge_tbl[sao_type_idx]. As shown in part (b) of FIG. 20, in the case of an edge offset (sao_type_idx=1 to 4), merge_tbl[sao_type_idx] of this example takes 0, and in the case of a band offset (sao_type_idx=5 or 6), merge_tbl[sao_type_idx] of this example takes 1 or 2, respectively.

For example, if sao_type_idx=1 (merge_tbl[sao_type_idx=1]=0) and class_idx=1 have been specified when calculating the previous offset, and if sao_type_idx=2 (merge_tbl[sao_type_idx=2]=0) and class_idx=1 have been specified when calculating the subsequent offset, the prediction value to be used for calculating the subsequent offset is the same as that used for calculating the previous offset.

By using merge_tbl[sao_type_idx] of this example, the offset information decoding section 611' performs the following processing depending on whether an edge offset is specified or a band offset is specified.

When edge offset is specified

The prediction value of an offset to be decoded is calculated from a decoded offset classified as the same class as that of the offset to be decoded. In this case, the offset type of the offset to be decoded and that of the prediction value may be different as long as the class is the same. Accordingly, a prediction value which is set for calculating an offset of a certain offset type may be used for calculating an offset of an offset type different from this certain offset type. As a result, the amount of processing for setting prediction values can be reduced.

When band offset is specified

The prediction value of an offset to be decoded is calculated from an offset having the same offset type and classified as the same class as those of the offset to be decoded.

By using merge_tbl[sao_type_idx] of this example, an appropriate prediction value can be calculated while the amount of processing is reduced.

(Specific Example of Coefficient a)

The weight coefficient a to be multiplied by the prediction value pred_offset may be 1 regardless of the offset type, or may vary depending on the offset type.

For example, the weight coefficient a may vary as:

a=1 (in the case of an edge offset)

a=0.5 (in the case of a band offset).

More generally, if the coefficient a to be used when an edge offset is specified is indicated by a(edge) and if the coefficient a to be used when a band offset is specified is indicated by a(band), the coefficient a which satisfies the following condition is used:

$$a(\text{edge}) > a(\text{band}).$$

The present inventors have found that the correlation between a decoded offset and an offset to be decoded when an edge offset is specified is greater than that when a band offset is specified. In the above-described specific example, the influence of the correlation between a decoded offset and an offset to be decoded can be appropriately reflected, thereby reducing the amount of data to code offset residuals.

(Video Coding Device)

The video coding device of this embodiment includes an adaptive offset filter 80' instead of the adaptive offset filter 80 of the video coding device 2 of the first embodiment. The other elements of the configuration of the video coding device of this embodiment are similar to those of the video coding device 2 of the first embodiment.

Figure 21:
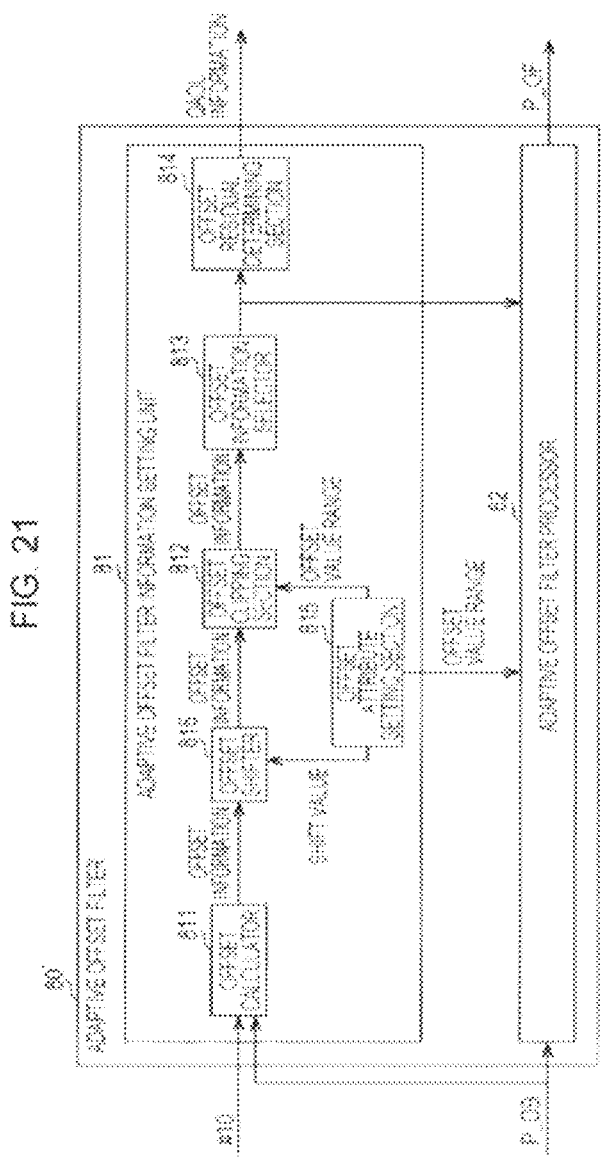
FIG. 21 is a block diagram illustrating the configuration of an adaptive offset filter included in a video coding device according to the second embodiment of the present invention.

FIG. 21 is a block diagram illustrating the configuration of the adaptive offset filter 80' of this embodiment. As shown in FIG. 21, the adaptive offset filter 80' includes an offset residual determining section 814 in addition to the components of the adaptive offset filter 80.

(Offset Residual Determining Section 814)

The offset residual determining section 814 calculates an offset residual by taking the difference between an offset supplied from the offset information selector 813 and a prediction value of the offset. The offset residual is coded by the variable-length code coder 22 as part of QAOU information.

The prediction value set by the offset residual determining section 814 is similar to that set by the offset information decoding section 611' of the video decoding device of this embodiment, and thus, an explanation thereof is omitted here.

(Appendix 1)

The present invention may be described as follows.

An image filtering device according to the present invention is an image filtering device for adding an offset to a pixel value of each pixel forming an input image which is constituted by a plurality of unit areas. The image filtering device includes: offset attribute setting means for setting offset attributes for a subject unit area by referring to offset-type specifying information included in coded data; offset decoding means for decoding an offset having a bit width corresponding to an offset value range included in the set offset attributes; and filtering means for adding the offset to the pixel value of each pixel forming the input image.

With the image filtering device configured as described above, the offset attribute setting means refers to the offset-type specifying information included in the coded data and sets offset attributes for the subject unit area, and the offset decoding means decodes an offset having a bit width corresponding to an offset value range included in the set offset attributes. It is thus possible to effectively reduce the memory size of a memory for storing offsets.

Accordingly, with the above-described configuration, it is possible to perform appropriate offset filtering processing while the memory size of a memory for storing offsets is reduced.

The offset-type specifying information may be determined for each of the input images or for each of the unit areas. Alternatively, the offset-type specifying information may be determined for each predetermined set of the input images or for each predetermined set of the unit areas.

The offset-type specifying information may preferably include information concerning a bit depth of the pixel value in each unit area forming the input image, and the offset decoding means may preferably decode an offset having a bit width corresponding to the bit depth of the pixel value.

With the above-described configuration, since the offset decoding means decodes an offset having a bit width corresponding to the bit depth of the pixel value, the memory size of a memory for storing offsets can effectively be reduced.

The offset-type specifying information may include information concerning a bit depth of the pixel value in each unit area forming the input image, and the offset decoding means may decode an offset having a bit width which can express a value range corresponding to the bit depth.

With the above-described configuration, since the offset decoding means decodes an offset having a bit width which can express a value range corresponding to the pixel value in each unit area forming the input image, the memory size of a memory for storing offsets can be reduced effectively.

The bit width that can express a value range corresponding to the bit depth is a bit width when values included in the value range are represented in binary notation. For example, if the value range is $-2^3$ to $2^3-1$, the bit width that can express the value range is four bits.

The above-described decoded offset may preferably be a quantized value, and the filtering means may preferably add a value obtained by inverse-quantizing the offset by using a parameter included in the offset attributes to the pixel value of each pixel.

With the above-described configuration, the decoded offset is a quantized value, and the filtering means adds a value obtained by inverse-quantizing the offset by using a parameter included in the offset attributes to the pixel value of each pixel. Accordingly, an offset corresponding to a parameter included in the offset attributes is added to each image value.

Accordingly, with the above-described configuration, it is possible to improve the coding efficiency while the memory size of a memory for storing offsets is reduced.

The offset-type specifying information may include information concerning a shift value of the pixel value, and the filtering means may add a value obtained by inverse-quantizing the offset by using the shift value instead of adding the above-described offset.

With the above-described configuration, the offset-type specifying information includes information concerning a shift value of the pixel value, and the filtering means adds a value obtained by inverse-quantizing the offset by using the shift value instead of adding the above-described offset, thereby making it possible to obtain an offset corresponding to the shift value of the pixel value. Thus, it is possible to improve the coding efficiency while the memory size of a memory for storing offsets is reduced.

The shift value of the pixel value indicates a difference value between the pixel bit depth and the offset bit depth, and inverse-quantizing of the offset by using the shift value means that the offset is subjected to bitwise left shift by an amount equal to the shift value, thereby performing transformation from the offset bit depth to the pixel bit depth.

The offset-type specifying information may preferably be determined for the input image.

With the above-described configuration, since the offset-type specifying information is determined for the input image, the image filtering device is capable of performing appropriate offset processing for the input image.

An offset decoding device according to the present invention is an offset decoding device for decoding each offset which is referred to by an image filter for adding an offset to a pixel value of each pixel forming an input image. The offset decoding device includes: offset residual decoding means for decoding each offset residual from coded data; prediction value determining means for determining a prediction value of each offset from a decoded offset; and offset calculating means for calculating each offset from a prediction value determined by the prediction value determining means and an offset residual decoded by the offset residual decoding means.

In the offset decoding device configured as described above, there are provided the offset residual decoding means for decoding each offset residual from coded data, the prediction value determining means for determining a prediction value of each offset from a decoded offset, and the offset calculating means for calculating each offset from a prediction value determined by the prediction value determining means and an offset residual decoded by the offset residual decoding means. Accordingly, an offset can be appropriately decoded from coded data having a smaller amount of data, compared with a case in which each offset itself is coded.

The input image may preferably be constituted by a plurality of unit areas. The offset residual decoding means may preferably decode each offset residual in association with an offset type, which is determined for each unit area, and an offset class, which is determined for each pixel. The prediction value determining means may preferably determine a prediction value of each offset from a decoded offset associated with the same offset type and the same offset class as those of the offset for which a prediction value will be determined.

With the above-described configuration, the prediction value of each offset is determined from a decoded offset associated with the same offset type and the same offset class as those of the offset for which a prediction value will be determined, thereby making it possible to improve the prediction precision. Accordingly, with the above-described configuration, it is possible to appropriately decode an offset from coded data having a smaller amount of data.

The input image may preferably be constituted by a plurality of unit areas. The offset residual decoding means may preferably decode each offset residual in association with an offset type, which is determined for each unit area, and an offset class, which is determined for each pixel. The prediction value determining means may preferably determine a prediction value of each offset from a decoded offset associated with the same first offset type group and the same offset class as those of the offset for which a prediction value will be determined in a case in which the offset type associated with the offset belongs to a first offset type group, and the prediction value determining means may preferably determine a prediction value of each offset from a decoded offset associated with the same offset type and the same offset class as those of the offset for which a prediction value will be determined in a case in which the offset type associated with the offset belongs to a second offset type group.

With the above-described configuration, the prediction value of each offset is determined from a decoded offset associated with the same offset type as that of the offset for which a prediction value will be determined in a case in which the offset type associated with the offset belongs to a first offset type group, and the prediction value of each offset is determined from a decoded offset associated with the same offset type and the same offset class as those of the offset for which a prediction value will be determined in a case in which the offset type associated with the offset belongs to a second offset type group, thereby making it possible to improve the prediction precision while the amount of processing is reduced. Thus, with the above-described configuration, it is possible to appropriately decode an offset from coded data having a smaller amount of data while the amount of processing is reduced.

The first offset type is a type in which each pixel in a unit area associated with the first offset type is classified as one of a plurality of classes in accordance with, for example, the mode of an edge in the vicinity of the pixel. The second offset type is a type in which each pixel in a unit area associated with the second offset type is classified as one of a plurality of classes in accordance with, for example, the pixel value of the pixel.

The offset calculating means may preferably calculate each offset as a linear function of a prediction value determined by the prediction value determining means and an offset residual decoded by the offset residual decoding means. A coefficient to be multiplied by the prediction value may preferably differ depending on whether the offset type associated with the offset belongs to the first offset type group or the second offset type group.

With the above-described configuration, the coefficient to be multiplied by the prediction value differs depending on whether the offset type associated with the offset belongs to the first offset type group or the second offset type group. It is thus possible to calculate the offset by using a more suitable coefficient depending on the offset type, thereby making it possible to improve the coding efficiency.

The prediction value determining means may preferably determine a prediction value of each offset by calculating a weighted average of a decoded offset and a prediction value of the decoded offset.

With the above-described configuration, a prediction value of each offset is determined by calculating a weighted average of a decoded offset and a prediction value of the decoded offset. Accordingly, a plurality of decoded offsets contribute to a prediction value of each offset, thereby suppressing excessive fluctuations in the prediction value. With this arrangement, for example, even if an inappropriate prediction value has been calculated due to the influence of noise, the influence of such an inappropriate prediction value can be suppressed, thereby making it possible to improve the coding efficiency.

The prediction value determining means may preferably include clipping means for clipping each of the determined prediction values by using an upper limit value and a lower limit value which correspond to a bit depth of the pixel value of each pixel forming the input image.

With the above-described configuration, since each of the determined prediction values is clipped by using an upper limit value and a lower limit value which correspond to a bit depth of the pixel value of each pixel forming the input image, excessively large prediction values and excessively small prediction values are not generated, thereby making it possible to improve the coding efficiency.

An image filtering device according to the present invention is an image filtering device which operates on an input image. The image filtering device includes: calculating means for calculating a difference value between a pixel value of a subject pixel forming an input image and a pixel value of a pixel around the subject pixel; bit shift means for performing bitwise right shift on a pixel value referred to by the calculating means or the difference value calculated by the calculating means by an amount equal to a predetermined shift value; classifying means for classifying the subject pixel as one of a plurality of offset classes in accordance with a magnitude relation between the difference value subjected to bitwise right shift by the bit shift means and 0; and offset means for adding an offset associated with the offset class of the subject pixel classified by the classifying means to the pixel value of the subject pixel.

In the image filtering device configured as described above, the subject pixel is classified as one of a plurality of offset classes in accordance with a magnitude relation between the difference value subjected to bitwise right shift by the bit shift means and 0, and an offset associated with the offset class of the subject pixel classified by the classifying means is added to the pixel value of the subject pixel. Thus, the classifying processing is less vulnerable to the influence of noise, thereby making it possible to improve the coding efficiency.

The predetermined shift value may preferably have a positive correlation with a bit depth of the pixel value of the subject pixel.

With the above-described configuration, since the predetermined shift value may preferably have a positive correlation with a bit depth of the pixel value of the subject pixel, the coding efficiency can be more effectively improved.

An image filtering device according to the present invention is an image filtering device which operates on an input image. The image filtering device includes: calculating means for calculating a difference value between a pixel value of a subject pixel forming an input image and a pixel value of a pixel around the subject pixel; classifying means for classifying the subject pixel as one of a plurality of offset classes in accordance with a magnitude relation between the difference value calculated by the calculating means and each of predetermined first and second thresholds; and offset means for adding an offset associated with the offset class of the subject pixel classified by the classifying means to the pixel value of the subject pixel.

In the image filtering device configured as described above, the subject pixel is classified as one of a plurality of offset classes in accordance with a magnitude relation between the difference value calculated by the calculating means and each of the predetermined first and second thresholds, and an offset associated with the offset class of the subject pixel classified by the classifying means is added to the pixel value of the subject pixel. Thus, the classifying processing is less vulnerable to the influence of noise, thereby making it possible to improve the coding efficiency.

Absolute values of the first and second thresholds may preferably have a positive correlation with a bit depth of the pixel value of the subject pixel.

With the above-described configuration, since the absolute values of the first and second thresholds have a positive correlation with the bit depth of the pixel value of the subject pixel, the coding efficiency can be more effectively improved.

An image filtering device according to the present invention is an image filtering device which operates on an input image constituted by a plurality of unit areas. The image filtering device includes: determining means for determining, among first and second offset types, an offset type to which a subject unit area including a subject pixel forming the input image belongs; classifying means for classifying the subject pixel as one of an offset class in which an offset is not added and a plurality of offset classes in which an offset is added in accordance with the offset type to which the subject unit area belongs and a pixel value of the subject pixel; and offset means for adding an offset associated with the offset type to which the subject unit area belongs and the offset class of the subject pixel classified by the classifying means to the pixel value of the subject pixel. In a case in which the pixel value of the subject pixel is within a predetermined range, the classifying means classifies the subject pixel as an offset class in which an offset is added, regardless of whether the offset type to which the unit area including the subject pixel belongs is the first offset type or the second offset type.

In the image filtering device configured as described above, in a case in which the pixel value of the subject pixel is within a predetermined range, the subject pixel is classified as an offset class in which an offset is added, regardless of whether the offset type to which the unit area including the subject pixel belongs is the first offset type or the second offset type, thereby making it possible to effectively eliminate block noise. Accordingly, with the above-described configuration, the coding efficiency can be improved.

An image filtering device according to the present invention is an image filtering device for adding an offset to a pixel value of each pixel forming an input image which is constituted by a plurality of unit areas. The image filtering device includes: determining means for determining an offset type to which a subject unit area belongs among a plurality of offset types; offset coding means for determining an offset having a bit width which differs depending on the offset type and for coding the offset; and filtering means for adding the determined offset to the pixel value of each pixel forming the input image.

In the image filtering device configured as described above, among a plurality of offset types, the offset type to which a subject unit area belongs is determined, an offset having a bit width which differs depending on the determined offset type is determined, and the determined offset is added to the pixel value of each pixel forming the input image. The determined offset is also coded.

Accordingly, with the above-described configuration, it is possible to perform appropriate offset filtering processing while the memory size of a memory for storing offsets is reduced. With the above-described configuration, since the amount of data required to code data is reduced, the coding efficiency is improved.

An offset coding device according to the present invention is an offset coding device for coding each offset which is referred to by an image filter for adding an offset to a pixel value of each pixel forming an input image. The offset coding device includes: prediction value determining means for determining a prediction value of each offset from a coded offset; offset residual calculating means for calculating an offset residual from each offset and a prediction value determined by the prediction value determining means; and offset residual coding means for coding an offset residual calculated by the offset residual calculating means.

In the offset coding device configured as described above, there are provided the prediction value determining means for determining a prediction value of each offset from a coded offset, the offset residual calculating means for calculating an offset residual from each offset and a prediction value determined by the prediction value determining means, and the offset residual coding means for coding an offset residual calculated by the offset residual calculating means. It is thus possible to reduce the amount of data required to code data can be reduced.

A data structure of coded data according to the present invention is a data structure of coded data which is referred to by an image filter for adding an offset to a pixel value of each pixel forming an input image which is constituted by a plurality of unit areas. The data structure includes: offset-type specifying information which specifies an offset type to which each unit area belongs; and an offset having a bit width which differs depending on the offset type. The image filter refers to the offset-type specifying information included in the coded data, and determines an offset type to which a subject unit area belongs and also decodes an offset having a bit width which differs depending on the determined offset type.

The coded data configured as describe above includes an offset having a bit width which differs depending on the offset type, thereby reducing the amount of data required to code data. The image filter which decodes the coded data refers to the offset-type specifying information, and determines the offset type to which a subject unit area belongs and also decodes an offset having a bit width which differs depending on the determined offset type. It is thus possible to perform appropriate offset filtering processing while the memory size of a memory for storing offsets is reduced.

The offset-type specifying information may be determined for each of the input images or for each of the unit areas. Alternatively, the offset-type specifying information may be determined for each predetermined set of the input images or for each predetermined set of the unit areas.

Third Embodiment

Offset information OI of a third embodiment will first be described below with reference to FIG. 23. Part (a) of FIG. 23 illustrates syntax (indicated by "sao_offset_param( )" in part (a) of FIG. 23) of offset information OI.

As shown in part (a) of FIG. 23, the offset information OI includes a parameter "sao_type_idx[sao_curr_depth][ys][xs]". If the parameter "sao_type_idx[sao_curr_depth][ys][xs]" is not 0, a parameter sao_offset[sao_curr_depth][ys][xs][i] is included in the offset information OI. (sao_curr_depth, ys, xs)

An argument "sao_curr_depth", which is an argument of "sao_type_idx" and "sao_offset", is a parameter indicating the split depth of a QAOU, and "ys" and "xs" are parameters respectively indicating the position in the y direction and the position in the x direction of a QAOU (or a QAOMU, which will be discussed later).

The split modes of a QAOU in accordance with the values of "sao_curr_depth" are the same as those discussed with reference to FIG. 4.

Part (b) of FIG. 23 illustrates syntax (indicated by "sao_split_param( )" in part (b) of FIG. 23) of QAOU information. As indicated by the syntax shown in part (b) of FIG. 23, if the split depth "sao_curr_depth" is smaller than a predetermined maximum value set by "saoMaxDepth", it is determined by the parameter "sao_split_flag" whether a QAOU will be further split. If the QAOU will be further split, a subsequent hierarchical depth "sao_split_param( )" is recursively called. If the split depth has reached the maximum value ("sao_curr_depth" is not smaller than "saoMaxDepth"), "0" is set in "sao_split_flag[sao_curr_depth][ys][xs]", and the QAOU will not be further split.

Figure 44:
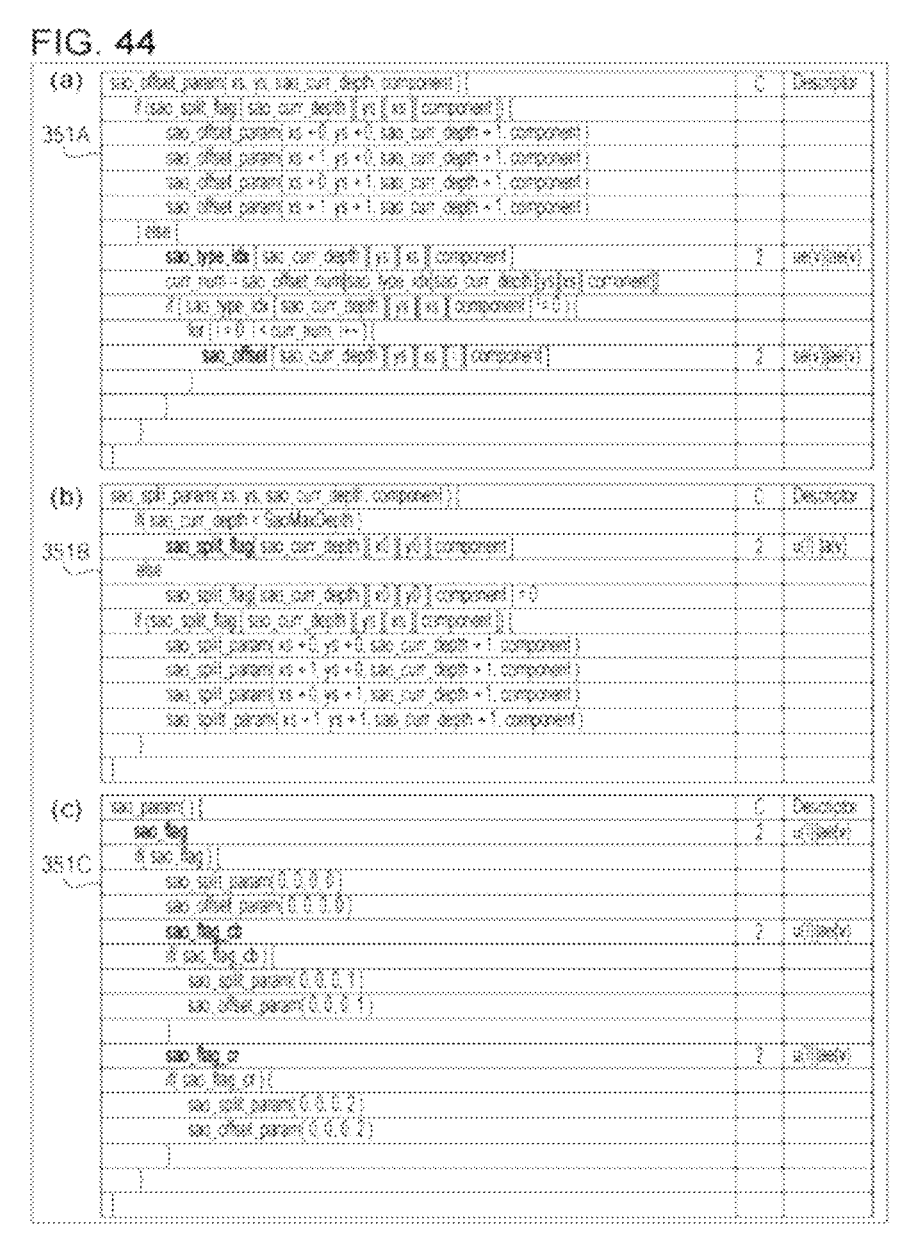

FIG. 44 illustrates another example of syntax of offset information and syntax of QAOU information.

Part (a) of FIG. 44 illustrates syntax of offset information. The configuration of the syntax is similar to that shown in part (a) of FIG. 23, but "component" indicating the value of a color component is added as an argument of "sao_offset_param( )" and as an index of an array of "sao_split_flag", "sao_type_idx", and "sao_offset". By the addition of "component", a QAOU may be split differently according to a color component, such as a luminance component or a chrominance component, and different offsets may be applied to split QAOUs.

Part (b) of FIG. 44 illustrates syntax of QAOU information. As in part (a) of FIG. 44, a color component "component" is added as an argument to the syntax shown in part (b) of FIG. 23.

Part (c) of FIG. 44 illustrates the entire syntax of an adaptive offset filter which calls syntax of part (a) and syntax of part (b) of FIG. 44. The parameter "sao_flag" is a flag indicating whether or not an adaptive offset filter is applied. Only when this flag is true, will the following parameters concerning the adaptive offset filter be used. If this flag is true, the syntax "sao_split_param( )" and the syntax "sao_offset_param( )" are called by specifying the highest hierarchical level for each color component. Since the highest hierarchical level is specified, arguments provided to each syntax are sao_curr_depth=0, ys=0, and xs=0. The color components are distinguished from each other by setting the values of "component" as follows: the value is 0 in the case of the luminance (Y), the value is 1 in the case of the chrominance (Cb), and the value is 2 in the case of the chrominance (Cr). Other values may be used as the values of the component as long as the color components can be distinguished from each other.

Concerning the chrominance (Cb) and the chrominance (Cr), flags "sao_flag_cb" and "sao_flag_cr" are respectively used to determine whether an adaptive offset filter will be applied, and if it is not applied, QAOU information and offset information concerning the associated color component are not stored.

Since the argument "component" is added in the syntax shown in FIG. 44, in the description using FIG. 23, processing is performed by replacing the argument [sao_curr_depth][ys][xs] by [sao_curr_depth][ys][xs][component]. In the subsequent description, processing is performed in a similar manner.

(Video Decoding Device 1')

A video decoding device 1' of the third embodiment will be described below with reference to FIGS. 22 and 24 through 29. Elements having the same functions as those discussed in the above-described embodiments are designated by like reference numerals, and an explanation thereof will thus be omitted.

As in the video decoding device 1, the video decoding device 1' partially includes a method defined in H. 264/MPEG-4. AVC, a method used in KTA software, which is a joint development codec in VCEG (Video Coding Expert Group), a method used in TMuC (Test Model under Consideration) software, which is a successor codec to the codec used in KTA software, and a technology used in HM (HEVC TestModel) software. The video decoding device 1' of this embodiment is different from the video decoding device 1 of the first embodiment in that it includes an adaptive offset filter 60' instead of the adaptive offset filter 60 of the video decoding device 1. The other elements of the configuration of the video decoding device 1' are similar to those of the video decoding device 1.

(Adaptive Offset Filter 60)

Figure 22:
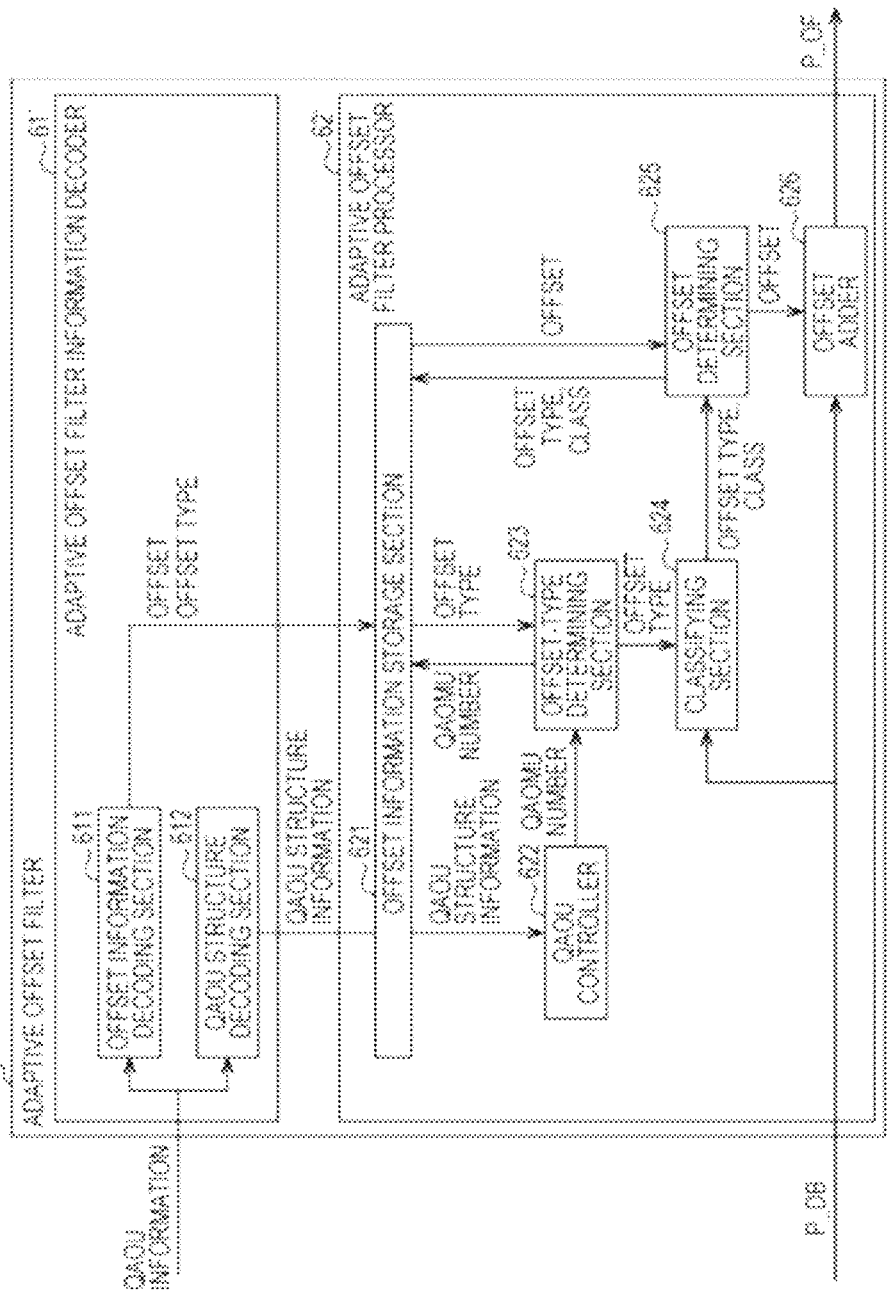
FIG. 22 is a block diagram illustrating the configuration of an adaptive offset filter according to a third embodiment of the present invention.

Details of the adaptive offset filter 60' will now be discussed below with reference to FIG. 22. FIG. 22 is a block diagram illustrating the configuration of the adaptive offset filter 60'. As shown in FIG. 22, the adaptive offset filter 60' includes an adaptive offset filter information decoder 61' and an adaptive offset filter processor 62'.

The adaptive offset filter information decoder 61' includes, as shown in FIG. 22, an offset information decoding section 611 and a QAOU structure decoding section 612.

The offset information decoding section 611 refers to QAOU information included in the coded data #1 and decodes offset information OI included in the QAOU information. The values "sao_type_idx[sao_curr_depth][ys][xs][component]" and "sao_offset[sao_curr_depth][ys][xs][i]" obtained by decoding the offset information OI are supplied to the offset information storage section 621 in association with the arguments (sao_curr_depth, ys, xs) and the arguments (sao_curr_depth, ys, xs, i).

More specifically, the offset information decoding section 611 decodes code from the coded data #1 and transforms the decoded code to the value of "sao_type_idx", and supplies it to the offset information storage section 621 in association with the arguments. The offset information decoding section 611 changes the code decoding method and transform from the code into the value of "sao_type_idx" in accordance with the hierarchical depth of a subject QAOU to be processed. Conditions, such as the hierarchical depth of a QAOU, are referred to as "parameter conditions". Decoding of offset information in accordance with general parameter conditions will be discussed later with reference to FIGS. 41 and 42.

In the code decoding method, different maximum values may be used depending on whether the hierarchical depth of a QAOU is smaller than a threshold or is equal to or greater than the threshold. Alternatively, the maximum value may be used only when the hierarchical depth of a subject QAOU is equal to or greater than the threshold. In the code decoding method, different binarization techniques may be used depending on whether the hierarchical depth of a subject QAOU is smaller than a threshold or is equal to or greater than the threshold. Alternatively, different contexts may be used depending on whether the hierarchical depth of a subject QAOU is smaller than a threshold or is equal to or greater than the threshold.

For example, if the hierarchical depth of a subject QAOU is smaller than a threshold, code may be decoded by using variable-length coding (ue(v)), and if the hierarchical depth of a subject QAOU is equal to or greater than the threshold, code may be decoded by using truncated coding (te(v)) corresponding to the number of offset types. If the number of offset types is a power of two, code may be decoded by using fixed-length coding. If the number of offset types is four, it can be represented by two bits, and thus, code may be decoded by using fixed-length coding with two bits.

The offset information decoding section 611 transforms decoded code into the value of "sao_type_idx" by using transform tables 801 and 802 shown in FIG. 25. The transform table 801 shown in part (a) of FIG. 25 indicates two transform patterns. Among the two transform patterns, one pattern is used depending on the hierarchical depth of a subject QAOU. That is, when the hierarchical depth of a subject QAOU is smaller than a threshold, the offset information decoding section 611 utilizes a transform table 801A, and when the hierarchical depth of a subject QAOU is equal to or greater than the threshold, the offset information decoding section 611 utilizes a transform table 801B.

In the transform table 801A shown in part (a) of FIG. 25, an offset type "EO_0" ("sao_type_idx"=1) is associated with a code "1", "EO_1" ("sao_type_idx"=2) is associated with a code "2", and "EO_2" ("sao_type_idx"=3) is associated with a code "3". Offset types are associated with codes 4 through 6 in a similar manner.

In the transform table 801B shown in part (b) of FIG. 25, an offset type "EO_0" ("sao_type_idx"=1) is associated with a code "1", "BO_0" ("sao_type_idx"=5) is associated with a code "2", and "BO_1" ("sao_type_idx"=6) is associated with a code "3". In the transform table 801B, codes 4 through 6 are not used.

In this manner, in the transform table 801A, all the offset types used for the adaptive offsets (SAOs) are included. In contrast, in the transform table 801B, only some of the offset types used for the adaptive offsets (SAOs) are included, and thus, when the hierarchical depth of a subject QAOU is equal to or greater than the threshold, some offset types cannot be used.

The reason for this is as follows. Since the area of a QAOU becomes smaller in a deeper hierarchical level, the characteristics of pixel values within such a QAOU are almost uniform, and appropriate offsets can be determined without using many offset types. Accordingly, the number of offset types can be decreased, thereby reducing a required memory space. Additionally, the data length of coded data indicating the offset types can be decreased, thereby making it possible to improve the coding efficiency.

If the order of the associations between the codes and the offset types in the transform table 801B is the same as that in the transform table 801A, only the transform table 801A may be used.

A transform table 802 shown in part (b) of FIG. 25 indicates various examples of transform tables which are similar to the transform table 801B and which may be used instead of the transform table 801B. In all the transform tables, the mode of types is restricted, as in the transform table 801B. The blank indicates that the associated code is not used.

A transform table 802A is an example in which only edge offsets are used and band offsets are not included. The number of offsets of an edge offset type is generally 4, and the number of offsets of a band offset type is generally 16. In this manner, the number of offsets of an edge offset type is smaller than that of a band offset. Accordingly, by restricting the use of band offsets, the memory space used for storing offsets can be reduced. In particular, when the hierarchical depth becomes deeper, the number of offsets is increased, and thus, the memory space is also increased. When the hierarchical depth becomes deeper, it is less likely that a band offset will be selected. Accordingly, the hierarchical depth is used as a parameter condition, and when the hierarchical depth is deep, the transform table 802A including only edge offsets is used, and when the hierarchical depth is not deep, a transform table (for example, the transform table 801A) including edge offsets and band offsets is used. It is thus possible to reduce the memory space without decreasing the coding efficiency. Additionally, the cost calculations for unnecessary options can be omitted in the coding device, thereby reducing the amount of processing.

A transform table 802B is an example in which only band offsets are used and edge offsets are not included. A band offset requires a smaller amount of calculation than an edge offset. Additionally, a band offset does not utilize a pixel around a subject pixel, and thus, a line memory for storing a reference pixel is not necessary. Accordingly, the transform table 802B is used in accordance with the parameter condition, thereby achieving the above-described advantages. A transform table 802C is an example in which only one band offset "BO_0" ("sao_type_idx"=5) is used.

A transform table 802D is an example in which one edge offset and two band offsets are used, as in the transform table 801B. More specifically, the transform table 802D is an example in which offset types "EO_0" ("sao_type_idx"=1), "BO_0" ("sao_type_idx"=5), and "BO_1" ("sao_type_idx"=6) are used and shorter codes (smaller code numbers) are preferentially assigned to the band offset types. When the hierarchical depth is not deep, it is more likely that a band offset will be selected than when the hierarchical depth is deep. Accordingly, the hierarchical depth is used as a parameter condition, and when the hierarchical depth is not deep, the transform table 802D is used, and a shorter code is assigned to the type which is more frequently used, thereby making it possible to improve the coding efficiency.

A table other than those indicated by the examples shown in FIG. 25 may be used, and the association between the codes and the offset types may be changed in accordance with the parameter condition. An offset type which is different from any of the edge offsets and band offsets shown in the transform table 801A may be used singly or together with another offset type in accordance with a condition, such as the hierarchical depth. Specific examples of such an offset type are an offset type having characteristics both of EO and BO, an edge offset which detects an edge at a horizontal sample position different from that of a known edge offset "EO_0", or a band offset to which a band is allocated in a manner different from known band offsets "BO_0" and "BO_1". These specific examples will be discussed in another embodiment later.

The QAOU structure decoding section 612 decodes "sao_split_flag[sao_curr_depth][ys][xs]" included in the QAOU information so as to determine the QAOU split structure, and then supplies QAOU structure information indicating the determined QAOU split structure to the offset information storage section 621.

An offset attribute setting section 613 which is discussed below may be included. The offset attribute setting section 613 determines the shift value of an offset. An offset in coded data is coded with the offset bit depth (also referred to as "SAO_DEPTH") having a lower precision than the pixel bit depth (also referred to as "PIC_DEPTH"). That is, an offset in the coded data is quantized. The shift value is a bit shift amount which is necessary for performing inverse quantization. The offset attribute setting section 613 also determines the offset bit depth and the offset value range. In this case, the offset bit depth is determined from the pixel bit depth (also referred to as "PIC_DEPTH") (not shown) input into the offset attribute setting section 613. The pixel bit depth represents the range of pixel values of pixels forming an image input into the adaptive offset filter 60' as the bit width. When the pixel bit depth is N bits, the pixel values take a range of 0 to $2^N-1$.

The SAO bit depth and the shift value are determined by using the following equations. However, other values may be used in accordance with parameter conditions, which will be discussed later.

$$SAO\_DEPTH=MIN(PIC\_DEPTH,10)$$

$$\text{shift value}=PIC\_DEPTH-MIN(PIC\_DEPTH,10)$$

In one configuration, the offset value range (in this case, the maximum value) is determined by the following equation:

$$\text{Offset value range}=2^{SAO\_DEPTH-K}-1 \text{ where } K \text{ is a predetermined constant (discussed later).}$$

The adaptive offset filter processor 62' includes, as shown in FIG. 22, the offset information storage section 621, a QAOU controller 622, an offset-type determining section 623, a classifying section 624, an offset determining section 625, and an offset adder 626.

The offset information storage section 621 manages and stores the offset type specified for each QAOU and specific values of offsets with respect to individual classes that can be selected for the specified offset type, on the basis of the QAOU structure information, "sao_type_idx[sao_curr_depth][ys][xs]", and "sao_offset[sao_curr_depth][ys][xs][i]". The offset information storage section 621 has a map memory and a list memory.

Figure 24:
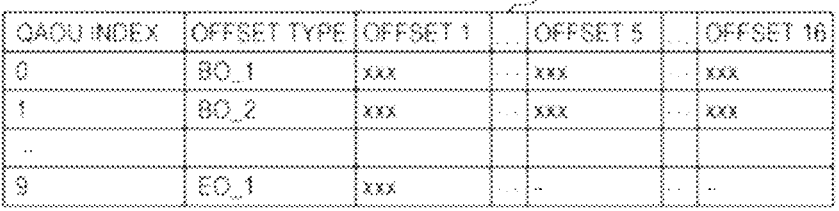
FIG. 24 illustrates the third embodiment: part (a) shows QAOMUs having a split depth of three and forming a subject unit of processing and also shows QAOU indexes assigned to QAOMUs; and part (b) shows an offset type associated with each of the QAOU indexes 0 to 9 and offsets with respect to individual classes that can be selected for each offset type.

The map memory and the list memory will be discussed below with reference to FIG. 24. FIG. 24 illustrates examples of information stored in the map memory and the list memory. Part (a) of FIG. 24 illustrates examples of QAOU indexes stored in the map memory, and part (b) of FIG. 24 illustrates examples of information stored in the list memory.

In a map memory 601, a QAOU index assigned to each offset minimum unit (also referred to as "QAOMU: Quad Adaptive Offset Minimum Unit"), which is determined by the split depth, is stored. The QAOU index will be discussed later. Part (a) of FIG. 24 shows QAOMUs having a split depth of three and forming the unit of processing (for example, an LCU) and QAOU indexes assigned to QAOMUs. In part (a) of FIG. 24, indexes 0 to 9 are assigned to QAOUs in a simple manner without considering the QAOU split depth. In the example shown in part (a) of FIG. 24, a QAOU specified by QAOU index=I is indicated by QAOUI. In part (a) of FIG. 24, the thin lines indicate QAOMU boundaries, while the thick lines indicate QAOU boundaries.

As shown in part (a) of FIG. 24, QAOU0 is constituted by four QAOMUs, and 0 is assigned to these four QAOMUs as the QAOU index. QAOU3 is constituted by one QAOMU, and 3 is assigned to this QAOMU as the QAOU index. In this manner, in the map memory, QAOU indexes assigned to the individual QAOMUs are stored.

In a list memory 602, the offset type associated with each QAOU index and specific values of offsets with respect to classes that can be selected for this offset type are stored in association with the QAOU index.

This will be more specifically discussed below with reference to part (b) of FIG. 24. Part (b) of FIG. 24 shows an offset type associated with each of the QAOU indexes 0 to 9 and offsets with respect to individual classes that can be selected for each offset type. In part (b) of FIG. 24, "xxx" indicates specific numeric values that can be different from each other.

In part (b) of FIG. 24, "BO_1" indicates an offset type specified by "sao_type_idx"=5. "EO_1" indicates an offset type specified by "sao_type_idx"=1. In this manner, edge offsets, which are of an offset type specified by "sao_type_idx"=1, 2, 3, 4, are also indicated by EO_1, 2, 3, 4, respectively, and band offsets, which are of an offset type specified by "sao_type_idx"=5, 6, are also indicated by BO_1, 2, respectively.

As shown in part (b) of FIG. 24, when the offset type is a band offset, a total of sixteen offsets, that is, the offset 1 through the offset 16, are stored in the list memory for this offset type. The offset 1 through the offset 16 are values specified by "sao_offset[sao_curr_depth][ys][xs][1]" through "sao_offset[sao_curr_depth][ys][xs][16]", respectively, when the value of "sao_type_idx[sao_curr_depth][ys][xs]" is "5" or "6".

On the other hand, when the offset type is an edge offset, a total of four offsets, that is, the offset 1 through the offset 4, are stored in the list memory for this offset type. The offset 1 through the offset 4 are values specified by "sao_offset[sao_curr_depth][ys][xs][1]" through "sao_offset[sao_curr_depth][ys][xs][4]", respectively, when the value of "sao_type_idx[sao_curr_depth][ys][xs]" is one of "1, 2, 3, and 4". In the case of an edge offset, no value is stored in the offset 5 through the offset 16.

A QAOMU number is appended to each QAOMU, and the QAOMUs can be distinguished from each other by the QAOMU numbers. Hereinafter, QAOMU having a QAOMU number NQ will also be referred to as "QAOMU$_{NQ}$".

In this embodiment, the offset precision may be varied in accordance with the hierarchical depth of a subject QAOU. The shift value used for inverse quantization also differs depending on the offset precision. In this case, too, the offset precision and the shift value are determined by using the pixel bit depth PIC_DEPTH.

As an example of the offset precision, the offset precision may be varied, for example, as follows. When the hierarchical depth of a QAOU is smaller than a threshold, the offset precision and shift value are set:

SAO_DEPTH=MIN(PIC_DEPTH,10)

shift value=PIC_DEPTH−MIN(PIC_DEPTH, 10); and when the hierarchical depth of a QAOU is equal to or greater than the threshold, the offset precision and shift value are set:

SAO_DEPTH=MIN(PIC_DEPTH,8)

shift value=PIC_DEPTH−MIN(PIC_DEPTH,8).

As stated above, the offset precision (offset bit depth, SAO_DEPTH) and the pixel bit depth (PIC_DEPTH), which expresses the range of pixel values of pixels forming an input image as the bit width, are closely related to each other in terms of quantization errors. The bit depth of an image output from the adaptive offset filter 60 is represented by the pixel bit depth PIC_DEPTH, and SAO_DEPTH represents the bit depth of an offset to be added to a pixel. Accordingly, even if an offset having a higher precision than that of the pixel bit depth is used, it is discarded in the output process. It is thus meaningless to set SAO_DEPTH which exceeds PIC_DEPTH. On the other hand, if SAO_DEPTH is lower than PIC_DEPTH, an input image is corrected merely with a precision lower than the precision (PIC_DEPTH) with which the input image could be corrected by using a filter, thereby decreasing the filtering effect.

Accordingly, in this embodiment, by restricting a quantized offset to an offset value range that can be represented by a certain bit width, it is possible to reduce the bit width for storing a quantized offset in the offset information storage section 621. With this arrangement, the effect of reducing the memory size can be obtained, compared with the above-described restriction is not imposed. However, if the offset value range is excessively restricted, the effect of correcting distortion of a decoded image by using an offset is decreased. Accordingly, it is not possible to remove distortion of a decoded image even by offset addition processing, which may decrease the coding efficiency.

Thus, by setting the offset value range in an optimal range in such a degree as not to decrease the coding efficiency, the filtering effect can be maintained while a memory space to be used is reduced.

The maximum bit length representing the offset value range is indicated by CLIP_BIT, and by calculating CLIP_BIT=SAO_DEPTH−K, the offset value range is determined to be $-2^{CLIP\_BIT-1}$ to $2^{CLIP\_BIT-1}-1$. Then, it has been found through the inventors' experiments that in the case of K=4, the coding efficiency was not decreased even if the offset range was restricted by the offset value range.

When the pixel bit depth is eight, the offset bit depth SAO_DEPTH is also eight, and thus, CLIP_BIT=8−K=4. If one offset can be stored by using four bits, in software, for example, which handles one byte constituted by eight bits as the unit, one offset can be packed and stored in one byte, thereby easily reducing the memory size.

If the offset precision to be set differs depending on the hierarchical depth of a subject QAOU, the offset information storage section 621 secures an offset storage area by changing the unit size of the offset storage area in accordance with the hierarchical depth of the subject QAOU.

More specifically, it is now assumed that when the hierarchical depth of a subject QAOU is smaller than a threshold, the offset precision is set to be $n_A$ bits (for example, $n_A$=8 or 6), and that when the hierarchical depth of the subject QAOU is equal to or greater than the threshold, the offset precision is set to be $n_B$ bits ($n_A > n_B$, for example, $n_B = n_A - 2$). In this case, the offset information storage section 621 secures an area for storing offsets when the hierarchical depth of the subject QAOU is smaller than the threshold by using the $n_A$ bits as the unit, and secures an area for storing offsets when the hierarchical depth of the subject QAOU is equal to or greater than the threshold by using the $n_B$ bits as the unit.

If the hierarchical depth of the subject QAOU is equal to or greater than the threshold, when reading and writing an offset from and into the offset information storage section 621, it is preferable that an offset is written by rounding it down by $(n_A - n_B)$ bits and that an offset is read by rounding it up by $(n_A - n_B)$ bits. With this input/output configuration, it is not necessary for other modules to perform processing by considering the difference in the offset precision.

If the required number of classes differs depending on the hierarchical depth of a subject QAOU, the offset information storage section 621 changes an area of a list memory to be secured in accordance with the required number of classes. For example, a band offset which is split into sixteen classes if the hierarchical depth of a subject QAOU is smaller than a threshold and which is split into eight classes if the hierarchical depth of the subject QAOU is equal to or greater than the threshold, will be considered (such a band offset will be discussed later). In this case, the memory space necessary for securing classes when the hierarchical depth of the subject QAOU is equal to or greater than the threshold is half the memory space when the hierarchical depth of the subject QAOU is smaller than the threshold. Accordingly, when the hierarchical depth of the subject QAOU is equal to or greater than the threshold, the offset information storage section 621 changes the size of the list memory to be secured to be half the memory size to be set when the hierarchical depth of the subject QAOU is smaller than the threshold.

The QAOU controller 622 controls the individual components included in the adaptive offset filter processor 62'. The QAOU controller 622 also refers to the QAOU structure information, and then splits the deblocked decoded image P_DB into one or a plurality of QAOUs and scans the individual QAOUs in a predetermined order. The QAOU controller 622 also supplies a QAOMU number representing a subject QAOMU to the offset-type determining section 623.

The offset-type determining section 623 refers to the map memory and the list memory of the offset information storage section 621 and determines the offset type specified by the QAOMU number supplied from the QAOU controller 622. The offset-type determining section 623 also supplies the determined offset type to the classifying section 624.

The classifying section 624 classifies each pixel included in the subject QAOU as one of the classes that can be selected for the offset type supplied from the offset-type determining section 623. The classifying section 624 also supplies the offset type and the class index indicating the class of each pixel to the offset determining section 625.

Specific classifying processing performed by the classifying section 624 will be discussed later, and thus, an explanation thereof is omitted here.

The offset determining section 625 refers to the list memory of the offset information storage section 621, and determines, for each pixel included in the subject QAOU, an offset specified by the offset type and the class index supplied from the classifying section 624. The offset determining section 625 includes an offset reverse shifter (not shown) which performs bitwise left shift on an offset by an amount equal to the shift value set by the offset attribute setting section 613. The offset reverse shifter performs inverse quantization on the offset so that the offset bit depth may match the pixel bit depth. By performing such inverse quantization, in addition processing performed by the offset adder 626, which will be discussed later, the offset can be added to the pixel value by using the same bit depth. The inverse-quantized offset for each pixel is supplied to the offset adder 626.

The offset adder 626 adds an offset supplied from the offset determining section 625 to each pixel which forms the subject QAOU of the deblocked decoded image P_DB. The offset adder 626 outputs an image obtained by performing processing on all the QAOUs included in the deblocked decoded image P_DB as an offset-filtered decoded image P_OF.

A description will now be given of classifying processing performed by the classifying section 624 with reference to FIGS. 26 through 29. Classifying processing performed by using a condition, such as the hierarchical depth of a QAOU, as a parameter condition, will be discussed below. The configuration of a classifying section based on general parameter conditions will be discussed later with reference to FIG. 34.

Figure 26:
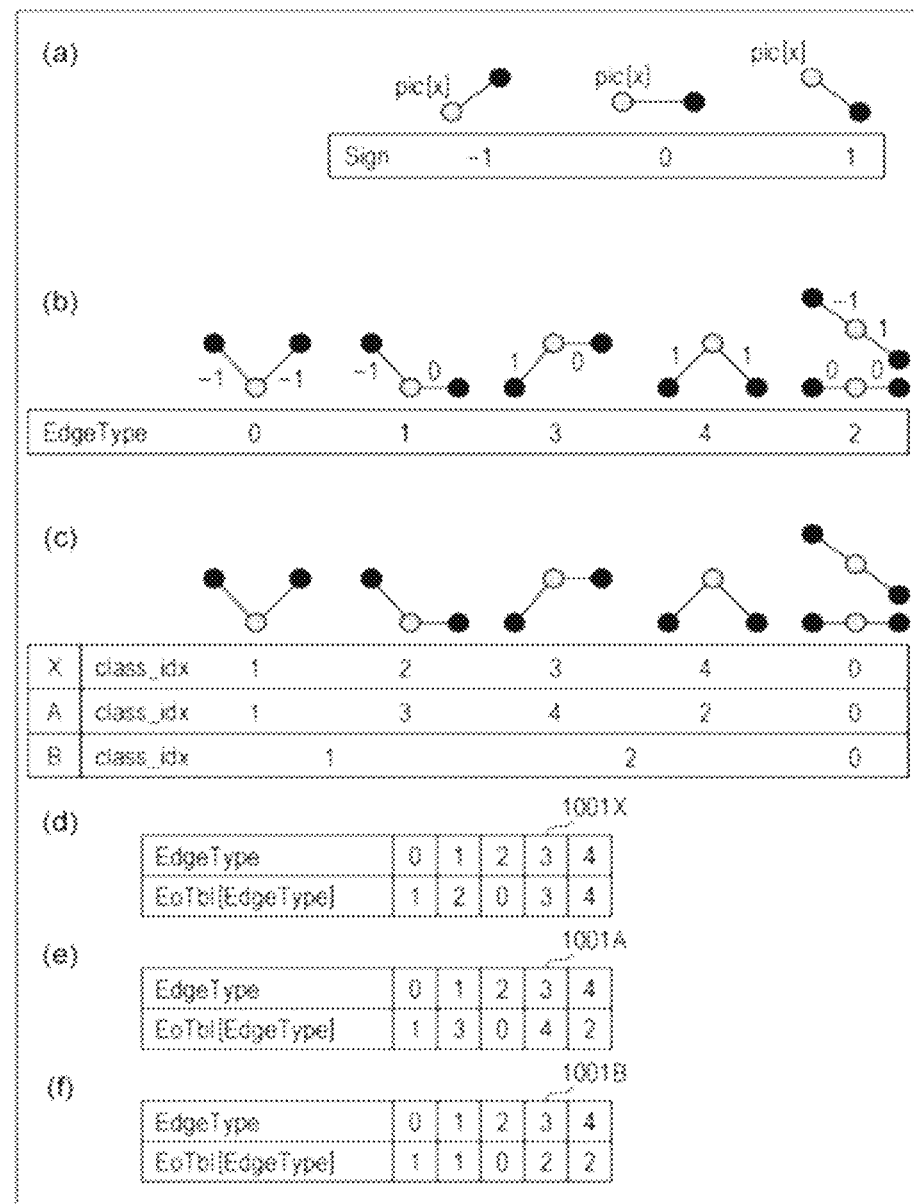
FIG. 26 illustrates offset processing performed by the adaptive offset filter according to the third embodiment: part (a) shows graphs indicating the magnitude relations between the pixel value pic[x] of a subject pixel x and the pixel value of a pixel a or b and also shows the values of a function Sign in accordance with the magnitude relation; part (b) shows graphs indicating the magnitude relations between the pixel value of the subject pixel x and each of the pixel values of the pixel a and the pixel b and also shows the value of EdgeType in accordance with the magnitude relation; part (c) shows the association between each graph shown in part (b) and class_idx; and parts (d) through (f) illustrate transform tables used for transforming from EdgeType to class_idx.

FIG. 26 illustrates offset processing performed by the adaptive offset filter 60. Part (a) of FIG. 26 shows graphs indicating the magnitude relations between the pixel value pic[x] of a subject pixel x and the pixel value of a pixel a or b and also shows the values of a function Sign in accordance with the magnitude relation. Part (b) of FIG. 26 shows graphs indicating the magnitude relations between the pixel value of the subject pixel x and each of the pixel values of the pixel a and the pixel b and also shows the value of EdgeType in accordance with the magnitude relation. Part (c) of FIG. 26 shows the association between each graph shown in part (b) of FIG. 26 and class_idx. Parts (d) through (f) of FIG. 26 illustrate transform tables used for transforming from EdgeType to class_idx.

Figure 27:
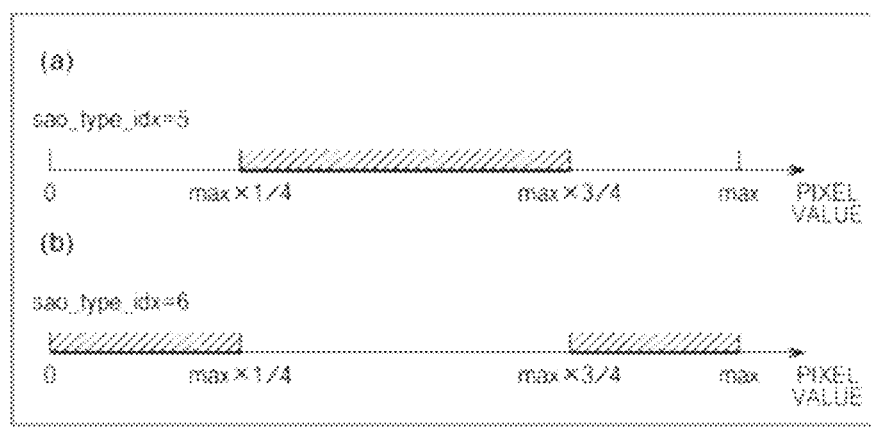
FIG. 27 illustrates offset processing performed by the adaptive offset filter according to the third embodiment: part (a) schematically shows classifying performed when "sao_type_idx=5"; and part (b) schematically shows classifying performed when "sao_type_idx=6".

FIG. 27 illustrates offset processing performed by the adaptive offset filter 60: part (a) schematically shows classifying performed when "sao_type_idx=" 5; and part (b) schematically shows classifying performed when "sao_type_idx6".

Figure 28:
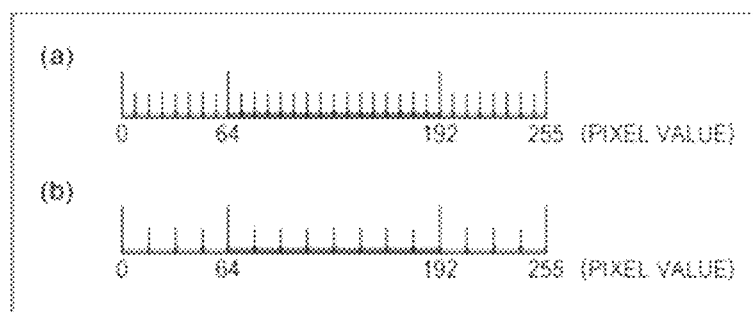
FIG. 28 illustrates offset processing performed by the adaptive offset filter according to the third embodiment: part (a) schematically shows classifying performed when the hierarchical depth of a subject QAOU is smaller than a threshold; and part (b) schematically shows classifying performed when the hierarchical depth of a subject QAOU is equal to or greater than the threshold.

FIG. 28 illustrates offset processing performed by the adaptive offset filter 60: part (a) schematically shows classifying performed when the hierarchical depth of a subject QAOU is smaller than a threshold; and part (b) schematically shows classifying performed when the hierarchical depth of the subject QAOU is equal to or greater than the threshold.

Figure 29:
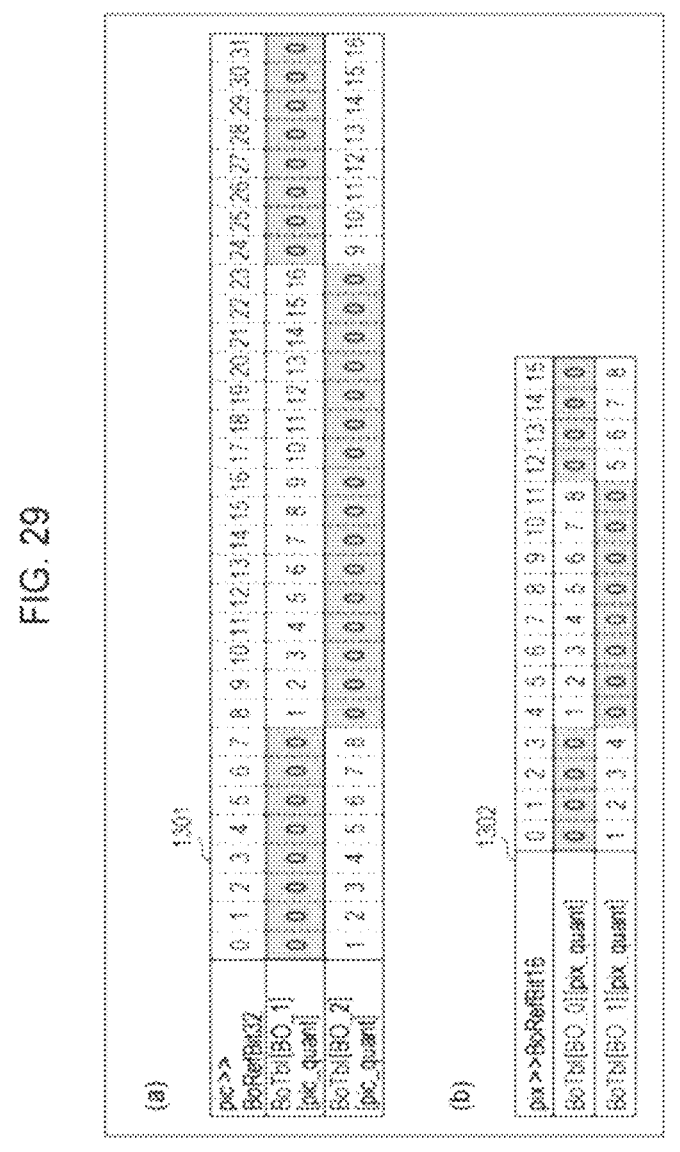

FIG. 29 illustrate an example of classifying processing when a band offset is specified: part (a) shows an example of classifying processing when the hierarchical depth of a subject QAOU is smaller than a threshold; and part (b) shows an example of classifying processing when the hierarchical depth of the subject QAOU is equal to or greater than the threshold.

(When Offset Type is One of 1 to 4 (Edge Offset))

When the offset type supplied from the offset-type determining section 623 is one of 1 to 4, the classifying section 624 performs the same processing as that discussed with reference to FIG. 10.

Accordingly, as shown in part (a) of FIG. 26, concerning the magnitude relation between the pixel value pic[x] and the pixel value of the pixel a or b, when the pixel value pic[x] is smaller than the pixel value of the pixel a or b, Sign(pic[x]−pix[a])=−1, when the pixel value pic[x] is the same as the pixel value of the pixel a or b, Sign(pic[x]−pix[a])=0, and when the pixel value pic[x] is greater than the pixel value of the pixel a or b, Sign(pic[x]−pix[a])=1. In the graphs shown in part (a) of FIG. 26, the black circle with pic[x] indicates the pixel value of the subject pixel x, and the black circle without pic[x] indicates the pixel value of the subject pixel a or b. The vertical direction in the graphs shown in part (a) of FIG. 26 indicates the magnitude of the pixel value.

Then, the classifying section 624 finds EdgeType according to the following mathematical equation (1-1) on the basis of Sign(pic[x]−pix[a]) and Sign(pic[x]−pix[b]).

$$\text{EdgeType}=\text{Sign}(\text{pic}[x]-\text{pix}[a])+\text{Sign}(\text{pic}[x]-\text{pix}[b])+2 \qquad (1\text{-}1)$$

According to this equation, as shown in part (b) of FIG. 26, when the pixel values of both of the pixels a and b are greater than the pixel value pic[x], EdgeType=0. When the pixel value of one of the pixels a and b is greater than the pixel value pic[x] and when the pixel value of the other pixel a or b is the same as the pixel value pic[x], EdgeType=1. When the pixel value of one of the pixels a and b is smaller than the pixel value pic[x] and when the pixel value of the other pixel a or b is the same as the pixel value pic[x], EdgeType=3. When the pixel values of both of the pixels a and b are smaller than the pixel value pic[x], EdgeType=4. When the pixel value of one of the pixels a and b is smaller than the pixel value pic[x] and when the pixel value of the other pixel a or b is greater than the pixel value pic[x], or when the pixel values of both of the pixels a and b are the same as the pixel value pic[x], EdgeType=2.

In part (b) of FIG. 26, the center black circle in each graph indicates the pixel value of the subject pixel x, and the black circles on both sides indicate the pixel values of the pixel a and the pixel b. The vertical direction in the graphs shown in part (b) of FIG. 26 indicates the magnitude of the pixel value.

Then, on the basis of the determined EdgeType, the classifying section 624 determines the class index (class_idx) of the class to which the subject pixel x belongs in the following manner.

$$\text{class\_idx}=EoTbl[\text{EdgeType}]$$

where EoTbl[EdgeType] is a transform table used for determining class_idx from EdgeType. Specific examples of the transform table EoTbl are shown in parts (d) through (f) of FIG. 26.

A transform table 1001X shown in part (d) of FIG. 26 is a transform table which is not switched in accordance with the hierarchical depth of a subject QAOU.

A transform table 1001A shown in part (e) of FIG. 26 and a transform table 1001B shown in part (f) of FIG. 26 are transform tables which are switched in accordance with the hierarchical depth of a subject QAOU. If the hierarchical depth of a subject QAOU is smaller than a threshold, the transform table 1001A is used, and if the hierarchical depth of the subject QAOU is equal to or greater than the threshold, the transform table 1001B is used.

When the same transform table is used regardless of the hierarchical depth of a subject QAOU, as indicated by the transform table 1001X, if there is no edge in an area constituted by the subject pixel x, the pixel a, and the pixel b (hereinafter, such a case will also be referred to as a case in which an area is flat), that is, when EdgeType=2, the classifying section 624 classifies the subject pixel x as class 0 ("class_idx"=0). The classifying section 624 also classifies EdgeType=0, 1, 3, 4 as class_idx=1, 2, 3, 4, respectively.

When the transform table is not switched in accordance with the hierarchical depth of a subject QAOU and when the hierarchical depth of a subject QAOU is smaller than a threshold, as indicated by the transform table 1001A, if there is no edge in an area constituted by the subject pixel x, the pixel a, and the pixel b (hereinafter, such a case will also be referred to as a case in which an area is flat), that is, when EdgeType=2, the classifying section 624 classifies the subject pixel x as class 0 ("class_idx"=0). The classifying section 624 also classifies EdgeType=0, 1, 3, 4 as class_idx=1, 3, 4, 2, respectively. When the hierarchical depth of the subject QAOU is equal to or greater than the threshold, as indicated by the transform table 1001B, if there is no edge in an area constituted by the subject pixel x, the pixel a, and the pixel b (hereinafter, such a case will also be referred to as a case in which an area is flat), that is, when EdgeType=2, the classifying section 624 classifies the subject pixel x as class 0 ("class_idx"=0). The classifying section 624 also classifies EdgeType=0, 1 as class_idx=1 and EdgeType=3, 4 as class_idx=2. Accordingly, in the transform table 1001B, one class index (class_id) is associated with a plurality of edge types (EdgeType).

It appears that the transform table 1001A may be formed in the same manner as the transform table 1001X. However, in a case in which two transform tables are switched in accordance with the hierarchical depth, if, as the transform table 1001A, the same table as that defined as the transform table 1001X is used, different edge types (EdgeType) are applied to the same class index (class_idx) in relation to the transform table 1001B, and processing is different depending on the hierarchical depth. For example, in the case of class_idx=2, when the hierarchical depth is smaller than the threshold (when the transform table 1001X is used), the edge type is 1 (EdgeType=1), and when the hierarchical depth is equal to or greater than the threshold (when the transform table 1001B is used), the edge type is 4 (EdgeType=4). Thus, processing is different depending on the hierarchical depth.

Accordingly, by setting the transform table 1001A to be the transform table 1001B shown in part (e) of FIG. 26, the same processing is performed regardless of the hierarchical depth.

(When Offset Type is 5 or 6 (Band Offset))

When the offset type supplied from the offset-type determining section 623 is 5 or 6, the classifying section 624 classifies the pixel value of the subject pixel x as one of a plurality of classes in accordance with the pixel value pic[x] of the subject pixel x.

When offset type is 5 (sao_type_idx=5)

When the pixel value pic[x] of the subject pixel x satisfies: (max×¼)≤pic[x]≤(max×¾), the classifying section 624 classifies the subject pixel as a class other than 0. That is, when the pixel value of the subject pixel is contained within a range indicated by the hatched portion in part (a) of FIG. 11, the classifying section 624 classifies the subject pixel as a class other than 0. In the above-described condition, max indicates the maximum value that can be taken by the subject pixel x, and for example, max=255. When max=255, the above-described condition may be represented by 8≤(pic[x]/8)≤23, or 4≤(pic[x]/16)≤11.

When offset type is 6 (sao_type_idx=6)

When the pixel value pic[x] of the subject pixel x satisfies: pic[x]≤(max×¼) or (max×¾)≤pic[x], the classifying section 624 classifies the subject pixel as a class other than 0. That is, when the pixel value of the subject pixel is contained within a range indicated by the hatched portion in part (b) of FIG. 11, the classifying section 624 classifies the subject pixel as a class other than 0. In the above-described condition, max indicates the maximum value that can be taken by the subject pixel x, and for example, max=255. When max=255, the above-described condition may be represented by (pic[x]/8)≤7 or 24≤(pic[x]/8), or (pic[x]/16)≤3 or 12≤(pic[x]/16).

The classifying processing performed by the classifying section 624 will be more specifically described below.

When the offset type is 5 or 6, the classifying section 624 determines the class index (class_idx) of the class to which the subject pixel x belongs in accordance with the hierarchical depth of a subject QAOU in the following manner.

In a case in which the hierarchical depth of the subject QAOU is smaller than a threshold, class_*idx*=*EoTbl*[*sao*_type_*idx*][pic[*x*]/>>BoRefBit32]; and In a case in which the hierarchical depth of the subject QAOU is equal to or greater than the threshold class_*idx*=*EoTbl*[*sao*_type_*idx*][pic[*x*]/>>BoRefBit16]

where BoTbl[sao_type_idx][pic[x]/>>BoRefBit32] and BoTbl[sao_type_idx][pic[x]/>>BoRefBit16] are transform tables used for determining class_idx from the pixel value pic[x] of the subject pixel x and sao_type_idx. When the image bit depth is indicated by PIC_DEPTH, BoRefBit32 and BoRefBit16 are values determined by PIC_DEPTH−5 and PIC_DEPTH−4, respectively, and are values obtained by quantizing a pixel value in 32 or 16 steps. The quantized pixel value is also indicated by pixquant. Performing bitwise right shift by BoRefBit32 and BoRefBit16 corresponds to performing division by 1<<BoRefBit32 and 1<<BoRefBit16, respectively. The quantization widths of 1<<BoRefBit32 and 1<<BoRefBit16 are 1<<(8−5)=8 and 1<<(8−4)=16, respectively, when the bit depth of the pixel values is eight bits. Classifying processing when the quantization width is eight will be discussed below. The quantization width is referred to as a "class width".

The classifying section 624 performs classifying by changing the class width in accordance with the hierarchical depth of a subject QAOU. For example, as shown in part (a) of FIG. 28, when the hierarchical depth of a subject QAOU is smaller than a threshold, the classifying section 624 divides the pixel values into 32 levels by setting the class width to be "8" and then performs classifying. As shown in part (b) of FIG. 28, when the hierarchical depth of a subject QAOU is equal to or greater than the threshold, the classifying section 624 divides the pixel values into 16 levels by setting the class width to be "16" and then performs classifying.

Specific examples of the transform table EoTbl are shown in FIG. 29. In parts (a) and (b) of FIG. 29, "BO_1" indicates that "sao_type_index"=5, and "BO_2" indicates that "sao_type_index"=6. A transform table 1301 shown in part (a) of FIG. 29 is a transform table when the hierarchical depth of a subject QAOU is smaller than a threshold, and a transform table 1302 shown in part (b) of FIG. 29 is a transform table when the hierarchical depth of a subject QAOU is equal to or greater than the threshold.

When the hierarchical depth of a subject QAOU is smaller than the threshold and when "sao_type_index"=5, as shown in part (a) of FIG. 29, the classifying section 624 classifies the subject pixel x as one of class indexes 1 to 16 in accordance with the magnitude of pic[x] if the pixel value pic[x] of the subject pixel x satisfies the condition 8≤(pic[x]/8)≤23.

When "sao_type_idx"=6, the classifying section 624 classifies the subject pixel x as one of class indexes 1 to 16 in accordance with the magnitude of pic[x] if the pixel value pic[x] of the subject pixel x satisfies the condition (pic[x]/8)≤7 or 24≤(pic[x]/8).

When the hierarchical depth of a subject QAOU is equal to or greater than the threshold and when "sao_type_index"=5, as shown in part (b) of FIG. 29, the classifying section 624 classifies the subject pixel x as one of class indexes 1 to 8 in accordance with the magnitude of pic[x] if the pixel value pic[x] of the subject pixel x satisfies the condition 4≤(pic[x]/16)≤11.

When "sao_type_idx"=6, the classifying section 624 classifies the subject pixel x as one of class indexes 1 to 8 in accordance with the magnitude of pic[x] if the pixel value pic[x] of the subject pixel x satisfies the condition (pic[x]/16)≤3 or 12≤(pic[x]/16).

(Configuration of Offset Information Decoding Section 611)

Figure 41:
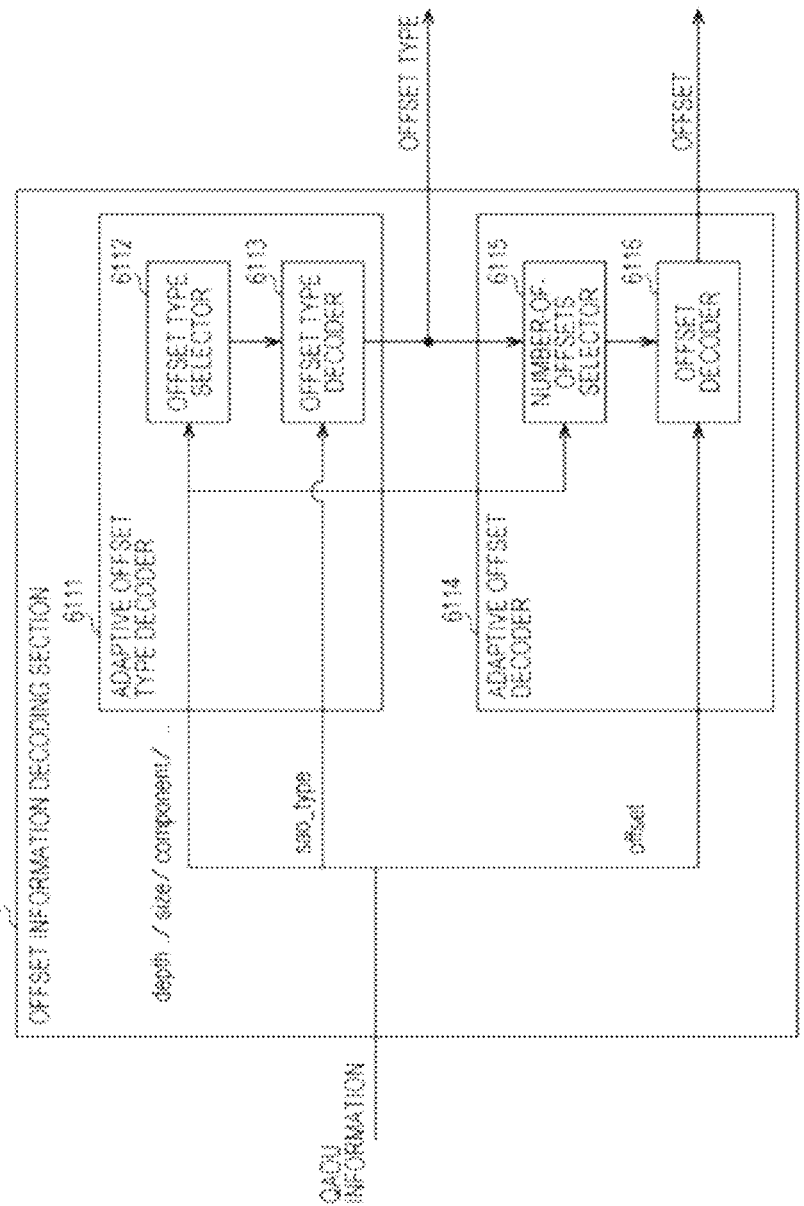
FIG. 41 is a block diagram illustrating the configuration of an offset information decoding section according to the fifth embodiment.

FIG. 41 is a block diagram of the offset information decoding section 611 which changes the offset type to be used in accordance with a parameter type (parameter condition) of an adaptive offset and/or which changes the number of classes in accordance with a parameter condition of an adaptive offset. The offset information decoding section 611 includes an adaptive offset type decoder 6111, an offset type selector 6112, an offset type decoder 6113, an adaptive offset decoder 6114, a number-of-offsets selector 6115, and an offset decoder 6116. The parameter conditions are parameters other than values calculated from pixel values. Examples of the parameter conditions are a block size (QAOU size), a color component (component), and QP, which will be discussed in appendixes later, in addition to the hierarchical depth and the offset type described above.

The adaptive offset type decoder 6111 is means for adaptively decoding offset types from QAOU information included in coded data in accordance with a parameter condition, and includes the offset type selector 6112 and the offset type decoder 6113.

The offset type selector 6112 is means for selecting the offset types to be used in accordance with the parameter condition. One of the parameter conditions is the above-described hierarchical depth. The number of offset types to be used when the hierarchical depth is not deep is smaller than that when the hierarchical depth is deep. The offset type selector 6112 inputs a transform table, such as that discussed with reference to FIG. 25, to the offset type decoder 6113. The offset type selector 6112 also inputs the maximum number of usable offset types to the offset type decoder 6113.

The offset type decoder 6113 decodes offset types from the input transform table and the maximum number. If the maximum number of offset types is N, the range of codes that can be taken is restricted to N from 0 to N−1, thereby reducing the number of bits required for coding codes. For example, when the maximum value is greater than $2^{m-1}$ but not greater than $2^m$, m-bit fixed-length coding can be used. Truncated unary coding or Truncated Rice coding having N−1 as the maximum value may be used.

The adaptive offset decoder 6114 is means for adaptively decoding offsets from QAOU information included in the coded data in accordance with a parameter condition, and includes the number-of-offsets selector 6115 and the offset decoder 6116. The number-of-offsets selector 6115 is means for selecting the maximum number of offsets to be used and the offset precision in accordance with a parameter condition. One of the parameter conditions is the hierarchical depth. The number of offsets when the hierarchical depth is not deep is greater than that when the hierarchical depth is deep. For example, when the hierarchical depth is not deep, sixteen offsets can be used, as shown in part (a) of FIG. 29, and when the hierarchical depth is deep, eight offsets can be used, as shown in part (b) of FIG. 29. Additionally, as stated above, the offset precision (bit depth) can be changed in accordance with the hierarchical depth. The number-of-offsets selector 6115 inputs the maximum number of offsets and the offset precision to the offset decoder 6116. The offset decoder 6116 decodes offsets in accordance with the maximum number of offsets and the offset precision. If the number of offsets is decreased, the amount of data to code offsets is reduced. Additionally, as in the offset type, if the precision of each offset is determined, the range of a code for coding each offset that can be taken is also restricted, thereby reducing the number of bits required for coding a code.

Figure 42:
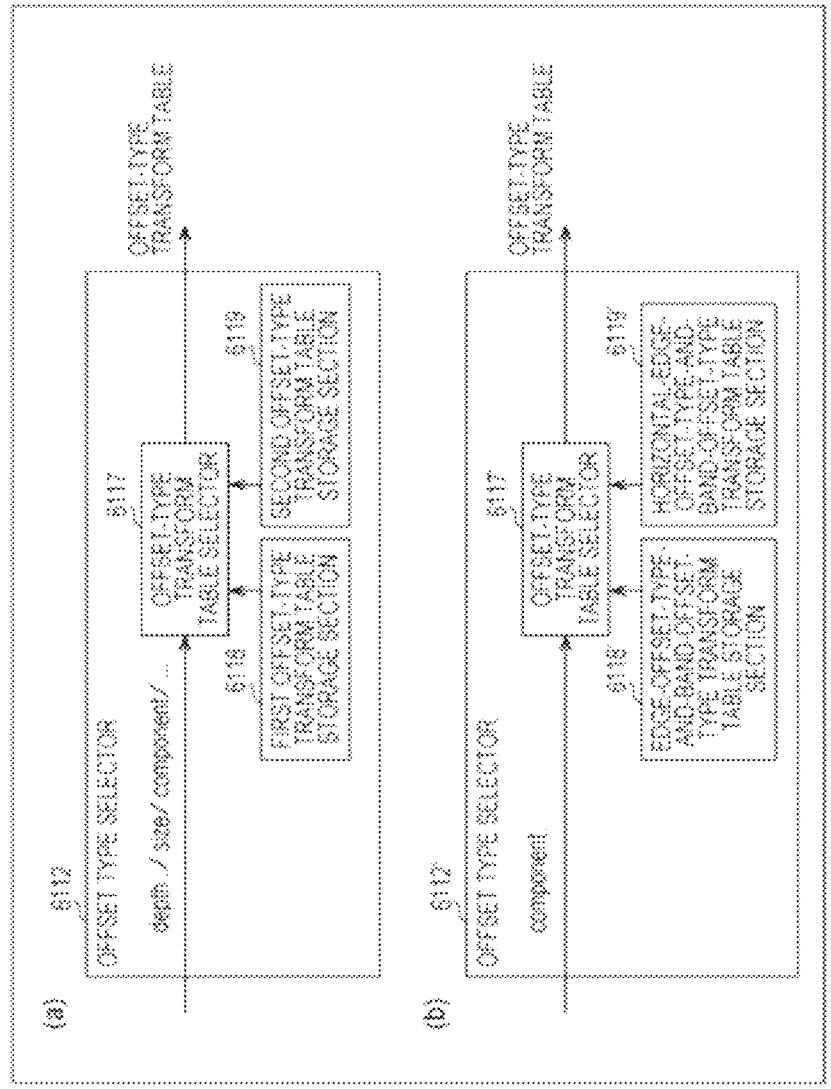
FIG. 42 Part (a) of FIG. 42 is a block diagram illustrating the configuration of an offset type selector according to the fifth embodiment; and part (b) is a block diagram illustrating the configuration of another offset type selector.

Part (a) of FIG. 42 is a block diagram of a configuration of the offset type selector 6112.

The offset type selector 6112 includes an offset-type transform table selector 6117, a first offset-type transform table storage section 6118, and a second offset-type transform table storage section 6119.

The offset-type transform table selector 6117 selects a transform table stored in the first offset-type transform table storage section 6118 or a transform table stored in the second offset-type transform table storage section 6119 in accordance with a parameter condition. In the above-described example, the transform table 801A is the transform table stored in the first offset-type transform table storage section 6118, and the transform table 801B is the transform table stored in the second offset-type transform table storage section 6119.

Part (b) of FIG. 42 is a block diagram of another configuration of the offset type selector.

An offset type selector 6112' includes an offset type transform table selector 6117', an edge-offset-type-and-band-offset-type transform table storage section 6118', and a horizontal-edge-offset-type-and-band-offset-type transform table storage section 6119'.

(Configuration of Classifying Section 624)

Figure 43:
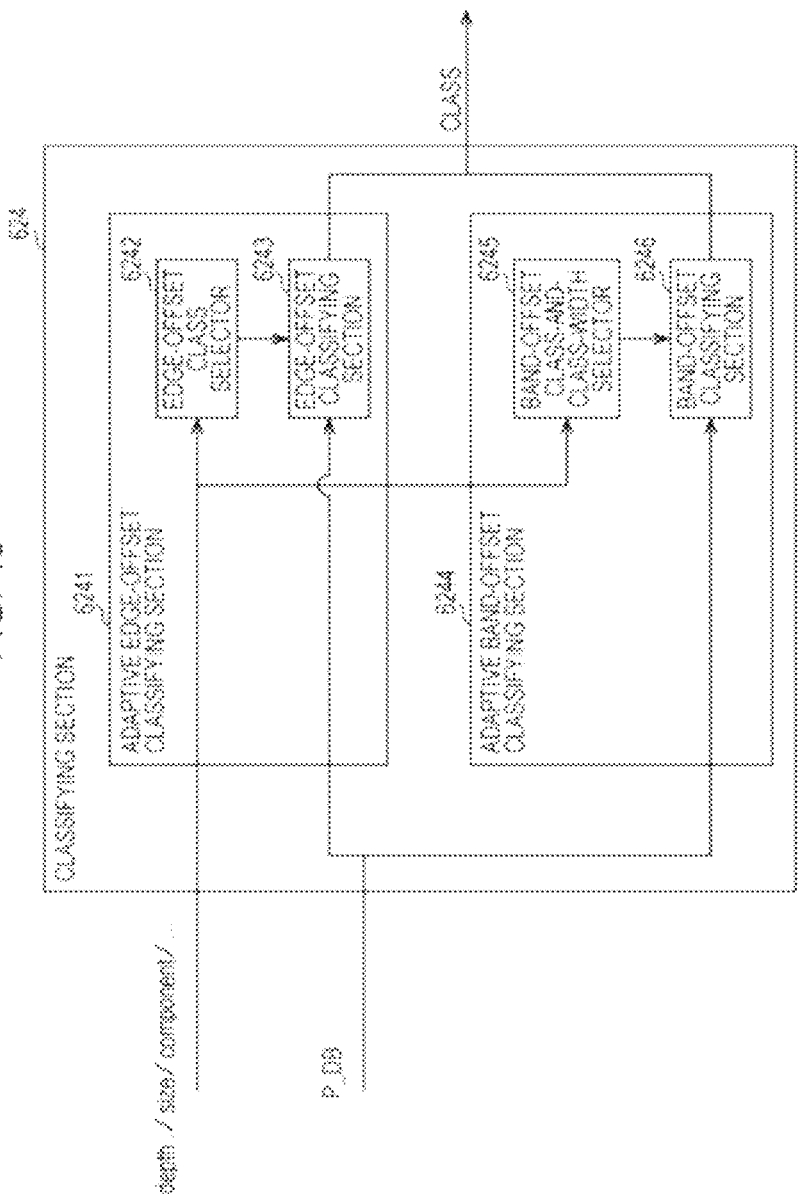
FIG. 43 is a block diagram illustrating the configuration of a classifying section according to the fifth embodiment.

FIG. 43 is a block diagram of the configuration of the classifying section 624.

The classifying section 624 includes an adaptive edge-offset classifying section 6241, an edge-offset class selector 6242, an edge-offset classifying section 6243, an adaptive band-offset classifying section 6244, a band-offset-class-and-class-width selector 6245, and a band-offset classifying section 6246.

The classifying section 624 classifies each pixel as a class in accordance with a parameter condition and an offset type. When the offset type indicates an edge offset, the classifying section 624 classifies each pixel by using the adaptive edge-offset classifying section 6241. When the offset type indicates a band offset, the classifying section 624 classifies each pixel by using the adaptive band-offset classifying section 6244.

The adaptive edge-offset classifying section 6241 is means for adaptively classifying each pixel as a class in accordance with a parameter condition, and includes the edge-offset class selector 6242 and the edge-offset classifying section 6243. The edge-offset class selector 6242 selects the type of class to be used. The edge-offset class selector 6242 inputs a classifying method for classifying pixel values into the edge-offset classifying section 6243. More specifically, the edge-offset class selector 6242 inputs a method for determining an intermediate value EdgeType which is temporarily determined when a pixel value is classified and a transform table used for determining class_idx from Edge-Type. An example of the method for determining the intermediate value EdgeType has been discussed with reference to parts (a) and (b) of FIG. 26, and this is referred to as a "basic edge classifying method". Alternatively, an edge classifying method, which will be discussed later with reference to FIG. 33, may be used. One of the parameter conditions is the hierarchical depth, as stated above, and the number of classes to be used when the hierarchical depth is not deep is set to be greater than that when the hierarchical depth is deep. Examples of the transform table used for determining class_idx from EdgeType are the transform tables 1001A and 1001B. A method for switching the edge determining method in accordance with the color component (component) may be suitably used. In this case, for the luminance components, the basic edge classifying method for classifying edges in the horizontal, vertical, and oblique directions are suitably used, and, for the chrominance components, a horizontal edge classifying method is suitably used in order to reduce the number of line memories. In the horizontal edge classifying method, the range of reference pixels used for classifying edges is restricted to the horizontal direction with respect to a subject pixel. The edge-offset classifying section 6243 classifies pixels on the basis of the supplied classifying method and the transform table used for determining class_idx from EdgeType.

The adaptive band-offset classifying section 6244 is means for adaptively classifying each pixel as a class in accordance with a parameter condition, and includes the band-offset-class-and-class-width selector 6245 and the band-offset classifying section 6246. The band-offset-class-and-class-width selector 6245 inputs a classifying method for classifying pixel values into the band-offset classifying section 6246. More specifically, the band-offset-class-and-class-width selector 6245 inputs a class width, which is a quantization width used for classifying a pixel value as an intermediate value, and a transform table used for determining class_idx from the intermediate value. One of the parameter conditions is the hierarchical depth, as stated above, and the class width to be used when the hierarchical depth is not deep is smaller than that when the hierarchical depth is deep. The band-offset classifying section 6246 classifies a pixel value as a class in accordance with the received class width and the transform table used for determining class_idx from the intermediate value. The class width, which is an input, does not have to be a class width itself, and may be an integer corresponding to the class width. For example, if 1<<BoRefBit32 is used as the class width, the number of bits BoRefBit32, which is the logarithm to the base 2, used for quantizing a pixel may be used instead of the class width, or the value for determining the number of bits used for quantizing a pixel from the pixel bit depth, for example, if BoRefBit32=PIC_DEPTH−5, 5 may be used instead of the class width.

In this manner, coded data is adaptively decoded in accordance with a parameter condition, and classifying of pixels is performed.

As described above, in this embodiment, the number of classes used for classifying pixels is changed in accordance with the hierarchical depth of a subject QAOU. More specifically, when the hierarchical depth of a subject QAOU is deep, the number of classes is smaller than that when the hierarchical depth of the subject QAOU is not deep.

Generally, the required memory space is represented by: the memory space=the data length of an offset×the number of classes×the number of QAOUs. Accordingly, by decreasing the number of classes, the memory space to be used can also be reduced.

In a deeper hierarchical level, the area of a QAOU becomes smaller, and also, the characteristics of pixel values within such a QAOU are almost uniform. Accordingly, even if the number of classes is decreased, the effect of offsets is not considerably impaired.

Additionally, in this embodiment, the offset precision is changed in accordance with the hierarchical depth of a subject QAOU. More specifically, when the hierarchical depth of a subject QAOU is deep, the offset precision is lower than that when the hierarchical depth of a subject QAOU is not deep. With this arrangement, the coding amount required when the hierarchical depth of a subject QAOU is deep can be reduced.

In a deeper hierarchical level of a QAOU, the number of pixels included in such a hierarchical level is smaller, and thus, quantization errors in the entire QAOU are also smaller than those in a higher hierarchical level. Accordingly, even if the offset precision is decreased in a deeper hierarchical level, the effect of offsets is not considerably impaired.

(Video Coding Device 2')

A video coding device 2' for generating coded data #1 by coding a subject image will be described below with reference to FIGS. 30 and 31. As in the video coding device 2, the video coding device 2' partially includes a method defined in H. 264/MPEG-4. AVC, a method used in KTA software, which is a joint development codec in VCEG (Video Coding Expert Group), a method used in TMuC (Test Model under Consideration) software, which is a successor codec to the codec used in KTA software, and a technology used in HM (HEVC TestModel) software.

The video coding device 2' includes an adaptive offset filter 80' instead of the adaptive offset filter 80 of the video coding device 2. The other elements of the configuration of the video coding device 2' are similar to those of the video coding device 2.

(Adaptive Offset Filter 80')

An adaptive offset filter 80' will be discussed below with reference to FIG. 30. FIG. 30 is a block diagram illustrating the configuration of the adaptive offset filter 80'. The adaptive offset filter 80' includes, as shown in FIG. 30, an adaptive offset filter information setting unit 81' and an adaptive offset filter processor 82'.

Figure 30:
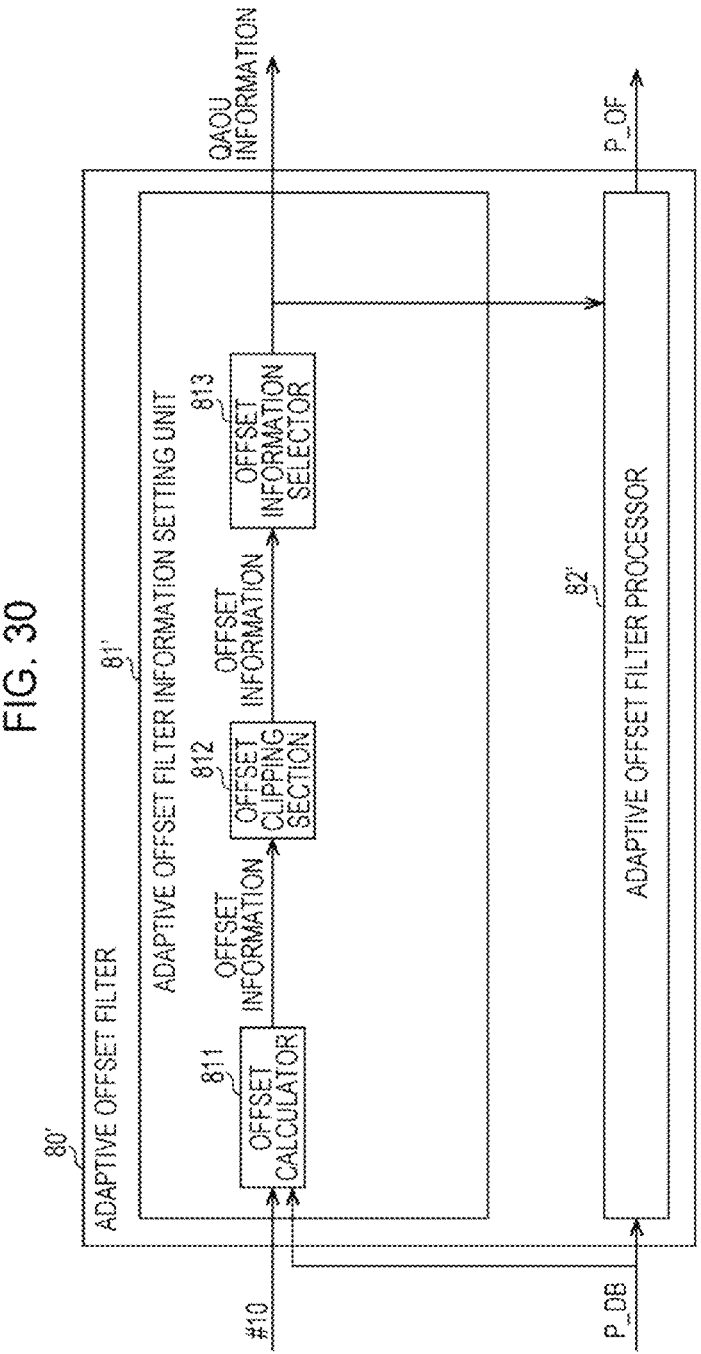
FIG. 30 is a block diagram illustrating the configuration of an adaptive offset filter 80 included in a video coding device according to the third embodiment.

The adaptive offset filter information setting unit 81' includes, as shown in FIG. 30, an offset calculator 811, an offset clipping section 812, and an offset information selector 813.

(Offset Calculator 811)

The offset calculator 811 calculates offsets concerning all the offset types and all the classes for all QAOUs up to a predetermined split depth included in the unit of processing (for example, an LCU) in accordance with the hierarchical depth of a subject QAOU. In this case, the offset types and the classes are the same as those discussed in a description of the video decoding device 1.

The offset calculator 811 supplies offset information indicating offsets calculated by the above-described processing, offset types, classes, and QAOU structure information indicating the QAOU split structure to the offset clipping section 812.

(Offset Clipping Section 812)

The offset clipping section 812 performs clip processing by using one of the following first clip processing and second clip processing on offsets supplied from the offset calculator 811.

(First Clip Processing)

The offset clipping section 812 clips each offset supplied from the offset calculator 811 to, for example, values from −8 to 7, thereby expressing each offset by four bits. The clipped offsets are supplied to the offset information selector 813. The bit width used for clipping is set in accordance with the image bit depth and the offset bit depth, as in the video decoding device 1.

By clipping each offset in this manner, the memory size of a memory (not shown) to store each offset can be reduced. The amount of data required to code offsets included in the coded data #1 can also be decreased, thereby making it possible to improve the coding efficiency. Additionally, since excessive offsets are not added, a suitable level of image quality can be guaranteed.

(Second Clip Processing)

The offset clipping section 812 may differently set the clipping range of each offset supplied from the offset calculator 811 in accordance with the offset type.

For example, if the offset type is an edge offset, the number of bits of an offset is set to be eight bits, and if the offset type is a band offset, the number of bits of an offset is set to be four bits. More generally, when the number of bits of an edge-offset offset is N bits and the number of bits of a band-offset offset is M bits, the numbers of bits of offsets are determined so that the condition N>M can be satisfied.

In this manner, by varying the number of bits of an offset in accordance with the offset type, the coding efficiency can be improved without requiring an excessive memory size of a memory for storing each offset.

When the threshold th for restricting values that can be taken as an offset is greater than $2^{m-1}$ but not greater than $2^m$, m-bit fixed-length coding method can be used as the coding method for coding the offset. More specifically, Truncated unary coding or Truncated Rice coding having th as the maximum value may be used.

Clip processing performed by a combination of the above-described first clip processing and second clip processing is also included in this embodiment. The adaptive offset filter 80' may not include the offset clipping section 812.

The offset clipping section 812 changes the clipping range in accordance with the hierarchical depth of a subject QAOU so as to match the offset precision. More specifically, a case in which the offset precision is $n_A$ bits when the hierarchical depth of a subject QAOU is smaller than a threshold and the offset precision is $n_B$ bits when the hierarchical depth of a subject QAOU is equal to or greater than the threshold will be considered. In this case, when the hierarchical depth of a subject QAOU is smaller than the threshold, the offset clipping section 812 sets the clipping range to be $-2^{n_A/2}$ to $2^{n_A/2}-1$. When the hierarchical depth of a subject QAOU is equal to or greater than the threshold, the offset clipping section 812 sets the clipping range to be $-2^{n_A/2}$ to $2^{n_A/2}-1$, and then sets the lower ($n_A-n_B$) bits to be "0". This enables the offset information selector 813 to perform processing by using offsets subjected to clipping processing performed by the offset clipping section 812 without considering the offset precision.

(Offset Information Selector 813)

The offset information selector 813 determines a combination of an offset type, classes, and offsets which minimize the RD cost (Rate-Distortion cost) and the associated QAOU split structure, and supplies QAOU information indicating the determined offset type, classes, and offsets, and the associated QAOU split structure to the variable-length code coder 22. The offset information selector 813 also supplies the determined offsets for each QAOU to the adaptive offset filter processor 82.

Processing performed by the offset information selector 813 will be discussed more specifically with reference to FIG. 31.

Figure 31:
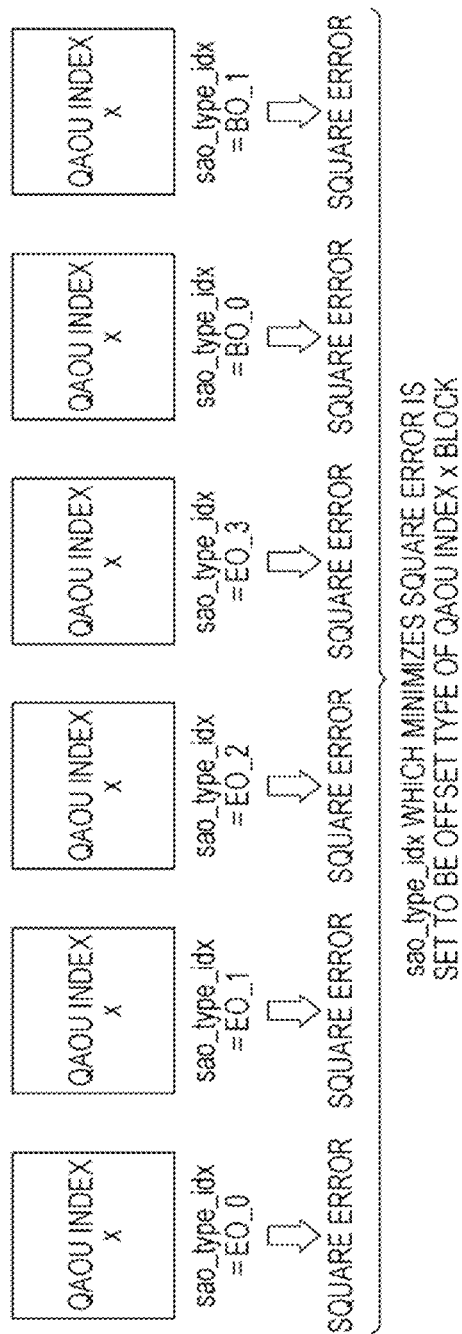
FIG. 31 shows an overview of a case in which a squared error concerning a QAOU having a QAOU index "x" is calculated for each offset type in the third embodiment.

FIG. 31 shows an overview of a case in which a squared error concerning a QAOU having a QAOU index "x" is calculated with respect to each offset type. As shown in FIG. 31, the offset information selector 813 calculates a squared error concerning each QAOMU with respect to each offset type. Then, the offset information selector 813 sets the offset type which minimizes the squared error to be the offset type of the QAOU. As a result, offset types for all the QAOMUs (QAOMU numbers 0 to 340) are determined.

Then, the offset information selector 813 calculates the RD cost when the split depth is 0 and the RD cost when the split depth is 1. A specific calculation method is the same as that discussed with reference to FIG. 18.

(Adaptive Offset Filter Processor 82')

The adaptive offset filter processor 82' adds an offset supplied from the offset information selector 813 to each pixel of a subject QAOU in the deblocked decoded image P_DB. The adaptive offset filter processor 82' outputs, as an offset-filtered decoded image P_OF, an image obtained by performing processing on all the QAOUs included in the deblocked decoded image P_DB. The configuration of the adaptive offset filter processor 82' is the same as that of the adaptive offset filter processor 62', and thus, an explanation thereof is omitted here.

Alternatively, an adaptive clip type may be utilized. That is, as one of offset types, an adaptive clip (AC) type may be used. In this case, there are three offset types, EO, BO, and AC. In the adaptive clip type (AC), a pixel value is corrected by using clips, such as a lower limit value c1 and an upper limit value c2, without using offsets. Examples of the lower limit value c1 and the upper limit value c2 are c1=16 and c2=235, respectively.

The use of the adaptive clip type eliminates the need to perform offset coding processing and to provide a memory for storing many offsets. If the lower limit value and the upper limit value used for clipping are adaptively provided instead of using fixed values, they are coded. In this case, differences from suitable fixed values, for example, an offset from 16 in the case of the lower limit value and an offset from 235 in the case of the upper limit value may preferably be coded. The upper limit value, particularly, may become a large value. However, the coding efficiency is not decreased by coding in this manner.

(Appendix 2)

As stated above, "in accordance with the hierarchical depth of a QAOU" may be read as "in accordance with the size of a QAOU". That is, the number of SAO types, the number of SAO classes, and the offset precision may be changed in accordance with the size of a QAOU.

For example, if the size of a QAOU is smaller than N×N pixels, one or a plurality of factors, such as the number of SAO types, the number of SAO classes, and the offset precision, may be restricted more heavily than that when the size of a QAOU is equal to or greater than N×N pixels. A specific value of N is, for example, N=64 (size of an LCU).

The number of SAO types may be restricted, for example, as follows: EO is restricted to a horizontal or vertical type, BO is restricted to one type (transform table 802C), only EO is used and BO is not used (transform table 802A), and only horizontal EO and only some modes of BO is used (transform table 801B or 802D). The transform tables indicated in the parentheses are used in the offset information decoding section 611. The restriction of the number of SAO classes and the offset precision may be imposed in a manner similar to the above-described embodiments.

By restricting the modes of SAO types, the number of SAO types, the number of SAO classes, and the offset precision in this manner, a memory space to be used can be decreased and the processing load can be reduced. In particular, if the modes of SAO types are restricted to BO or if EO is restricted to a horizontal or vertical type, the processing load in the coding device and the classifying section of the decoding device can be reduced. If the number of types is restricted, cost calculations for selecting an optimal type can be reduced, thereby reducing the processing load in the coding device. If the modes of SAO types are restricted to EO or if the number of classes and the offset precision are restricted, a memory space to be used for storing offsets can be reduced. Moreover, by restricting the modes of the SAO types to horizontal EO and BO, the number of temporary memories, such as line memories for storing reference pixels used for classifying, can be reduced, and also, a delay occurring while waiting for the decoding of reference pixels can be decreased. In order to reduce a memory space to be used, it is more effective if the number of BO classes is restricted than the number of EO classes is restricted.

The above-described restrictions can be implemented by the configuration of the means shown in FIGS. 41 through 43 if the operations of the offset information decoding section 611 and the classifying section 624 are adaptively changed in accordance with the size of a QAOU used as a parameter condition.

(Appendix 3)

Additionally, the size of a QAOU to be used when adding an offset to a luminance value (hereinafter also referred to as a "luminance unit") may be made different from the size of a QAOU to be used when adding an offset to a chrominance value (hereinafter also referred to as a "chrominance unit"). Then, the modes of SAO types, the number of SAO types, the number of SAO classes, the offset precision, and the maximum split hierarchical level may be restricted in a chrominance unit more heavily than in a luminance unit.

For example, in a data format in which the resolution of the luminance is different from that of the chrominance and the resolution of the chrominance is lower than that of the luminance, such as in YUV 4:2:0 image format, it is not necessary to split a chrominance unit to a smaller level than a luminance unit. Accordingly, by restricting the modes of SAO types, the number of SAO types, the number of SAO classes, and offset precision, and the maximum split hierarchical level of a chrominance unit more heavily than those of a luminance unit, a memory space to be used can be decreased and the processing load can be reduced. The maximum split hierarchical level of a chrominance unit can be restricted by making the maximum hierarchical depth of a SAO tree structure smaller than that of a luminance unit.

The above-described restrictions can be implemented by the configuration of the means shown in FIGS. 41 through 43 if the operations of the offset information decoding section 611 and the classifying section 624 are adaptively changed in accordance with the size of a QAOU used as a parameter condition.

In particular, when SAO processing is performed for both of the luminance and the chrominance, a temporary memory, such as a line memory for storing reference pixels for classifying, is required for each color component. Since the luminance component is less important than the chrominance components, the chrominance components are used as a parameter condition, and the modes of SAO types is restricted to horizontal EO and BO, thereby making it possible to reduce the number of line memories for the chrominance components. In this case, in the offset information decoding section 611, a transform table, such as the transform table 801B or 802D, is utilized.

It is also particularly effective if the chrominance components are used as a parameter condition and the offset precision for the chrominance components is set to be smaller than that for the luminance component. For example, if the offset precision and the shift value for the luminance component is set to be:

$$SAO\_DEPTH=MIN(PIC\_DEPTH,AY)$$

$$\text{shift value}=PIC\_DEPTH-MIN(PIC\_DEPTH,AY);$$
and the offset precision and the shift value for the chrominance components are set to be:

$$SAO\_DEPTH=MIN(PIC\_DEPTH,THC)$$

$$\text{shift value}=PIC\_DEPTH-MIN(PIC\_DEPTH,AC),$$

the variables AY and AC for controlling the precision are suitably determined such that they may satisfy AY>AC. For example, AY is set to be 10 or 9, and AC is set to be 8. In this case, the offset precision for the luminance component is higher than that for the chrominance components. The shift value for the luminance component is lower than that for the chrominance components.

(Appendix 4)

Moreover, when the value of a quantization parameter qp (qp value) for a CU is equal to or greater than a threshold, the modes of SAO types, the number of SAO types, the number of SAO classes, the offset precision, and the maximum split hierarchical level may be restricted. As the qp value, the qp value of the leading portion of a picture may be used, or if a QAOU to be subjected to SAO processing faces a boundary of an LCU or a CU, the qp value corresponding to the top left coordinates or the central coordinates of the QAOU may be used.

As the qp value becomes greater, the image quality of a prediction image becomes lower, and it is more difficult to perform detailed classifying processing and correction by using offsets. Accordingly, even if the modes of SAO types, the number of SAO types, the number of SAO classes, the offset precision, and the maximum split hierarchical level are restricted, the influence on the image quality is small. Thus, when the qp value is equal to or greater than a threshold, the number of SAO types, the number of SAO classes, the offset precision, and the maximum split hierarchical level are restricted. Then, it is possible to decrease a memory space to be used and to reduce the processing load without influencing the image quality.

The above-described restrictions can be implemented by the configuration of the means shown in FIGS. 41 through 43 if the operations of the offset information decoding section 611 and the classifying section 624 are adaptively changed in accordance with QP used as a parameter condition.

(Appendix 5)

Moreover, for a specific picture type, for example, B pictures and non-reference pictures (IDR pictures), the modes of SAO types, the number of SAO types, the number of SAO classes, the offset precision, and the maximum split hierarchical level may be restricted.

Concerning I pictures and P pictures, the image quality of these pictures greatly influence the subsequent pictures, and thus, it is necessary to maintain the SAO precision at a high level. On the other hand, pictures other than I pictures and P pictures do not greatly influence the subsequent pictures, and thus, concerning these pictures (B pictures and IDR pictures), the modes of SAO types, the number of SAO types, the number of SAO classes, the offset precision, and the maximum split hierarchical level may be restricted. Then, it is possible to decrease a memory space to be used and to reduce the processing load.

The above-described restrictions can be implemented by the configuration of the means shown in FIGS. 41 through 43 if the operations of the offset information decoding section 611 and the classifying section 624 are adaptively changed in accordance with a picture type used as a parameter condition.

(Appendix 6)

Additionally, in accordance with the position of a QAOU on a screen, the number of SAO types, the number of SAO classes, the offset precision, and the maximum split hierarchical level may be restricted.

For example, at the periphery of a screen, the number of SAO types, the number of SAO classes, the offset precision, and the maximum split hierarchical level may be restricted.

A user is likely to focus on and around the center of the screen, and thus, a decrease in the image quality at this portion directly reflects the subjective image quality. However, even if the image quality around the periphery of the screen is decreased, the subject image quality is not decreased to the same level as that when it is decreased on and around the center of the screen.

Additionally, if a SAO type which requires sample points beyond the edge of a screen is not used, the load in boundary determining processing can be reduced.

The above-described restrictions can be implemented by the configuration of the means shown in FIGS. 41 through 43 if the operations of the offset information decoding section 611 and the classifying section 624 are adaptively changed in accordance with the position of a QAOU used as a parameter condition.

Fourth Embodiment

Another embodiment of the present invention will be described below with reference to FIG. 32. A fourth embodiment is different from the above-described embodiments in that EO and BO are switched in accordance with a pixel value.

The present inventors have found that there are characteristics in which EO is more effective than BO in an intermediate tone area of pixels and BO is more effective than EO in the other areas (a lower pixel value area and a higher pixel value area). Accordingly, in this embodiment, BO is used in the lower pixel value area and the higher pixel value area and EO is used in the intermediate tone area.

This will be described below more specifically with reference to FIG. 32. FIG. 32 illustrates the configuration in which EO and BO are switched in accordance with the pixel value: part (a) shows an overview of the configuration in which EO and BO are switched in accordance with the pixel value; part (b) shows specific values to be switched; and part (c) shows the content of a list memory stored in the offset information storage section 621.

Figure 32:
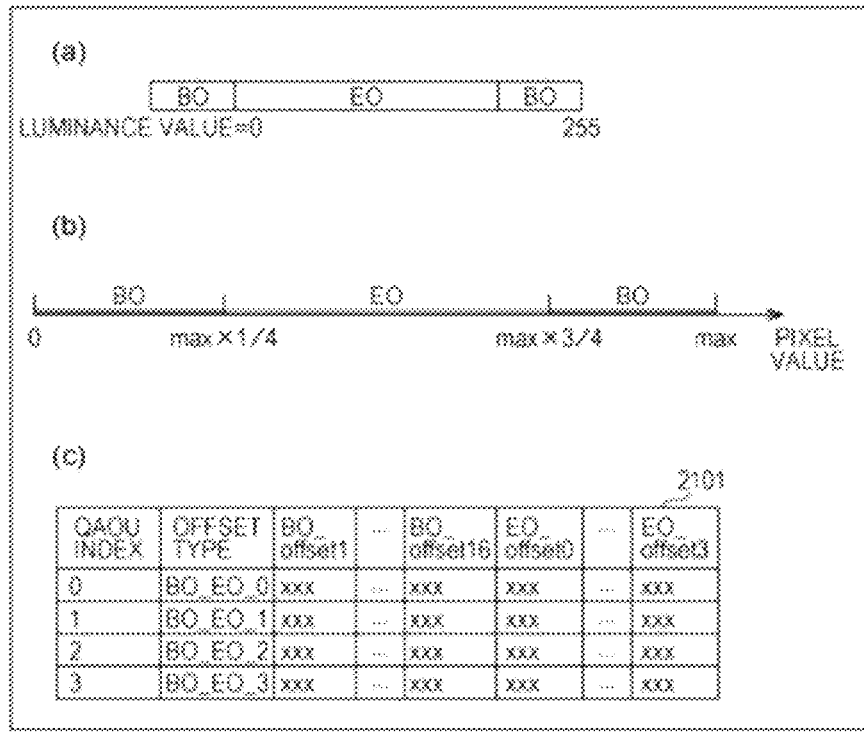
FIG. 32 illustrates the configuration in which EO and BO are switched in accordance with the pixel value in a fourth embodiment of the present invention: part (a) shows an overview of the configuration in which EO and BO are switched in accordance with the pixel value; part (b) shows specific values to be switched; and part (c) shows the content of a list memory stored in the offset information storage section 621.

As shown in part (a) of FIG. 32, in this embodiment, BO is used when the pixel value (luminance value) is around 0 or 255, and EO is used when the pixel value is in the other areas. That is, the SAO type is changed depending on the pixel value, and when the pixel values are around 0 or 255, an offset is added in accordance with the pixel value of a pixel, and when the pixel value is in the other areas, an offset is added in accordance with the type of edge.

It has been found through the inventors' experiments that there are particular ranges of pixel values to be used both for EO and BO. That is, EO is more frequently used in the intermediate tone area. This means that, in the lower pixel value area and in the higher pixel value area, pixel values influence errors more greatly than the type of edge.

Accordingly, in this embodiment, EO and BO are switched in accordance with the pixel value range, and in one SAO type, EO or BO having a higher error correcting effect is utilized, thereby making it possible to improve the coding efficiency. Additionally, since it is possible to decrease the number of SAO types and the total number of classes, a memory space to be used can be decreased and the processing load can also be reduced.

This embodiment will be described below in a greater detail. Unlike the above-described embodiments, in this embodiment, the following four SAO types, "sao_type_idx"=1 to "sao_type_idx"=4, are used and are defined as follows.

"sao_type_idx"=1: (BO_EO_0) corresponding to EO_0+BO in the first embodiment

"sao_type_idx"=2: (BO_EO_1) corresponding to EO_1+BO in the first embodiment

"sao_type_idx"=3: (BO_EO_2) corresponding to EO_2+BO in the first embodiment

"sao_type_idx"=4: (BO_EO_3) corresponding to EO_3+BO in the first embodiment EO_0 to 3 and BO_0, 1 in the first embodiment are not used.

Then, as shown in part (b) of FIG. 32, the classifying section 624 performs classifying by using BoTbl[BO_1] in the transform table 1301 shown in FIG. 29. When the pixel value is ¼ of max or smaller or is ¾ of max or greater, the classifying section 624 performs classifying by using the transform table 1301.

When the pixel value is between ¼ and ¾ of max, the classifying section 624 determines the edge type in accordance with EO_0 to 3 discussed in the above-described embodiments, and performs classifying.

With this operation, the classifying section 624 is able to perform classifying by switching between BO and EO in accordance with the pixel value.

The offset calculator 811 calculates offsets in a manner similar to the offset calculating method discussed in the above-described embodiments. However, in this embodiment, the number of modes of offset types is four, and the offset calculator 811 calculates offsets by changing the number of modes of offset types to four.

In a list memory 2101 stored in the offset information storage section 621, as shown in part (c) of FIG. 32, the QAOU index, the offset type, and specific values of offsets with respect to classes that can be selected for this offset type are stored in association with each other.

When an offset type having characteristics of EO and BO is used, classifying may be first performed by using EO, and then, for some classes (classes having a flat edge), classifying may be further performed by using BO, or both of EO and BO may be used, as discussed in this embodiment. Alternatively, it may be determined depending on the condition discussed in the above-described embodiments (depending on whether the hierarchical depth of a QAOU is smaller than a threshold) whether an offset type having characteristics of EO and BO will be provided. In this case, the number of types and the number of classes can be reduced.

Fifth Embodiment

Another embodiment of the present invention will be described below with reference to FIGS. 33, 34, and 42. A fifth embodiment is different from the above-described embodiments in that when performing classifying using EO, pixels used for determining the type of edge are restricted to pixels positioned in the horizontal direction of a subject pixel.

In the above-described embodiments, a pixel positioned in the upward or downward direction of a subject pixel is also used for determining the type of edge. Accordingly, for a pixel (pixel subjected to offset processing) positioned in the upward direction of the subject pixel, a line buffer for storing the pixel value of this pixel which has not been subjected to offset processing is necessary.

Accordingly, by restricting pixels used for determining the type of edge to pixels positioned in the horizontal direction of a subject pixel, no reference is made to pixels in the upward direction, thereby making it possible to reduce a memory space by an amount equal to a line buffer. Moreover, processing for determining a boundary in the upward direction (screen edge) is not necessary, thereby making it possible to reduce the amount of processing.

Additionally, if pixels positioned only in the horizontal direction are used, the processing results which have been obtained so far can be utilized, thereby making it possible to further reduce the amount of processing. This will be discussed below with reference to part (a) of FIG. 33. Part (a) of FIG. 33 shows pixels positioned in the horizontal direction, and x0 through x3 indicate pixel values of pixels.

Concerning the pixel having the pixel value x1, the difference between this pixel and the two adjacent pixels are as follows.

$$s1 = \text{sign}(x1-x0) - \text{sign}(x2-x1)$$

Then, the difference between the pixel having the pixel value x2 and the two adjacent pixels are as follows.

$$s2 = \text{sign}(x2-x1) - \text{sign}(x3-x2)$$

In the above-described expressions, s1 and s2 are values used for classifying an edge.

In this manner, when calculating s2, $\text{sign}(x2-x1)$ used for calculating s1 is reused. Accordingly, the amount of processing can be reduced by the amount of this reuse.

Details of this embodiment will be discussed below. In this embodiment, the EO type is restricted to two modes. That is, "sao_type_idx"=1, 2 are used as edge offsets (EO). When "sao_type_idx"=1 (EO_0), the type of edge is determined by comparing a subject pixel with pixels positioned immediately on the right and left sides of the subject pixel (part (b) of FIG. 33). When "sao_type_idx"=2 (EO'_0), the type of edge is determined by comparing a subject pixel with pixels positioned two pixels away from the subject pixel on the right and left sides (part (c) of FIG. 33).

When "sao_type_idx"=3, 4, a band offset (BO) is used. In this case, "sao_type_idx"=5, 6 in the first embodiment may be read as "sao_type_idx"=3, 4, respectively.

The purpose of determining the type of edge by using pixels positioned two pixels away from a subject pixel when "sao_type_idx"=2 is to facilitate the detection of an edge having a small angle with respect to the horizontal direction. As shown in part (d) of FIG. 33, if two pixels immediately next to a subject pixel are used for comparison, the difference between the pixel value of the subject pixel and those of such adjacent pixels is small, and may not be judged as an edge. Even in this case, if the subject pixel is also compared with pixels positioned two pixels away from the subject pixel, an edge having a small angle with respect to the horizontal direction can be detected.

Figure 34:
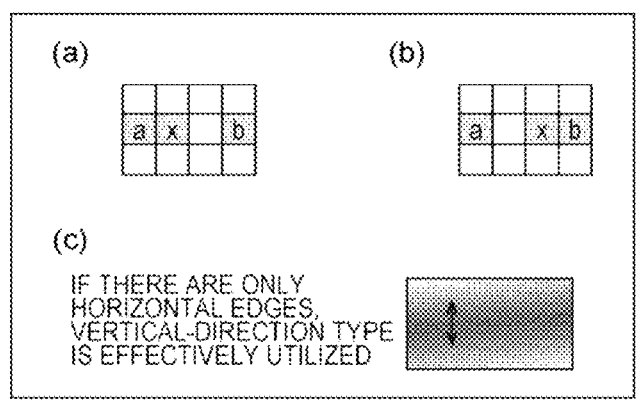
FIG. 34 illustrates a case in which the EO type is restricted to the horizontal direction in the fifth embodiment of the present invention: parts (a) and (b) show cases in which reference pixels are positioned asymmetrically; and part (c) shows an overview of horizontal edges.

Instead of using two pixels immediately next to a subject pixel, a pixel positioned immediately on the left side of a subject pixel and a pixel positioned two pixels away from the subject pixel on the right side (part (a) of FIG. 34) may be used for determining the difference. Conversely, a pixel positioned immediately on the right side of the subject pixel and a pixel positioned two pixels away from the subject pixel on the left side (part (b) of FIG. 34) may be used for determining the difference. These cases are particularly effective when reference pixels are positioned at an edge of a screen.

The use of pixels positioned only in the horizontal direction may be restricted to some cases. For example, in the case of pictures which influence other pictures less, such as B pictures and non-reference pictures, reference may be made only to pixels in the horizontal direction. In the case of other pictures, reference may be made to pixels in a manner similar to the first embodiment. Alternatively, at an edge of a screen or near a boundary of a slice, reference may be made only to pixels in the horizontal direction, and at the other areas, reference may be made to pixels in a manner similar to the first embodiment. With this arrangement, a memory space to be used can be decreased, and the amount of processing can also be reduced. Additionally, since no reference is made in the upward direction, the amount of boundary determining processing for determining boundaries, such as an edge of a screen or a boundary of a slice, can also be reduced.

Pixels to be used may be explicitly specified by using a flag for each picture or each block.

For example, if there are many horizontal edges (part (c) of FIG. 34), processing is performed by using the method discussed in the above-described embodiments, thereby suppressing a decrease in the performance.

Alternatively, it may be determined, depending on the condition discussed in the above-described embodiments (depending on whether the hierarchical depth of a QAOU is smaller than a threshold), whether pixels positioned only in the horizontal direction will be used. Moreover, only when BO and EO are both used, as discussed in the above-described embodiment, may pixels positioned only in the horizontal direction be used for EO.

The type of edge may be determined depending on whether the difference between a subject pixel and a reference pixel positioned in the horizontal direction of the subject pixel is greater (or smaller) than a threshold. More specifically, classifying may be performed according to the following equations.

$$\text{Sign}(z) = +1 \text{ (when } z > th)$$

$$\text{Sign}(z) = 0 \text{ (when } -th \leq z \leq th)$$

$$\text{Sign}(z) = -1 \text{ (when } z < -th)$$

In the these equations, th denotes a threshold having a predetermined value.

In the case of a pixel value indicating a chrominance component, pixels positioned only in the horizontal direction may be used for an edge offset.

Figure 33:
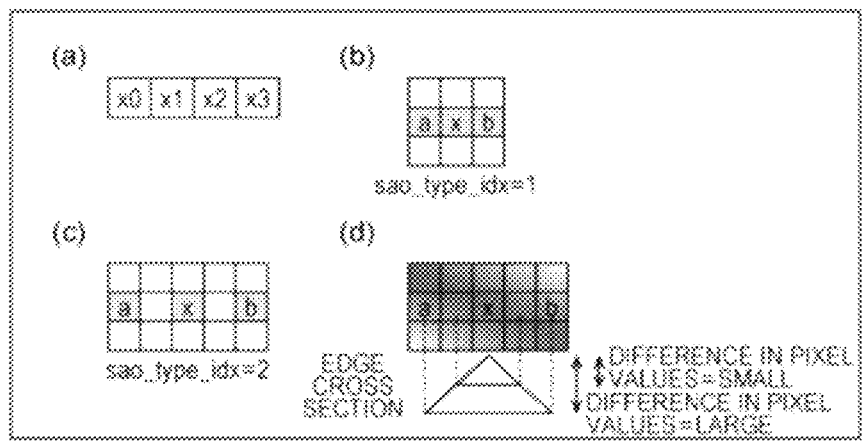
FIG. 33 illustrates a case in which the EO type is restricted to the horizontal direction in a fifth embodiment of the present invention: part (a) shows an overview of advantages; part (b) shows the positions of pixels in the horizontal direction; part (c) shows a state different from the state in part (b); and part (d) shows an overview of advantages obtained by the state in part (c).

The effect obtained by restricting pixels to those in the horizontal direction may be achieved even when only one horizontal-edge classifying method is provided, for example, even when the method shown in part (b) of FIG. 33 is used. If, as described above, a plurality of different horizontal-edge classifying methods are combined, more precise edge classifying can be implemented than that when the method shown in part (b) of FIG. 33 is singly used. A combination of a plurality of horizontal-edge classifying methods is not restricted to the use of two examples by changing the distance between a subject pixel and reference pixels, as in parts (b) and (c) of FIG. 33, but may be the use of two thresholds for determining the type of edge. For example, two horizontal-edge classifying methods, that is, one method when the threshold th is 0 and another method when the threshold th is 1, may be used.

The configuration in which the use of pixels positioned only in the horizontal direction is restricted to some cases can be implemented by the configuration of the means shown in FIGS. 41 through 43 of the first embodiment if the operations of the offset information decoding section 611 and the classifying section 624 are adaptively changed in accordance with a parameter condition. For example, in the offset information decoding section 611 shown in FIG. 41, the modes of offset types to be selected in the offset type selector 6112 in accordance with a parameter condition are restricted only to the horizontal-edge classifying methods, and the restricted modes of the offset types are decoded in the offset type decoder 6113.

As shown in part (b) of FIG. 42, the offset type transform table selector 6117' selects the transform table stored in the edge-offset-type-and-band-offset-type transform table storage section 6118' or the transform table stored in the horizontal-edge-offset-type-and-band-offset-type transform table storage section 6119' in accordance with the parameter condition. In one example, if the color component is a luminance component, the offset type transform table selector 6117 selects the transform table stored in the edge-offset-type-and-band-offset-type transform table storage section 6118'. If the color component is a chrominance component, the offset type transform table selector 6117 selects the transform table stored in the horizontal-edge-offset-type-and-band-offset-type transform table storage section 6119'.

The offset type selector 6112 selects an edge classifying method which is restricted to a horizontal edge classifying method in accordance with the parameter condition, and, in the classifying section 624, the edge offset classifying section 6243 classifies pixels. In one example, if the color component is a luminance component, the basic edge classifying method is selected, and if the color component is a chrominance component, a horizontal edge classifying method is selected.

Sixth Embodiment

Figure 35:
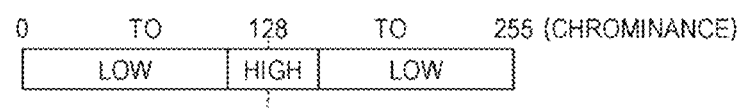
FIG. 35 shows an overview of a case in which the offset precision is improved in a sixth embodiment of the present invention.

Another embodiment of the present invention will be described below with reference to FIGS. 35 through 37. A sixth embodiment is different from the above-described embodiments in that the offset precision is improved or more precise classifying is performed around the center of the pixel values of chrominance components.

An image has characteristics in which errors around an achromatic color are noticeable in terms of the subjective image quality. In the pixel values of each chrominance component, an achromatic color is positioned at the center of the value range, and if the bit depth is eight bits, the achromatic color is a color having a pixel value of 128. Accordingly, in this embodiment, in the case of BO, around the pixel value of 128 of a chrominance component, the offset precision is improved or more precise classifying is performed by using a smaller class width. Concerning the pixel values of a chrominance component, the value range around an achromatic color is referred to as the "achromatic color value range".

With this arrangement, since the offset precision can be improved in the achromatic color value range, the performance in making corrections by using offsets in the achromatic color value range can be enhanced. Accordingly, errors caused by the deviation from the original image in the achromatic color value range are decreased, thereby making it possible to improve the subjective image quality. Moreover, by performing more precise classifying using a smaller class width in the achromatic color value range than in other value ranges, corrections using offsets in the achromatic color value range can be performed precisely. Accordingly, errors caused by the deviation from the original image in the achromatic color value range are decreased, thereby making it possible to improve the subjective image quality.

In this embodiment, the offset precision is improved or more precise classifying is performed for the achromatic color value range. However, the value range subjected to this processing is not restricted to the achromatic color value range. More precise classifying may be performed or the offset precision may be improved for a value range which is likely to influence the subjective image quality, thereby making it possible to improve the subjective image quality. Additionally, for the pixel value of a luminance component, as well as that of a chrominance component, for a value range in which degradation of the image quality is likely to be noticeable in terms of the subjective image quality, the offset precision may be similarly improved or more precise classifying may be similarly performed, thereby achieving advantages similar to those obtained for a chrominance component.

A case in which the offset precision is improved will first be discussed below with reference to FIG. 35. FIG. 35 illustrates an overview of a case in which the offset precision is improved. In order to improve the offset precision, as shown in FIG. 35, the offset precision around the pixel value of 128 of a chrominance component is set to be high, and the offset precision in the other value ranges is set to be low.

The offset information storage section 621 secures a storage area of $n_B$ bits (for example, $n_B=8$) for offsets used for a value range having a higher offset precision, and secures a storage area of $n_A$ bits (for example, $n_A=6$) for Offsets used for a value range having a lower offset precision. If there is an enough storage area, the storage area may be set to be unconditionally $n_B$ bits, in which case, the implementation is facilitated.

The offset clipping section 812 utilizes different clipping ranges for a value range having a high offset precision and a value range having a low offset precision. For example, for a value range having a low offset precision, the clipping range is set to be $-2^{nA/2}$ to $2^{nA/2}-1$, and for a value range having a high offset precision, the clipping range is set to be $-2^{nB/2}$ to $2^{nB/2}-1$.

A case in which more precise classifying is performed will now be discussed below with reference to FIG. 36. FIG. 36 illustrates an overview of a case in which more precise classifying is performed: part (a) shows a transform table; and parts (b) through (d) show that pixel values are divided.

When more precise classifying is performed, in a list memory for a chrominance component in the offset information storage section 621, an offset storage area corresponding to "sao_type_idx"=5 is secured in accordance with the number of classifying levels.

In the case of BO, the classifying section 624 considers whether or not the pixel value of a subject pixel is contained within the achromatic color value range when determining a class from the pixel value. More specifically, the classifying section 624 performs classifying by using one of the patterns in a transform table 2501 shown in part (a) of FIG. 36.

In the transform table 2501, classifying is performed by using "class_idx=BoTbl[sao_type_idx][pic[x]/4]", and classes are assigned to smaller widths of pixel values than those in the transform tables 1301 and 1302 shown in FIG. 29.

Figure 36:
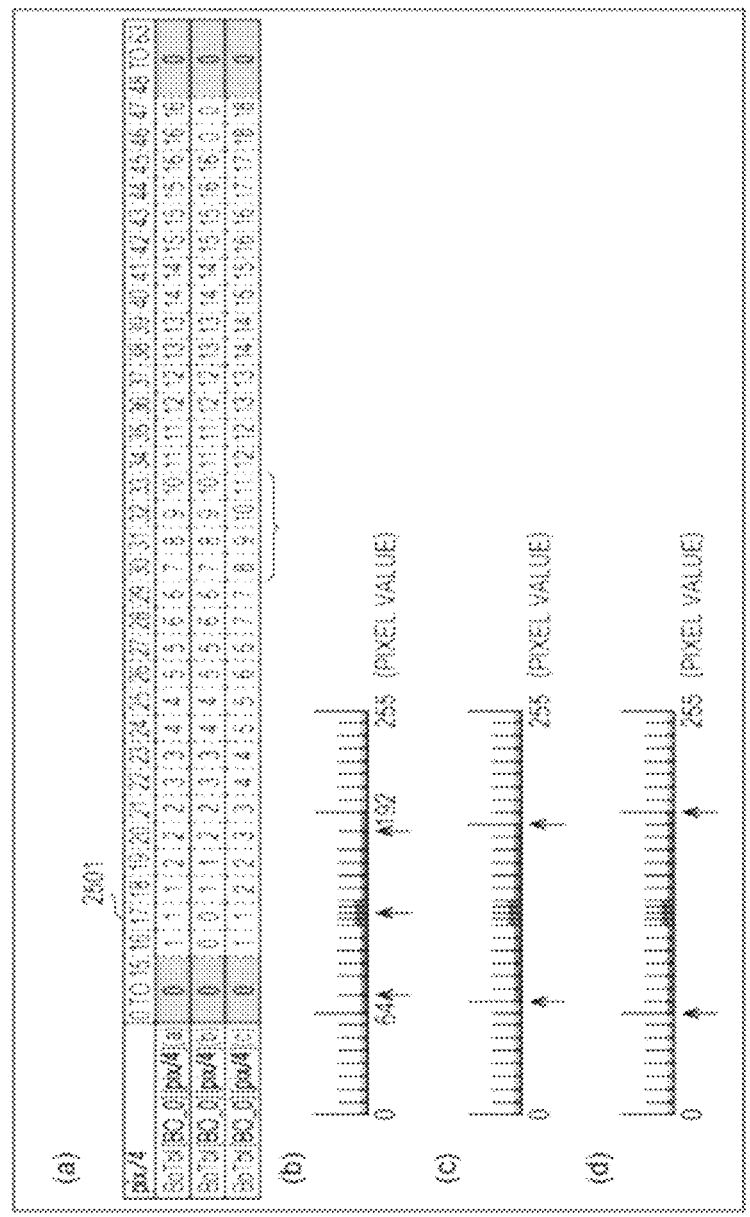
FIG. 36 illustrates an overview of a case in which more detailed classifying is performed in the sixth embodiment: part (a) shows a transform table; and parts (b) through (d) show classifying.

"BoTbl[BO_0][pix/4](a)" in the transform table 2501 shows an example (part (b) of FIG. 36) in which there are sixteen classes, and the achromatic color value range is split into smaller widths and the intermediate tone areas (pix/4=16 to 21, 42 to 47) are split into larger widths. "BoTbl[BO_0][pix/4](b)" shows an example (part (c) of FIG. 36) in which there are sixteen classes, and the range in which offsets are added is narrowed, and the achromatic color value range is split into smaller widths while the maximum number of classes and the maximum class width are maintained. "BoTbl[BO_0][pix/4](c)" shows an example (part (d) of FIG. 36) in which there are eighteen classes, and the achromatic color value range is split into smaller widths while the maximum class width is maintained. Additionally, in another example, the class width of the intermediate tone areas is set to be relatively larger than that of the achromatic color value range, thereby decreasing the number of entire classes. In this example, it is possible to reduce the space of the offset storage area while maintaining the correction precision in the achromatic color value range. Such an arrangement is possible because the frequency with which offsets are used for correction in the intermediate tone areas is lower than that in the achromatic color value range.

Alternatively, both of an improvement in the offset precision and more precise classifying in the achromatic color value range may be performed.

Alternatively, the offset precision may be changed according to whether the pixel value indicates a luminance component or a chrominance component. That is, the offset precision for the pixel value indicating a chrominance component may be set to be lower than that for the pixel value indicating a luminance component.
(Appendix 7)

The addition of an offset may be performed such that the pixel value approximates an achromatic color (=pixel value of 128 of a chrominance component). That is, the offset adder 626 may handle offsets such that the sign of an offset to be added to the pixel value of 128 or greater is opposite to the sign of an offset to be added to the pixel value smaller than 128. For example, when an offset is indicated by a, the sign of the offset may be determined such that x'=x+a (x<128) and x'=x−a(x≥128).

If 128 is positioned between the pixel value to which an offset has not been added and the pixel value to which an offset has been added, the pixel value to which an offset has been added may be clipped by 128. For example, if the pixel value is "126 (blue)" and the offset is "3", instead of directly adding the offset to the pixel value such that x=126+3=129, x may be set to x-clip(126+3, 0, 128)=128. In this equation, clip(x, y, z) indicates processing for restricting the value of x to y≤x≤z.

If the pixel value is "129 (red)" and the offset is "−4", instead of directly adding the offset to the pixel value such that x=129+(−4)=125, x may be set to x=clip(129+(−4), 128, 255)=128.
(Appendix 8)

For a chrominance component, offsets may be added in one of the intermediate tone areas and the other areas. For example, as shown in part (a) of FIG. 37, classifying may be performed by focusing on the pixel values of an achromatic color. In the example shown in part (a) of FIG. 37, in the case of "sao_type_idx"=5(BO_0), classes are assigned to the intermediate tone areas, and in the case of "sao_type_idx"=6 (BO_1), classes are assigned to value ranges other than the intermediate tone areas.

Figure 37:
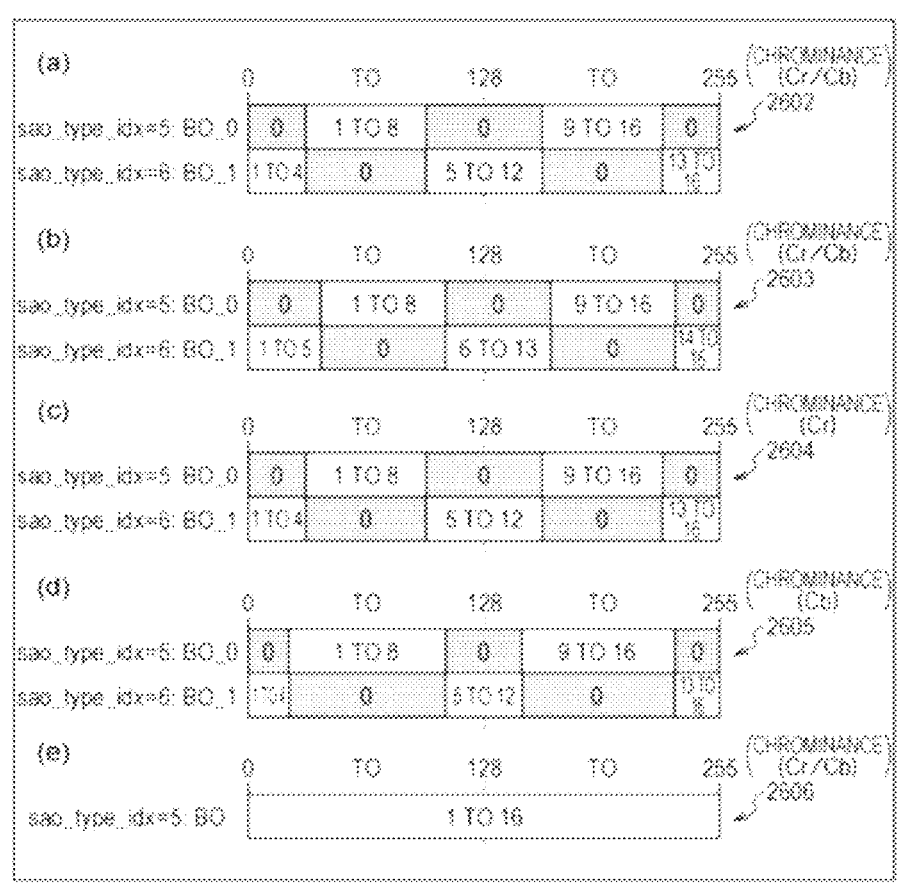

Alternatively, as shown in part (b) of FIG. 37, classifying may be performed asymmetrically in two value ranges with respect to the pixel values of an achromatic color. In the example shown in part (b) of FIG. 37, the class width is the same as that of part (a) of FIG. 37, and partitioning positions of the classes are different from those of part (a) of FIG. 37.

Alternatively, as shown in parts (c) and (d) of FIG. 37, classifying may be performed differently in accordance with the chrominance channel (Cr or Cb). In the examples shown in parts (c) and (d) of FIG. 37, the class width is different between the chrominance component (Cr) and the chrominance component (Cb). The class width can be changed by setting more precise classifying levels, as in the transform table 2501.

As shown in part (e) of FIG. 37, for the chrominance components, classifying may be performed by using only one BO type.

Seventh Embodiment

Figure 38:
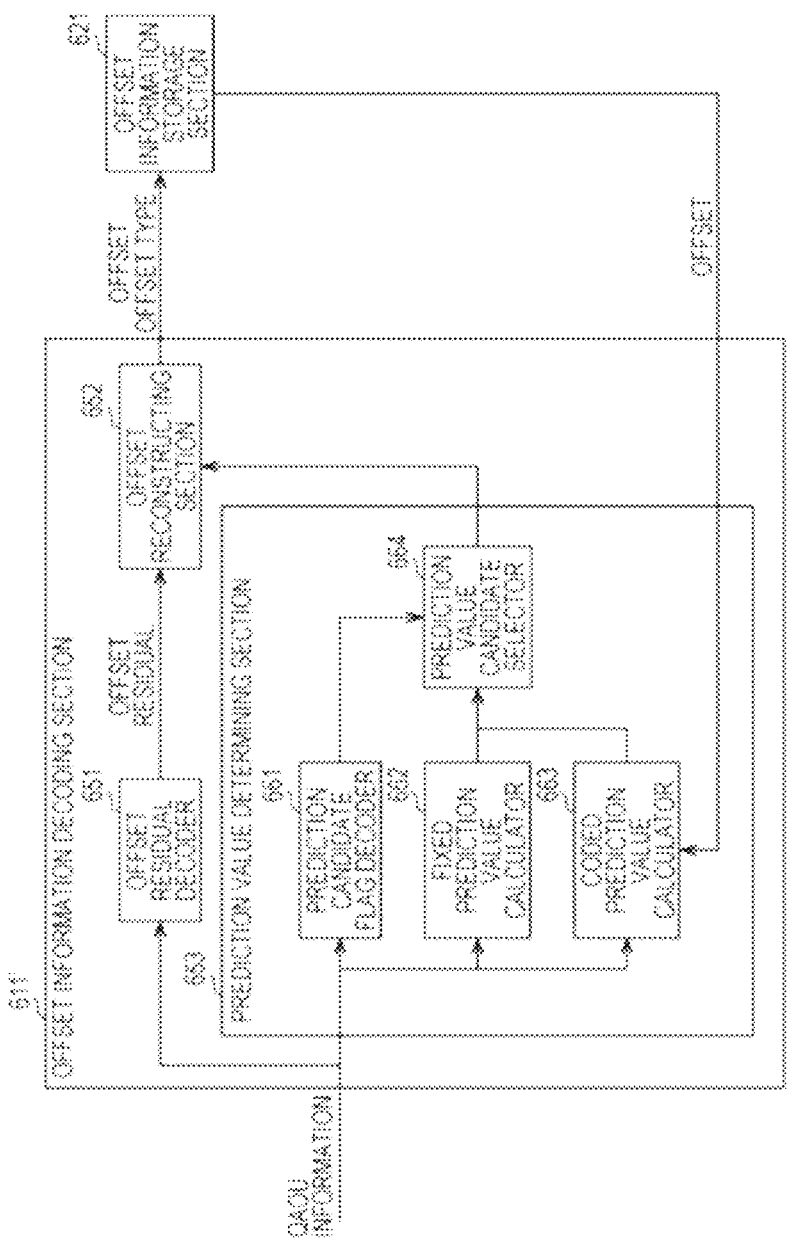
FIG. 38 is a block diagram illustrating the configuration of an offset information decoding section according to a seventh embodiment of the present invention.
Figures 39, 40:
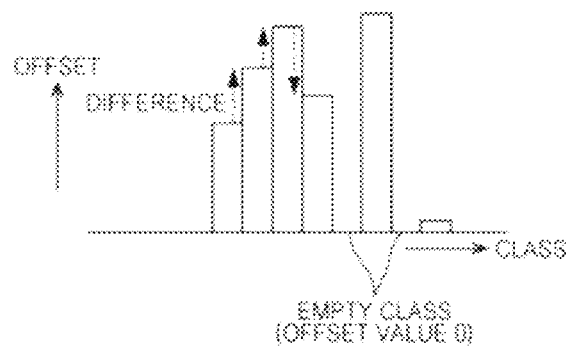
FIG. 39 illustrates an overview of a case in which there are classes under which no pixels are classified in the seventh embodiment.
FIG. 40 illustrates syntax to be used when a prediction candidate flag is used in the seventh embodiment.

Another embodiment of the present invention will be described below with reference to FIGS. 38 through 40. A seventh embodiment is different from the above-described embodiments in that, instead of using the value of an offset itself, the value of an offset is subjected to predictive coding, that is, an offset residual calculated by using the value of an offset and a prediction value of the offset value is coded and in that "0" may be provided as the prediction value of an offset.

Generally, in SAO, an offset is coded in accordance with a class indicating a classified area. If there is no pixel classified under a certain class (class is empty), "0" is coded. Generally, offsets in adjacent classes or adjacent areas have similar values. Accordingly, if an offset value which has already been decoded is used as a prediction value of another offset and the difference from this prediction value is coded, the amount of data to code offsets can be reduced. However, if the class is empty, the amount of data to code offsets is increased.

In this embodiment, therefore, "0" is included as prediction values of offsets, and one prediction value is selected from a plurality of candidates of prediction values including "0", and then, the prediction difference is coded, thereby reducing the amount of data to code offsets.

With this arrangement, regardless of whether a class is empty or there is a pixel classified under this class and an offset is coded, a suitable prediction value can be assigned, thereby making it possible to reduce the amount of data to code offsets by performing predictive coding.

The configuration of an offset information decoding section 611' of this embodiment will be described below with reference to FIG. 38. The offset information decoding section 611' is provided instead of the offset information decoding section 611 shown in FIG. 22, and includes an offset residual decoder 651, an offset reconstructing section 652, and a prediction value determining section 653. The prediction value determining section 653 includes a prediction candidate flag decoder 661, a fixed prediction value calculator 662, a coded prediction value calculator 663, and a prediction value candidate selector 664.

The offset residual decoder 651 decodes an offset residual from QAOU information included in coded data #1 and supplies the decoded offset residual to the offset reconstructing section 652.

The prediction value determining section 653 determines a prediction value of an offset. The prediction candidate flag decoder 661 decodes a prediction candidate flag from the QAOU information and supplies the decoded prediction candidate flag to the prediction value candidate selector 664. The prediction candidate flag decoder 661 may be configured such that it does not decode the candidate flag if a previously decoded offset value is "0".

The fixed prediction value calculator 662 calculates a fixed value (in this case, "0"), which is an offset to be coded when there is no pixel classified under a certain class, as a prediction value, and supplies the calculated fixed value to the prediction value candidate selector 664.

The coded prediction value calculator 663 reads a decoded offset from the offset information storage section 621 and calculates a prediction value, and supplies it to the prediction value candidate selector 664.

The prediction value candidate selector 664 selects, in accordance with the prediction candidate flag, a prediction value to be supplied to the offset reconstructing section 652 from among the prediction value supplied from the fixed prediction value calculator 662 and the prediction value supplied from the coded prediction value calculator 663.

The offset reconstructing section 652 reconstructs an offset (Offset) from the prediction value (pred) supplied from the prediction value candidate selector 664 and from the offset residual (sao_offset) supplied from the offset residual decoder 651 according to the following equation.

"Offset"="pred"+"*sao*_offset"

The reason why the amount of data required for coding is increased if there is a class (empty class) under which no pixel is classified will be discussed below with reference to FIG. 39. FIG. 39 illustrates an overview of a case in which there are empty classes. As shown in FIG. 39, in a class which is not empty, an offset used for this class is coded. Then, for each class, by using the previous offset as a prediction value, the difference between the prediction value and the current offset is coded. However, if there is an empty class, the prediction value becomes "0", and the difference value is increased. As a result, the amount of data required for coding is increased.

In this embodiment, therefore, by using a prediction candidate flag, the prediction value may be selected from "0" and "previous offset (other than 0)".

Syntax to be used when the prediction candidate flag is used will be described below with reference to FIG. 40. FIG. 40 illustrates syntax 2901 to be used when a prediction candidate flag is used. As shown in FIG. 40, a prediction candidate flag "sao_pred_flag" is added, and if "sao_pred_flag"=0, the previously decoded offset (other than 0) is set as a prediction value offsetp. If "sao_pred_flag"=1 or the current offset is the first offset, the prediction value offsetp is set to be 0. In the syntax 2901, "sao_offset_delta" represents a difference d from the prediction value, and "sao_offset[sao_curr_depth][ys][xs]"="offsetp+d".

The prediction candidate flag may not be used depending on the offset type. For example, in the case of EO, the prediction candidate flag is not used, and in the case of BO, the prediction candidate flag is used. This is because, in BO, empty classes may be frequently generated depending on the distribution of pixel values.

Additionally, a determination may be made whether to perform predictive coding itself depending on the offset type. For example, in the case of EO, predictive coding may be performed, and in the case of BO, predictive coding may not be performed.

(Appendix 9)

In the above-described third through seventh embodiments, by using the intra-prediction mode, edge offset classes may be estimated, restricted, rearranged for each LCU.

An edge direction selected as an EO type of SAO may have correlation with an intra-prediction mode. Accordingly, reference to the intra-prediction mode of a CU located at a position corresponding to a QAOU of SAO can be utilized for selecting an EO class.

For example, by using the intra-prediction mode, an EO class may be estimated and determined, EO class candidates may be restricted, or the order (index) of EO classes may be rearranged in order in which they are more likely to be selected.

This is particularly easy to implement if an image is divided such that the size of a QAOU of each hierarchical level of SAO is the same as that of a CU, for example, such that the maximum size of a QAOU of SAO is equal to the size of an LCU.

(Appendix 10)

In a known adaptive offset filter, since many modes of offsets (types and classes) are provided, a large memory size may be required. Accordingly, in this embodiment, for example, an image filtering device which is capable of reducing block distortion while suppressing an increase in the memory size is implemented.

An image filtering device according to the present invention is an image filtering device for adding an offset selected from among a plurality of offsets to a pixel value of each pixel forming an input image which is constituted by a plurality of unit areas. The image filtering device includes: offset determining means for determining, for each unit area, an offset to be added to the pixel value of each pixel included in the unit area; and filtering means for adding an offset determined by the offset determining means to the pixel value of each pixel included in the unit area. In a case in which the size of a unit area for which an offset is determined is smaller than a predetermined size, the offset determining means determines an offset to be added to the pixel value of each pixel included in the unit area from among a more restricted number of selectable offsets than that in a case in which the size of the unit area is equal to or greater than the predetermined size.

With the above-described configuration, in a case in which the size of a unit area for which an offset is determined is smaller than the predetermined size, an offset to be added is determined from among a more restricted number of offsets than that in a case in which the size of the unit area is equal to or greater than the predetermined size.

When the size of a unit area is small, the number of pixels included in this unit area is also small, and it is more likely that pixels in this unit area have similar values. Accordingly, when the size of a unit area is small, even if the number of selectable offsets is restricted, the influence on an image to which an offset is applied is small. Additionally, by restricting the number of selectable offsets, a required memory space can be reduced.

Thus, with the above-described configuration, it is possible to reduce a memory space to be used while the influence on an image to which an offset is applied is decreased. Additionally, since the number of selectable offsets is decreased, the amount of data to code offsets can be reduced, thereby improving the coding efficiency.

In order to solve the above-described problem, an image filtering device according to the present invention is an image filtering device for adding an offset to a pixel value of each pixel forming an input image which is constituted by a plurality of unit areas. The image filtering device includes: offset determining means for determining, for each unit area, an offset to be added to the pixel value of each pixel included in the unit area; and filtering means for adding an offset determined by the offset determining means to the pixel value of each pixel included in the unit area. In a case in which the size of a unit area for which an offset is determined is smaller than a predetermined size, the filtering means adds an offset having a lower precision than that in a case in which the size of the unit area is equal to or greater than the predetermined size.

With the above-described configuration, in a case in which the size of a unit area for which an offset is determined is smaller than the predetermined size, an offset having a lower precision than that in a case in which the size of the unit area is equal to or greater than the predetermined size is added.

When the size of a unit area is small, the number of pixels included in this unit area is also small, and it is more likely that pixels in this unit area have similar values. Accordingly, when the size of a unit area is small, even if the precision of an offset is decreased, the influence on quantization errors is small, and thus, the influence on an image to which an offset is applied is also small. Additionally, by decreasing the precision of an offset, a required memory space can be reduced.

Thus, with the above-described configuration, it is possible to reduce a memory space to be used while the influence on an image to which an offset is applied is decreased. Additionally, since the precision of an offset is decreased, the amount of data to code offsets can be reduced, thereby improving the coding efficiency.

An image filtering device according to the present invention is an image filtering device for performing adaptive offset (SAO: Sample Adaptive Offset) on a pixel value of each pixel forming an input image which is constituted by a plurality of unit areas. The image filtering device includes: offset determining means for determining, for each unit area, an offset type of offset to be added to the pixel value of each pixel included in the unit area; and filtering means for adding an offset of an offset type determined by the offset determining means to the pixel value of each pixel included in the unit area. The offset determining means determines the offset type to be a band offset (BO) in a case in which the pixel value of a subject pixel to which an offset is added is positioned in a value range around a maximum value or a minimum value, and determines the offset type to be an edge offset (EO) in a case in which the pixel value of the subject pixel is positioned in a value range other than the value ranges around the maximum value and the minimum value.

With the above-described configuration, when adaptive offsetting is performed, a band offset is applied to pixels having pixel values positioned around the maximum value or the minimum value, and an edge offset is applied to pixels having pixel values positioned in value ranges other than the value ranges of the maximum value and the minimum value.

In a higher pixel value range or a lower pixel value range, it is more likely that pixel values influence errors than edges do. Accordingly, with the above-described configuration, the efficiency in correcting errors can be enhanced, thereby improving the coding efficiency.

If one offset type includes both of a band offset and an edge offset, the number of types of adaptive offsets can be decreased, thereby decreasing a memory space to be used and also reducing the amount of processing.

In the above-described configuration, band offset processing is offset processing for adding one of a plurality of offsets to the pixel value of a subject pixel in accordance with the magnitude of the pixel value of the subject pixel (this also applies to the subsequent description). Edge offset processing is offset processing for adding one of a plurality of offsets to the pixel value of a subject pixel in accordance with the difference between the pixel value of the subject pixel and the pixel value of a pixel positioned around the subject pixel (this also applies to the subsequent description).

In the image filtering device according to the present invention, the offset determining means may determine the offset type to be a band offset for pixels positioned in a value range from the minimum value to $\frac{1}{4}$ of the maximum value or a value range from $\frac{3}{4}$ of the maximum value to the maximum value, and may determine the offset type to be an edge offset for pixels positioned in value ranges other than these value ranges.

With the above-described configuration, it is possible to clearly separate pixels to which a band offset is applied from pixels to which an edge offset is applied.

An image filtering device according to the present invention is an image filtering device for performing adaptive offset (SAO: Sample Adaptive Offset) on an input image. The image filtering device includes: classifying means for determining an edge in order to determine a class to be used in an edge offset (EO) by referring to pixels positioned only in the horizontal direction of a subject pixel; and filtering means for adding an offset associated with a class determined by the classifying means in a case in which an edge offset (EO) is applied.

With the above-described configuration, when determining an edge, reference is made to pixels positioned only in the horizontal direction, thereby making it possible to reduce a required memory space, compared with a case in which reference is also made to pixels in the upward direction. Additionally, boundary determining processing for determining boundaries in the upward direction is not necessary, thereby making it possible to reduce the amount of processing.

In the image filtering device according to the present invention, the classifying means may determine an edge by referring to a pixel positioned two pixels away from the subject pixel in the horizontal direction.

With the above-described configuration, since reference is made to a pixel positioned two pixels away from the subject pixel, it is even possible to detect an edge having a small angle.

An image filtering device according to the present invention is an image filtering device for performing adaptive offset (SAO: Sample Adaptive Offset) on an input image. The image filtering device includes: classifying means for determining a class to be used in a band offset (BO) by setting the division width of classes to be used in a range of pixel values indicating the chrominance around a center value, which is a value positioned at the center between the maximum value and the minimum value, to be smaller than that in the other ranges of the pixel values; and filtering means for adding an offset associated with a class determined by the classifying means in a case in which a band offset (BO) is applied.

With the above-described configuration, the division width of classes to be used in a range of pixel values indicating the chrominance around the center value, which is a value positioned at the center between the maximum value and the minimum value, is set to be smaller than that in the other ranges of the pixel values, and then, the classes to be used when a band offset (BO) is applied are determined.

When the pixel value indicating the chrominance is the center value, this pixel is an achromatic color. Errors of an achromatic color are noticeable to the human eye, thereby decreasing the subjective image quality. Then, as in the above-described configuration, if the class width in a range around the center value is set to be small, offsets can be set precisely for pixels around the center value. As a result, the subjective image quality can be increased.

In the image filtering device according to the present invention, if the center value is positioned between the pixel value to which an offset has not been added and the pixel value to which an offset has been added, the filtering means may set the pixel value to which an offset has been added to be the center value.

With the above-described configuration, an offset is not added if the pixel value to which an offset has been added is beyond the center value. When the pixel value indicating the chrominance is the center value, this pixel is an achromatic color, and in value ranges with the center value therebetween, the color perceived by the human eye is changed from the achromatic color. Then, with the above-described configuration, it is possible to prevent the color perceived by the human eye from changing, which would otherwise be caused by adding an offset.

An image filtering device according to the present invention is an image filtering device for performing adaptive offset (SAO: Sample Adaptive Offset) on an input image. The image filtering device includes: filtering means for adding an offset having a higher precision to a pixel having a pixel value indicating the chrominance around a center value, which is a value positioned at the center between the maximum value and the minimum value, than the precision of an offset to be added to a pixel in the other value ranges.

With the above-described configuration, an offset having a higher precision is added to a pixel having a pixel value indicating the chrominance around a center value, which is a value positioned at the center between the maximum value and the minimum value, than the precision of an offset to be added to a pixel in the other value ranges.

When the pixel value of a pixel indicating the chrominance is the center value, this pixel is an achromatic color. Errors of an achromatic color are noticeable to the human eye, thereby decreasing the subjective image quality. Then, as in the above-described configuration, if the precision of an offset to be added to pixels around a center value is improved, offsets can be precisely added to pixels around the center value. As a result, the subjective image quality can be increased.

An offset decoding device according to the present invention is an offset decoding device for decoding each offset which is referred to by an image filter for adding an offset to a pixel value of each pixel forming an input image. The offset decoding device includes: offset residual decoding means for decoding each offset residual from coded data; prediction value determining means for determining a prediction value of each offset from a decoded offset or a predetermined value; and offset calculating means for calculating each offset from a prediction value determined by the prediction value determining means and an offset residual decoded by the offset residual decoding means.

With the above-described configuration, since an offset is decoded from a residual, the amount of data to code an offset can be decreased, compared with a case in which each offset itself is coded. Additionally, a prediction value for determining a residual is determined from a decoded offset or a predetermined value. Thus, it is possible to prevent the amount of data to code difference data from becoming greater than that when an offset itself is coded, which would otherwise be caused by the use of decoded offsets only.

The predetermined value may be, for example, "0".

An offset coding device according to the present invention is an offset coding device for coding each offset which is referred to by an image filter for adding an offset to a pixel value of each pixel forming an input image. The offset coding device includes: prediction value determining means for determining a prediction value of each offset from a coded offset or a predetermined value; offset residual calculating means for calculating an offset residual from each offset and a prediction value determined by the prediction value determining means; and offset residual coding means for coding an offset residual calculated by the offset residual calculating means.

With the above-described configuration, since an offset is decoded from a residual, the amount of data to code an offset can be decreased, compared with a case in which each offset itself is coded. Additionally, a prediction value for determining a residual is determined from a decoded offset or a predetermined value. Thus, it is possible to prevent the amount of data to code difference data from becoming greater than that when an offset itself is coded, which would otherwise be caused by the use of decoded offsets only.

A data structure of coded data according to the present invention is a data structure of coded data which is referred to by an image filter for adding an offset to a pixel value of each pixel forming an input image which is constituted by a plurality of unit areas. The data structure includes: prediction value determining information indicating whether a prediction value will be determined from a decoded offset or a predetermined value. The image filter refers to the prediction value determining information included in the coded data, and then determines a prediction value and decodes an offset.

With the above-described configuration, it is possible to determine, by using the prediction value determining information, whether a prediction value will be set to be a decoded offset or a predetermined value.

Application Examples

The above-described video decoding device 1 (1') and video coding device 2 (2') may be mounted on and used for various apparatuses for transmitting, receiving, recording, and playing back video images. Video images may be non-artificial video images captured by, for example, a camera, or artificial video images (including CG and GUI) generated by, for example, a computer.

The use of the above-described video decoding device 1 and video coding device 2 for transmitting and receiving video images will be described below with reference to FIG. 45.

Figure 45:
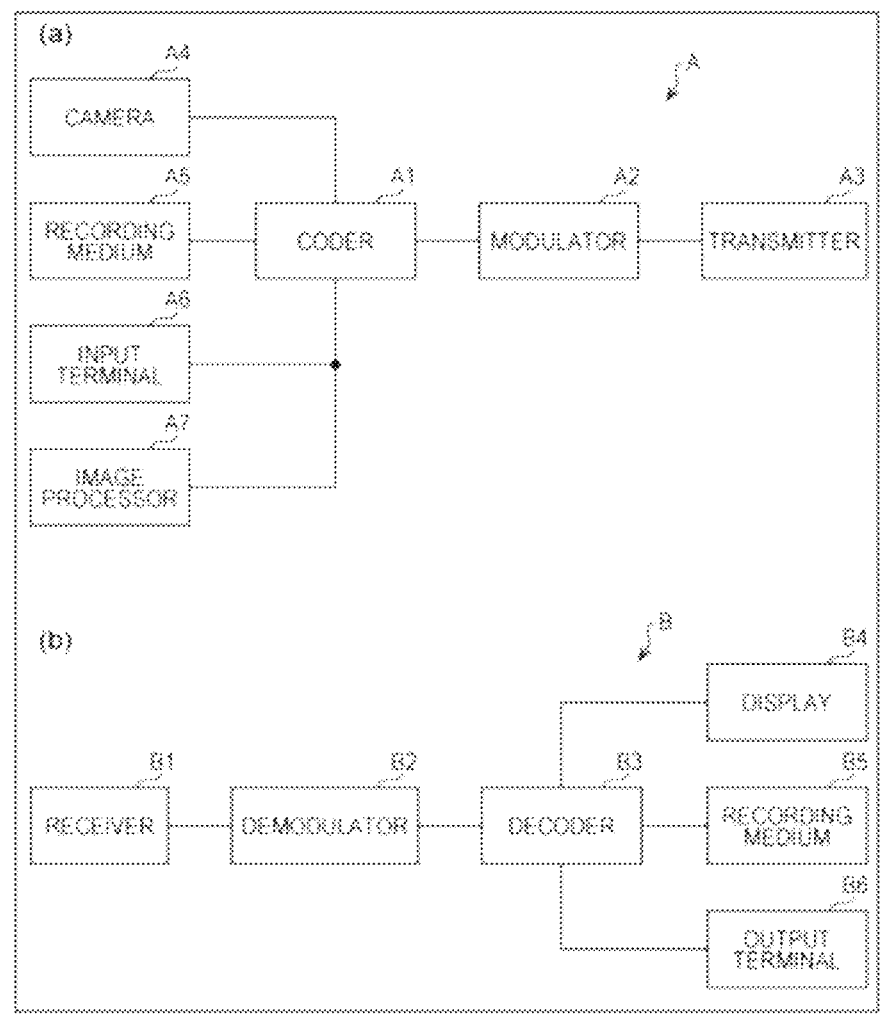
FIG. 45 illustrates a case in which a video decoding device and a video coding device can be used for transmitting and receiving video images; part (a) is a block diagram illustrating the configuration of a transmitting apparatus on which the video coding device is mounted; and part (b) is a block diagram illustrating the configuration of a receiving apparatus on which the video decoding device is mounted.

Part (a) of FIG. 45 is a block diagram illustrating the configuration of a transmitting apparatus A on which the video coding device 2 is mounted. As shown in part (a) of FIG. 45, the transmitting apparatus A includes a coder A1 which codes video images so as to obtain coded data, a modulator A2 which modulates a carrier wave by using the coded data obtained by the coder A1 so as to obtain a modulation signal, and a transmitter A3 which transmits the modulation signal obtained by the modulator A2. The above-described video coding device 2 is used as this coder A1.

As supply sources for inputting video images into the coder A1, the transmitting apparatus A may also include a camera A4 which captures video images, a recording medium A5 on which video images are recorded, an input terminal A6 for receiving video images from an external source, and an image processor A7 which generates or processes images. Although the configuration of the transmitting apparatus A including all these elements is shown in part (a) of FIG. 45, some elements may be omitted.

The recording medium A5 may be a recording medium on which video images which are not coded or video images which are coded by a recording coding method, which is different from a transmitting coding method, are recorded. If video images which are coded by a recording coding method are recorded on the recording medium A5, a decoder (not shown) for decoding coded data read from the recording medium A5 by using a recording coding method may be interposed between the recording medium A5 and the coder A1.

Part (b) of FIG. 45 is a block diagram illustrating the configuration of a receiving apparatus B on which the video decoder 1 is mounted. As shown in part (b) of FIG. 45, the receiving apparatus B includes a receiver B1 which receives a modulation signal, a demodulator B2 which demodulates the modulation signal received by the receiver B1 so as to obtain coded data, and a decoder B3 which decodes the coded data obtained by the demodulator B2 so as to obtain video images. The above-described video decoding device 1 is used as this decoder B3.

As destinations to which video images output from the decoder B3 are supplied, the receiving apparatus B may also include a display B4 which displays video images, a recording medium B5 for recording video images thereon, and an output terminal B6 for outputting video images to an external source. Although the configuration of the receiving apparatus B including all these elements is shown in part (b) of FIG. 45, some elements may be omitted.

The recording medium B5 may be a recording medium for recording thereon video images which are not coded or video images which are coded by a recording coding method, which is different from a transmitting coding method. If the recording medium B5 is a recording medium for recording video images which are coded by a recording coding method, a coder (not shown) for coding video images obtained from the decoder B3 by using a recording coding method may be interposed between the decoder B3 and the recording medium B5.

A transmission medium for transmitting a modulation signal may be a wireless medium or a wired medium. A transmission mode in which a modulation signal is transmitted may be broadcasting (in this case, a transmission mode in which a transmission destination is not specified in advance) or communication (in this case, a transmission destination is specified in advance). That is, transmission of a modulation signal may be implemented by any one of radio broadcasting, cable broadcasting, radio communication, and wired communication.

For example, a broadcasting station (such as broadcasting equipment) and a receiving station (such as a television receiver) of terrestrial digital broadcasting are respectively an example of the transmitting apparatus A which transmits a modulation signal via radio broadcasting and an example of the receiving apparatus B which receives a modulation signal via radio broadcasting. A broadcasting station (such as broadcasting equipment) and a receiving station (such as a television receiver) of cable television broadcasting are respectively an example of the transmitting apparatus A which transmits a modulation signal via cable broadcasting and an example of the receiving apparatus B which receives a modulation signal via cable broadcasting.

A server (such as a workstation) and a client (such as a television receiver, a personal computer, or a smartphone) using VOD (Video On Demand) services or video hosting services on the Internet are respectively an example of the transmitting apparatus A which transmits a modulation signal via communication and the receiving apparatus B which receives a modulation signal via communication (generally, in the case of a LAN, a wired or wireless transmission medium is used, and in the case of a WAN, a wired transmission medium is used). Examples of the personal computer are a desk-top PC, a laptop PC, and a tablet PC. An example of the smartphone is a multifunction mobile phone terminal.

A client using video hosting services has a function of coding video images captured by a camera and uploading the coded video images to a server, as well as a function of decoding coded data downloaded from a server and displaying the decoded data on a display. That is, a client using video hosting services serves as both of the transmitting apparatus A and the receiving apparatus B.

The use of the above-described video decoding device 1 and video coding device 2 for recording and playing back video images will be described below with reference to FIG. 46.

Figure 46:
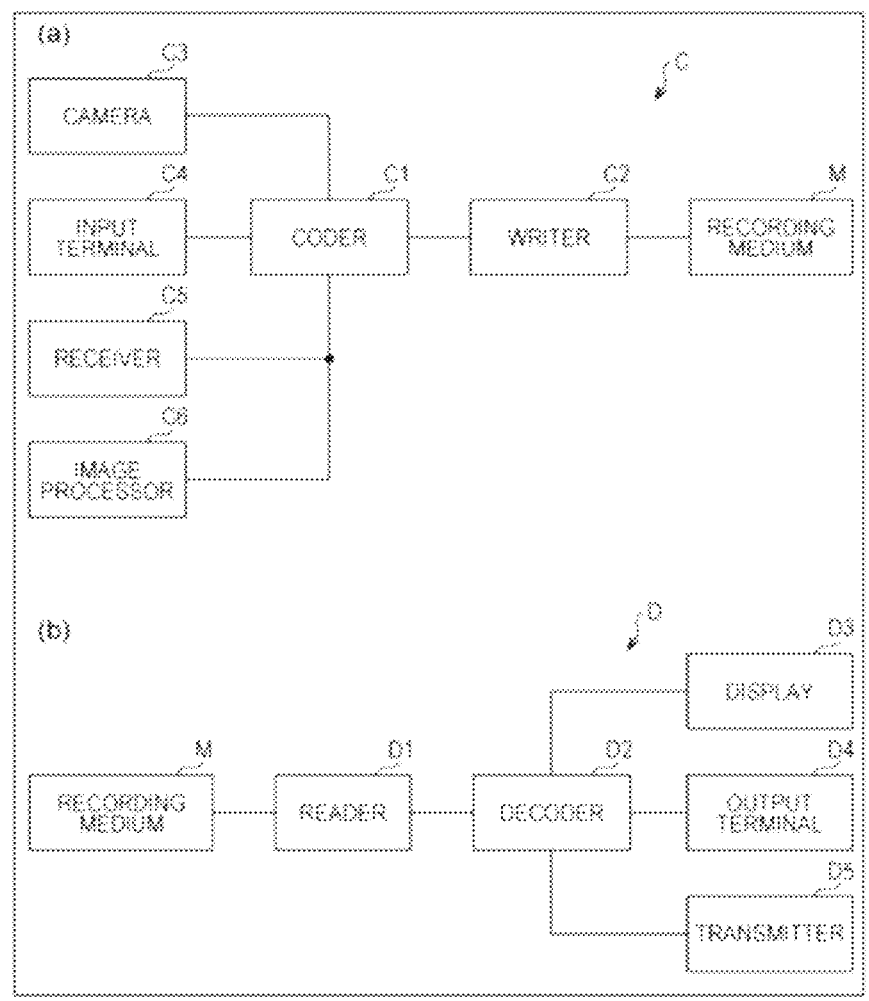
FIG. 46 illustrates a case in which a video decoding device and a video coding device can be used for recording and playing back video images; part (a) is a block diagram illustrating the configuration of a recording apparatus on which the video coding device 2 is mounted; and part (b) is a block diagram illustrating the configuration of a playback apparatus on which the video decoding device is mounted.

Part (a) of FIG. 46 is a block diagram illustrating the configuration of a recording apparatus C on which the video coding device 2 is mounted. As shown in part (a) of FIG. 46, the recording apparatus C includes a coder C1 which codes video images so as to obtain coded data, and a writer C2 which writes the coded data obtained by the coder C1 into a recording medium M. The above-described video coding device 2 is used as this coder C1.

The recording medium M may be (1) a type integrated in the recording apparatus C, such as an HDD (Hard Disk Drive) or an SSD (Solid State Drive), (2) a type connected to the recording apparatus C, such as a SD memory card or a USB (Universal Serial Bus) flash memory, or (3) a type loaded in a drive (not shown) integrated in the recording apparatus C, such as a DVD (Digital Versatile Disc) or a BD (Blu-ray Disc: registered trademark).

As supply sources for inputting video images into the coder C1, the recording apparatus C may also include a camera C3 which captures video images, an input terminal C4 for receiving video images from an external source, a receiver C5 for receiving video images, and an image processor C6 which generates or processes images. Although the configuration of the recording apparatus C including all these elements is shown in part (a) of FIG. 46, some elements may be omitted.

The receiver C5 may be a receiver which receives video images which are not coded or video images which are coded by a transmitting coding method, which is different from a recording coding method. If the receiver C5 is a receiver which receives video images coded by a transmitting coding method, a transmitting decoder (not shown) for decoding coded data coded by a transmitting coding method may be interposed between the receiver C5 and the coder C1.

Examples of the recording apparatus C are a DVD recorder, a BD recorder, and an HD (Hard Disk) recorder (in this case, the input terminal C4 or the receiver C5 is a main supply source for video images). Other examples of the recording apparatus C are a camcorder (in this case, the camera C3 is a main supply source for video images), a personal computer (in this case, the receiver C5 or the image processor C6 is a main supply source for video images), and a smartphone (in this case, the camera C3 or the receiver C5 is a main supply source for video images).

Part (b) of FIG. 46 is a block diagram illustrating the configuration of a playback apparatus D on which the video decoding device 1 is mounted. As shown in part (b) of FIG. 46, the playback apparatus D includes a reader D1 which reads coded data written into a recording medium M, and a decoder D2 which decodes the coded data read by the reader D1 so as to obtain video images. The above-described video decoding device 1 is used as this decoder D2.

The recording medium M may be (1) a type integrated in the playback apparatus D, such as an HDD or an SSD, (2) a type connected to the playback apparatus D, such as a SD memory card or a USB flash memory, or (3) a type loaded in a drive (not shown) integrated in the playback apparatus D, such as a DVD or a BD.

As destinations to which video images output from the decoder D2 are supplied, the playback apparatus D may also include a display D3 which displays video images, an output terminal D4 for outputting video images to an external source, and a transmitter D5 which transmits video images. Although the configuration of the playback apparatus D including all these elements is shown in part (b) of FIG. 46, some elements may be omitted.

The transmitter D5 may be a transmitter which transmits video images which are not coded or video images which are coded by a transmitting coding method, which is different from a recording coding method. If the transmitter D5 is a transmitter which transmits video images coded by a transmitting coding method, a coder (not shown) for coding video images by a transmitting coding method may be interposed between the decoder D2 and the transmitter D5.

Examples of the playback apparatus D are a DVD player, a BD player, and an HDD player (in this case, the output terminal D4 to which a television receiver, for example, is connected is a main destination to which video images are supplied). Other examples of the playback apparatus D are a television receiver (in this case, the display D3 is a main destination to which video images are supplied), a desk-top PC (in this case, the output terminal D4 or the transmitter D5 is a main destination to which video images are supplied), a laptop or tablet PC (in this case, the display D3 or the transmitter D5 is a main destination to which video images are supplied), a smartphone (in this case, the display D3 or the transmitter D5 is a main destination to which video images are supplied), and digital signage (also called an electronic bulletin board system, and in this case, the display D3 or the transmitter D5 is a main destination to which video images are supplied).

(Configuration Implemented by Software)

The individual blocks of the video decoding device 1(1') and the video coding device 2(2'), in particular, the variable-length code decoder 13, the motion-vector reconstructing unit 14, the inter-prediction image generator 16, the intra-prediction image generator 17, the prediction-method determining unit 18, the inverse-quantize-and-inverse-transform unit 19, the deblocking filter 41, the adaptive filter 50, the adaptive offset filter 60 (60'), the transform-and-quantize unit 21, the variable-length code coder 22, the inverse-quantize-and-inverse-transform unit 23, the intra-prediction image generator 25, the inter-prediction image generator 26, the motion-vector detector 27, the prediction-method controller 28, the motion-vector redundancy eliminating unit 29, the deblocking filter 33, the adaptive filter 70, and the adaptive offset filter 80 (80') may be implemented by hardware by using a logical circuit formed on an integrated circuit (IC chip), or may be implemented by software by using a CPU (central processing unit).

If the above-described elements are implemented by software, the video decoding device 1 and the video coding device 2 each include a CPU which executes commands of a control program which implements the individual functions, a ROM (read only memory) storing this program therein, a RAM (random access memory) loading this program, a storage device (recording medium), such as a memory, storing this program and various items of data therein, and so on. The object of the present invention may also be implemented by supplying a recording medium on which program code (an execution form program, an intermediate code program, and a source program) of the control program for the video decoding device 1 and the video coding device 2, which is software implementing the above-described functions, is recorded in a computer readable manner, to the video decoding device 1 and the video coding device 2, and by reading and executing the program code recorded on the recording medium by a computer (or a CPU or an MPU (micro processing unit)) of each of the video decoding device 1 and the video coding device 2.

As the above-described recording medium, for example, a tape type, such as magnetic tape or cassette tape, a disk type including a magnetic disk, such as a floppy (registered trademark) disk or a hard disk, and an optical disc, such as a CD-ROM (compact disc read-only memory), an MO disc (magneto-optical disc), an MD (Mini Disc), a DVD (digital versatile disc), or a CD-R (CD recordable), a card type, such as an IC card (including a memory card) or an optical card, a semiconductor memory type, such as a mask ROM, an EPROM (erasable programmable read-only memory), an EEPROM (electrically erasable and programmable read-only memory) (registered trademark), or a flash ROM, or a logical circuit type, such as a PLD (Programmable logic device) or an FPGA (Field Programmable Gate Array), may be used.

The video decoding device 1 and the video coding device 2 may be connected to a communication network and the above-described program code may be supplied via the communication network. This communication network is not particularly restricted as long as it is capable of transmitting the program code. For example, the Internet, an intranet, an extranet, a LAN (local area network), ISDN (integrated services digital network), a VAN (value-added network), a CATV (community antenna television/cable television) communication network, a VPN (virtual private network), a public switched telephone network, a mobile communication network, a satellite communication work, etc. may be used. Additionally, a transmission medium forming this communication network is not restricted to a specific configuration or a specific type as long as it is capable of transmitting the program code. For example, a wired transmission medium, such as IEEE (institute of electrical and electronic engineers) 1394, USB, power line communication, a cable TV line, a telephone line, or an ADSL (asymmetric digital subscriber loop) circuit, or a wireless transmission medium, such as infrared, for example, IrDA (infrared data association) or a remote controller, Bluetooth (registered trademark), IEEE802.11 radio, HDR (high data rate), NFC (Near Field Communication), DLNA (Digital Living Network Alliance), a mobile phone network, a satellite circuit, or a terrestrial digital network, may be used. In the present invention, the above-described program code may also be implemented in the form of a computer data signal embedded in a carrier wave through digital transmission.

The present invention is not restricted to the above-described embodiments, and various modifications may be made within the scope of the claims. Embodiments obtained by combining technical means disclosed in the different embodiments in an appropriate manner are also encompassed in the technical scope of the present invention.

INDUSTRIAL APPLICABILITY

The present invention is suitably applicable to an image filter which performs offset filtering on image data. The invention is also suitably applicable to a decoding device which decodes coded data and a coding device which codes coded data.

REFERENCE SIGNS LIST 1 video decoding device (decoding device)
41 deblocking filter
50 adaptive filter
60, 60' adaptive offset filter (image filtering device)
611, 611' offset information decoding section (offset decoding device, determining means, offset attribute setting means, offset decoding means, offset residual decoding means, prediction value determining means)
612 QAOU structure decoding section
613 offset attribute setting section (offset attribute setting means)
621 offset information storage section
622 QAOU controller
623 offset-type determining section
624 classifying section (calculating means, bit shift means, classifying means)
625 offset determining section (offset reverse shift means)
626 offset adder (offset means)
2 video coding device (coding device)
33 deblocking filter
70 adaptive filter
80, 80' adaptive offset filter (image filtering device)
811 offset calculator
812 offset clipping section
813 offset information selector
814 offset residual determining section
815 offset attribute setting section (offset attribute setting means)
816 offset shifter (offset shift means)

The invention claimed is:

1. An image filtering device, comprising:
an offset attribute setting unit, configured to set an upmost limitation of an offset value range in accordance with a bit depth of pixel values of pixels forming an input image, wherein the bit depth of pixel values of pixels forming the input image is obtained from coded data;
an offset decoding unit, configured to decode an offset value which is restricted to the set offset value range, wherein an offset bit depth of the offset value is equal to the bit depth of the pixel values in a case in which the bit depth of the pixel values is ten or smaller, or the offset bit depth of the offset value is equal to ten in a case in which the bit depth of the pixel values is eleven or greater;
wherein the offset attribute setting unit is configured to set a maximum bit length representing the upmost limitation of the offset value range to be (the offset bit depth−K) or smaller, wherein the upmost limitation of the offset value range is determined to be $(2^{(the\ offset\ bit\ depth-K-1)}-1)$, and K is an integer greater than 0;
an offset-type determining unit, configured to determine, among first and second offset types, an offset type to which a subject unit area including the pixel forming the input image belongs; and
a filtering unit, configured to left-shift the offset value according to a shift value, and add left-shifted offset value to a pixel value of a pixel included in the input image which is constituted by a plurality of unit areas, wherein the shift value is equal to (bit depth of the pixel value-offset bit depth of the offset value).

2. The image filtering device according to claim 1, wherein a value of K is equal to 4.

3. An image filtering method, comprising:
setting, by a Sample Adaptive Offset (SAO) filter, an upmost limitation of an offset value range in accordance with a bit depth of pixel values of pixels forming an input image, wherein the bit depth of the pixel values of pixels forming the input image is obtained from coded data;
decoding, by a decoder, an offset value which is restricted to the set offset value range, wherein an offset bit depth of the offset value is equal to the bit depth of the pixel values in a case in which the bit depth of the pixel values is ten or smaller, or the offset bit depth of the offset value is ten in a case in which the bit depth of the pixel values is eleven or greater, and, wherein a maximum bit length representing the upmost limitation of the offset value range is set by the SAO filter to be (the offset bit depth−K) or smaller, wherein the upmost limitation of the offset value range is determined to be $(2^{(the\ offset\ bit\ depth-K-1)}-1)$, and K is an integer greater than 0;
determining, among first and second offset types, an offset type to which a subject unit area including the pixel forming the input image belongs;
left-shifting the offset value by the SAO filter according to a shift value and adding by the SAO filter the left-shifted offset value to a pixel value of a pixel included in the input image which is constituted by a plurality of unit areas, wherein the shift value is equal to (bit depth of the pixel value minus offset bit depth of the offset value).

4. The image filtering method according to claim 3, wherein a value of K is equal to 4.

5. An image filtering device comprising:
a non-transitory memory having processor-executable instructions stored thereon; and
a processor in communication with the non-transitory memory, the processor being configured to execute the processor-executable instructions stored in the non-transitory memory for:
setting an upmost limitation of an offset value range in accordance with a bit depth of pixel values of pixels forming an input image, wherein the a bit depth of the pixel values of the pixels forming the input image is obtained from coded data;

decoding an offset value which is restricted to the set offset value range, wherein an offset bit depth of the offset value is equal to the bit depth of the pixel values in a case in which the bit depth of the pixel values is ten or smaller, or the offset bit depth of the offset value is equal to ten in a case in which the bit depth of the pixel values is eleven or greater, and, wherein a maximum bit length representing the upmost limitation of the offset value range is set by the SAO filter to be (the offset bit depth−K) or smaller, wherein the upmost limitation of the offset value range is determined to be $(2^{(the\ offset\ bit\ depth-K-1)}-1)$, and K is an integer greater than 0;

determining, among first and second offset types, an offset type to which a subject unit area including the pixel forming the input image belongs;

left-shifting the offset value according to a shift value, and adding left-shifted offset value to a pixel value of a pixel included in the input image which is constituted by a plurality of unit areas, wherein the shift value is equal to (bit depth of the pixel value minus offset bit depth of the offset value).

6. The image filtering device according to claim 5, wherein a value of K is equal to 4.

7. An image filtering device, comprising:
an offset attribute setting unit, configured to set an upmost limitation of an offset value range in accordance with a bit depth of pixel values of pixels forming an input image, wherein the bit depth of pixel values of pixels forming the input image is obtained from coded data, and the input image is decoded from the coded data;
an offset decoding unit, configured to decode an offset value which is restricted to the set offset value range;
an offset-type determining unit, configured to determine, among first and second offset types, an offset type to which a subject unit area including the pixel forming the input image belongs;
a filtering unit, configured to add the offset value associated with the offset type to a pixel value of a pixel included in the input image which is constituted by a plurality of unit areas;
wherein an offset bit depth of the offset value is equal to the bit depth of the pixel values in a case in which the bit depth of the pixel values is ten or smaller, or the offset bit depth of the offset value is equal to ten in a case in which the bit depth of the pixel values is eleven or greater;
wherein the offset attribute setting unit is configured to set a maximum bit length representing the upmost limitation of the offset value range to be (the offset bit depth−K) or smaller, wherein the upmost limitation of the offset value range is determined to be $(2^{(the\ offset\ bit\ depth-K-1)}-1)$, and K is an integer greater than 0.

8. The image filtering device according to claim 7, wherein a value of K is equal to 4.

9. An image filtering method, comprising:
setting, by a Sample Adaptive Offset (SAO) filter, an upmost limitation of an offset value range in accordance with a bit depth of pixel values of pixels forming an input image, wherein the bit depth of the pixel values of pixels forming the input image is obtained from coded data, and the input image is decoded from the coded data;
decoding, by a decoder, an offset value which is restricted to the set offset value range;
determining, among first and second offset types, an offset type to which a subject unit area including the pixel forming the input image belongs;
adding, by the SAO filter, the offset value associated with the offset type to a pixel value of a pixel included in the input image which is constituted by a plurality of unit areas;
wherein an offset bit depth of the offset value is equal to the bit depth of the pixel values in a case in which the bit depth of the pixel values is ten or smaller, or the offset bit depth of the offset value is equal to ten in a case in which the bit depth of the pixel values is eleven or greater; and
wherein the maximum bit length representing the upmost limitation of the offset value range is set by the SAO filter to be (the offset bit depth−K) or smaller, wherein the upmost limitation of the offset value range is determined to be $(2^{(the\ offset\ bit\ depth-K-1)}-1)$, and K is an integer greater than 0.

10. The image filtering method according to claim 9, wherein a value of K is equal to 4.

11. An image filtering device comprising:
a non-transitory memory having processor-executable instructions stored thereon; and
a processor in communication with the non-transitory memory, the processor being configured to execute the processor-executable instructions stored in the non-transitory memory for:
setting an upmost limitation of an offset value range in accordance with a bit depth of pixel values of pixels forming an input image, wherein the a bit depth of the pixel values of the pixels forming the input image is obtained from coded data, and the input image is decoded from the coded data;
decoding an offset value which is restricted to the set offset value range;
determining, among first and second offset types, an offset type to which a subject unit area including the pixel forming the input image belongs;
adding the offset value to a pixel value associated with the offset type of a pixel included in the input image which is constituted by a plurality of unit areas;
wherein an offset bit depth of the offset value is equal to the bit depth of the pixel values in a case in which the bit depth of the pixel values is ten or smaller, or the offset bit depth of the offset value is equal to ten in a case in which the bit depth of the pixel values is eleven or greater; and
wherein the maximum bit length representing the upmost limitation of the offset value range is set to be (the offset bit depth−K) or smaller, wherein the upmost limitation of the offset value range is determined to be $(2^{(the\ offset\ bit\ depth-K-1)}-1)$, and K is an integer greater than 0.

12. The image filtering device according to claim 11, wherein a value of K is equal to 4.

* * * * *

UNITED STATES PATENT AND TRADEMARK OFFICE
CERTIFICATE OF CORRECTION

PATENT NO. : 10,764,580 B2
APPLICATION NO. : 16/520735
DATED : September 1, 2020
INVENTOR(S) : Yamazaki et al.

It is certified that error appears in the above-identified patent and that said Letters Patent is hereby corrected as shown below:

On the Title Page

Item (56), in Column 2, under "Other Publications", Line 3, delete "(JCT-VC)of" and insert -- (JCT-VC) of --, therefor.

On Page 2, Item (56), in Column 2, under "Other Publications", Line 12, delete "(JCT-VC)of" and insert -- (JCT-VC) of --, therefor.

In the Specification

In Column 16, Line 65, delete "my" and insert -- mv --, therefor.

In Column 17, Line 6, delete "my" and insert -- mv --, therefor.

In Column 17, Line 11, delete "my" and insert -- mv --, therefor.

In Column 17, Line 26, delete "my" and insert -- mv --, therefor.

In Column 35, Line 33, delete "my" and insert -- mv --, therefor.

In Column 35, Line 35, delete "my" and insert -- mv --, therefor.

In Column 35, Line 48, delete "my" and insert -- mv --, therefor.

In Column 35, Line 66, delete "my" and insert -- mv --, therefor.

In Column 36, Line 58, delete "my" and insert -- mv --, therefor.

Signed and Sealed this
Third Day of January, 2023

Katherine Kelly Vidal
*Director of the United States Patent and Trademark Office*

CERTIFICATE OF CORRECTION (continued)
U.S. Pat. No. 10,764,580 B2

In Column 36, Line 65, delete "my." and insert -- mv. --, therefor.

In Column 88, Line 61, delete "etc." and insert -- etc., --, therefor.